(12) United States Patent
Katayose et al.

(10) Patent No.: US 8,526,116 B2
(45) Date of Patent: Sep. 3, 2013

(54) ZOOM LENS WITH BENT OPTICAL PATH AND IMAGE PICKUP APPARATUS USING THE SAME

(75) Inventors: Masato Katayose, Utsunomiya (JP); Kenji Ono, Fussa (JP); Kazuhito Hayakawa, Hachioji (JP)

(73) Assignee: Olympus Imaging Corp., Tokyo (JP)

(*) Notice: Subject to any disclaimer, the term of this patent is extended or adjusted under 35 U.S.C. 154(b) by 0 days.

(21) Appl. No.: 13/475,088

(22) Filed: May 18, 2012

(65) Prior Publication Data
US 2012/0293872 A1    Nov. 22, 2012

(30) Foreign Application Priority Data

May 19, 2011 (JP) .................................. 2011-112723
Jun. 24, 2011 (JP) .................................. 2011-140594

(51) Int. Cl.
*G02B 15/14* (2006.01)
*G02B 3/02* (2006.01)

(52) U.S. Cl.
USPC ............................ 359/683; 359/684; 359/714

(58) Field of Classification Search
USPC ................... 359/682, 683, 684, 714
See application file for complete search history.

(56) References Cited

U.S. PATENT DOCUMENTS

| | | | |
|---|---|---|---|
| 7,505,210 B2 | 3/2009 | Kuroda et al. | |
| 7,848,030 B2 | 12/2010 | Mihara et al. | |
| 7,864,443 B2 | 1/2011 | Sudoh et al. | |

FOREIGN PATENT DOCUMENTS

| | | |
|---|---|---|
| JP | 2005-215165 | 8/2005 |
| JP | 2007-108698 | 4/2007 |
| JP | 2007-108699 | 4/2007 |
| JP | 2007-304195 | 11/2007 |
| JP | 2009-236973 | 10/2009 |

*Primary Examiner* — Jack Dinh
(74) *Attorney, Agent, or Firm* — Kenyon & Kenyon LLP

(57) ABSTRACT

A zoom lens with a bent optical path comprising, in order from the object side to the image side, a first lens unit having a positive refractive power, a second lens unit having a negative refractive power, and a rear lens unit group having a positive refractive power as a whole. The first lens unit includes a reflecting member. The rear lens unit group includes three lens unit including, in order from the object side to the image side, a third lens unit having a positive refractive power, a fourth lens unit having a negative refractive power, and a fifth lens unit having a positive refractive power. The distances between the lens units change during zooming from the wide angle end to the telephoto end. The zoom lens satisfies the predetermined conditional expressions.

26 Claims, 37 Drawing Sheets

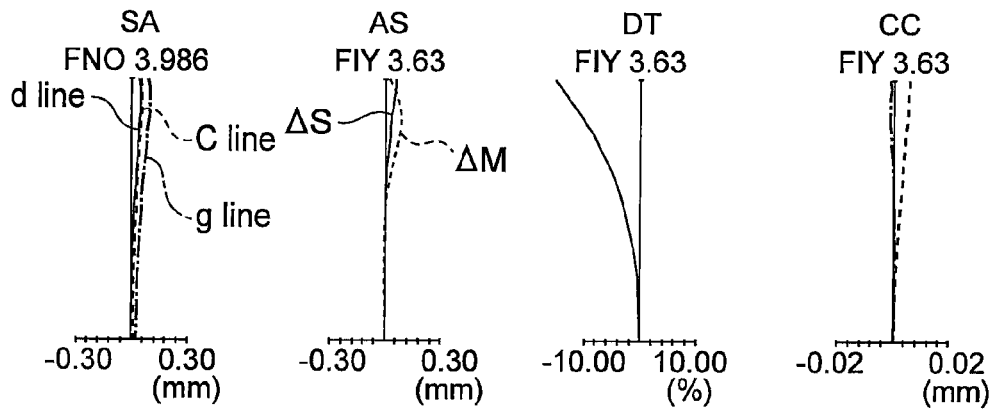
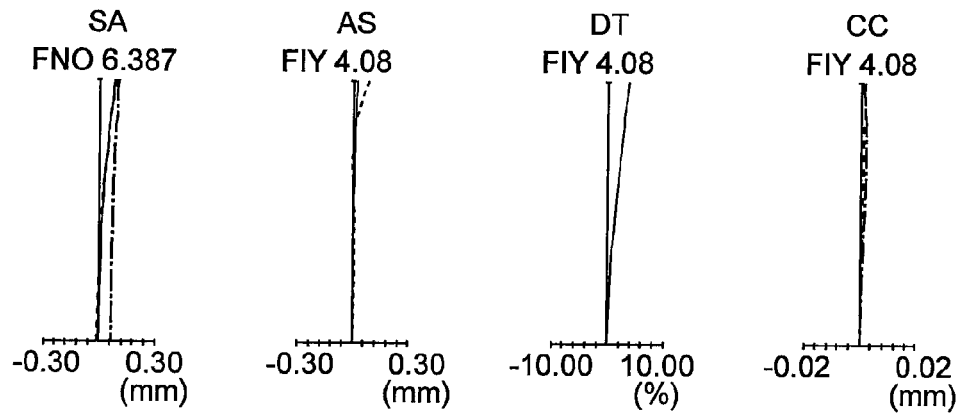
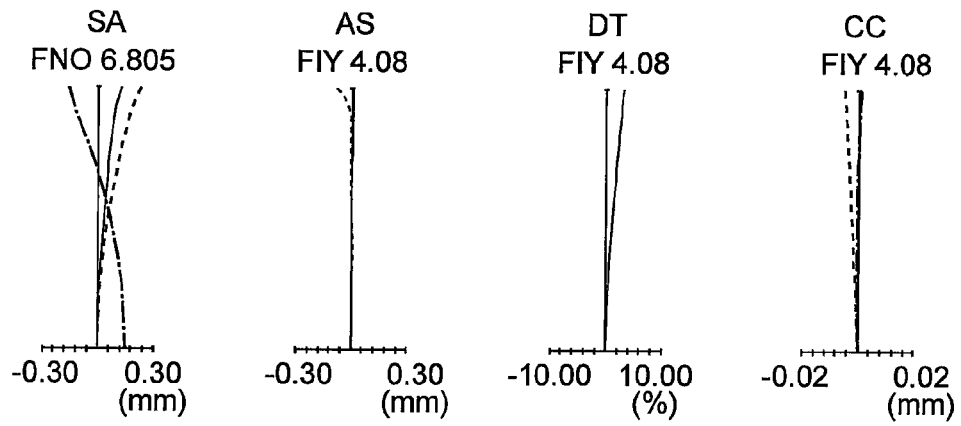

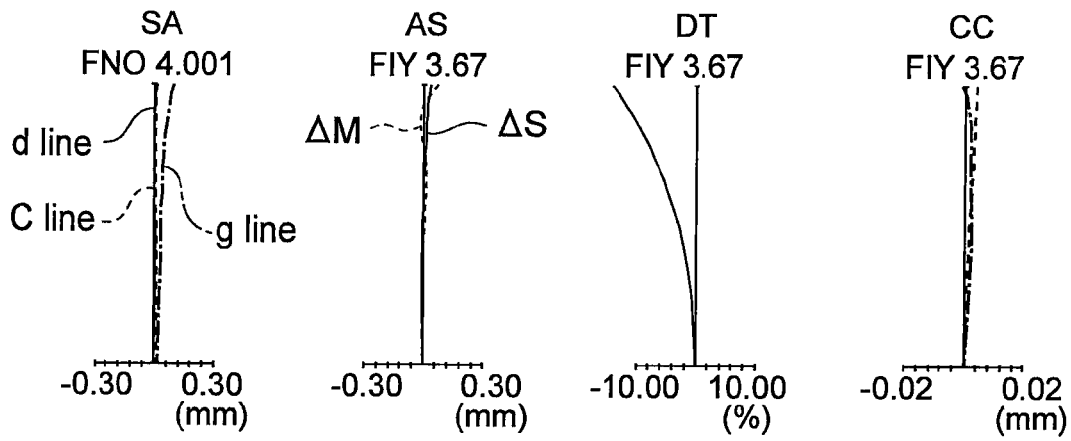
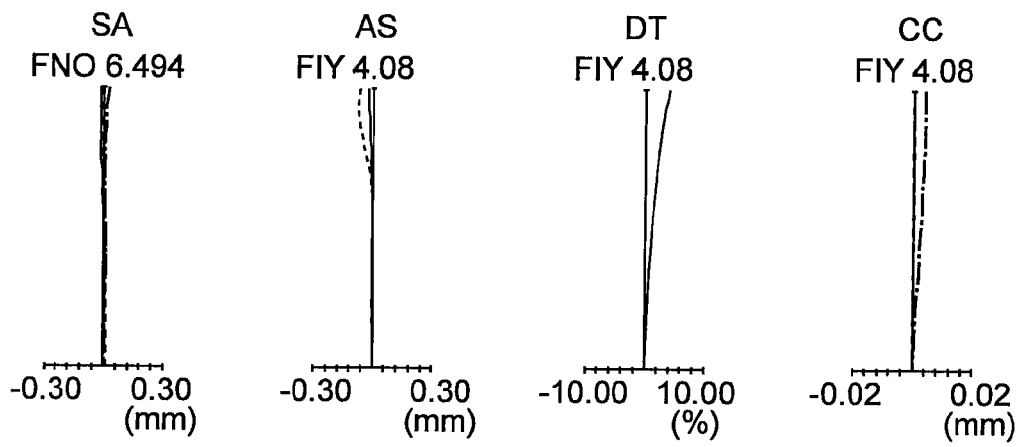
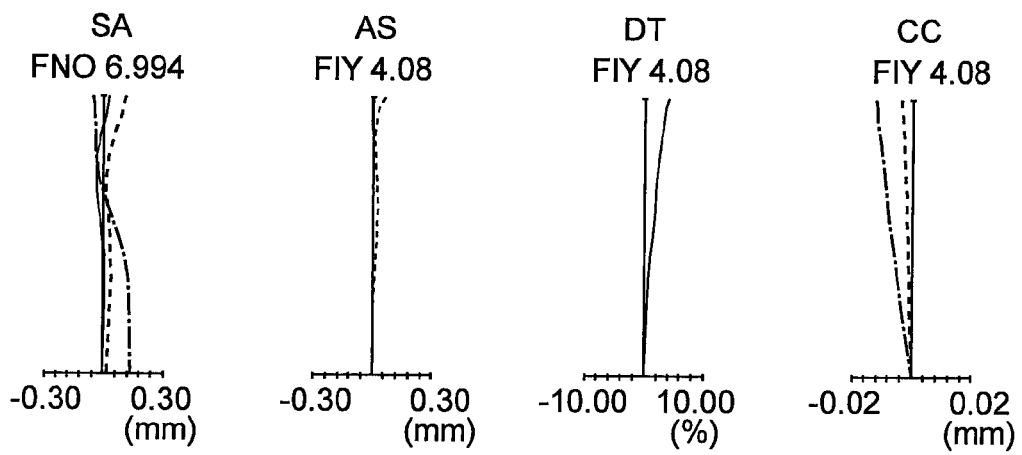

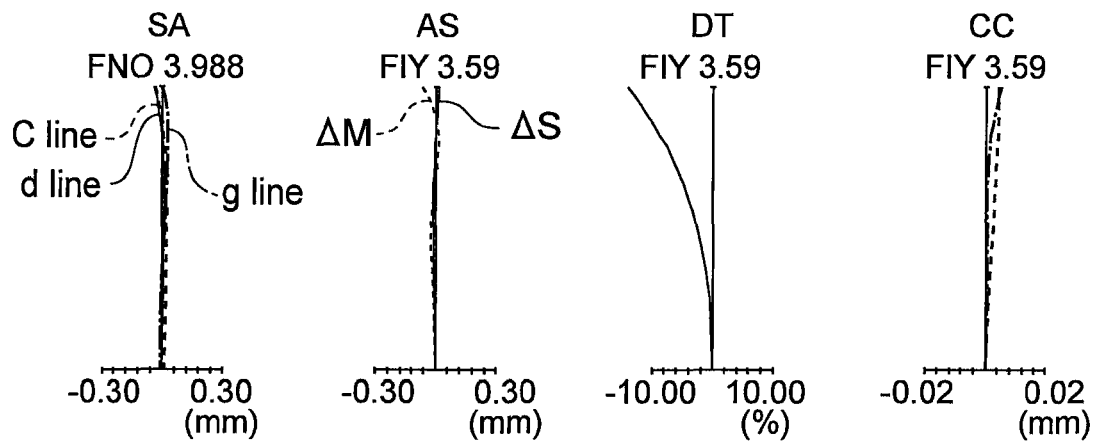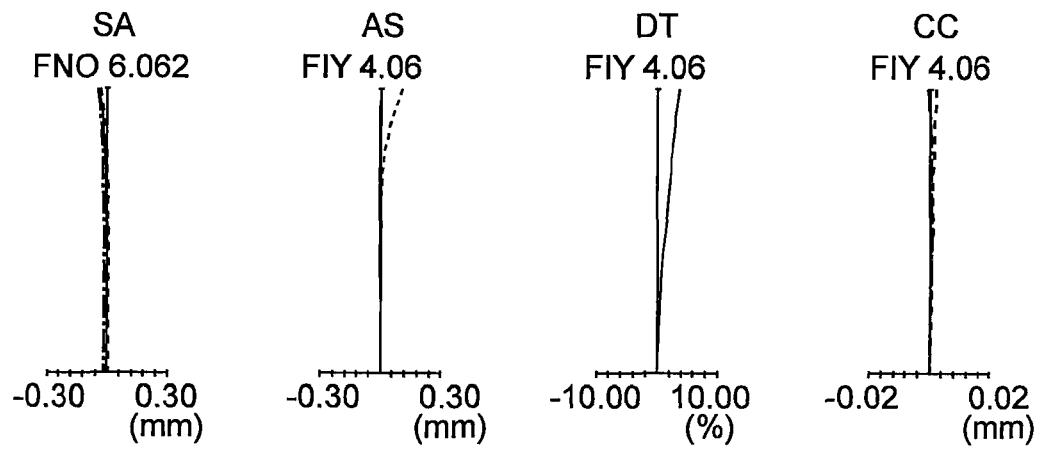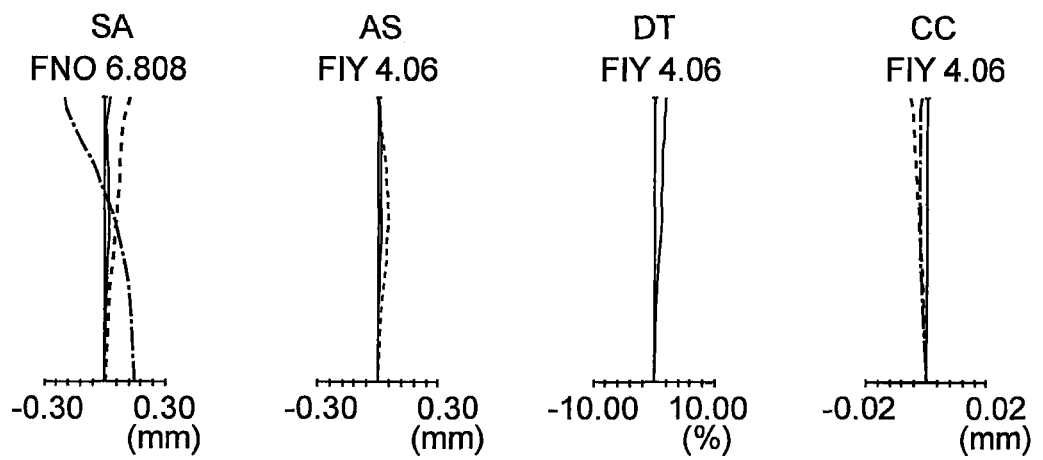

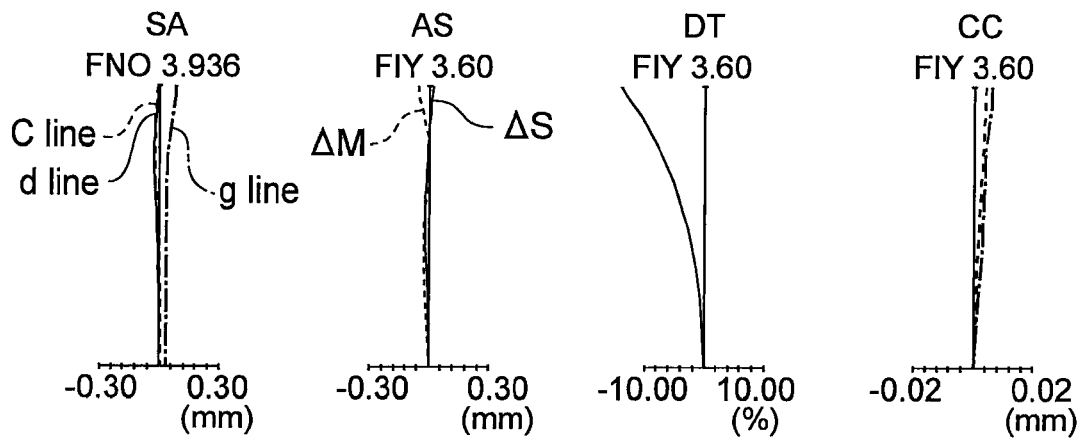
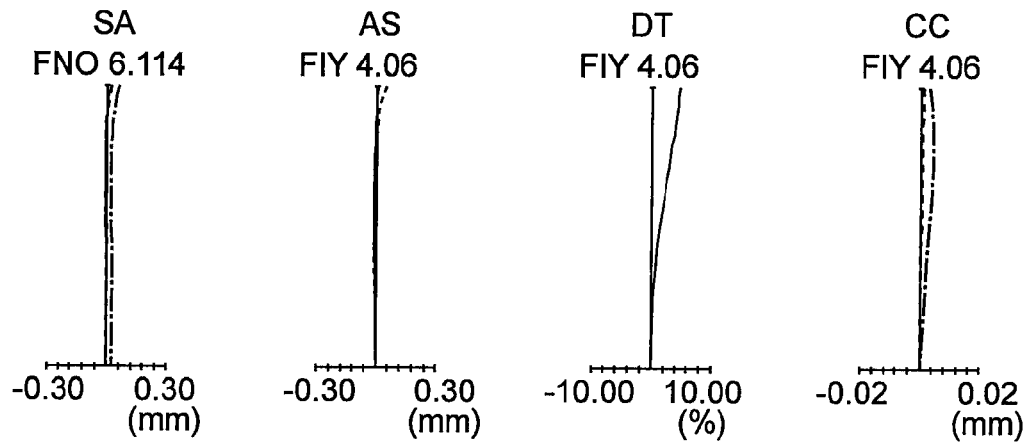
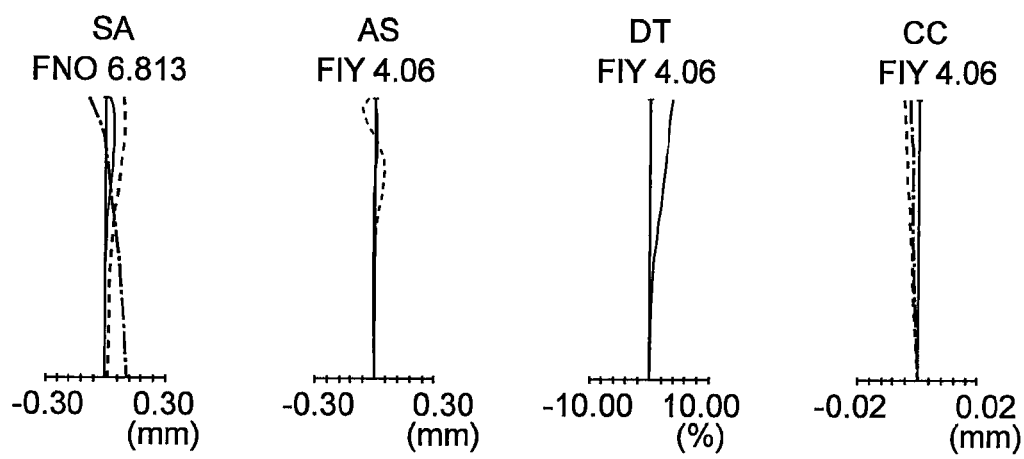

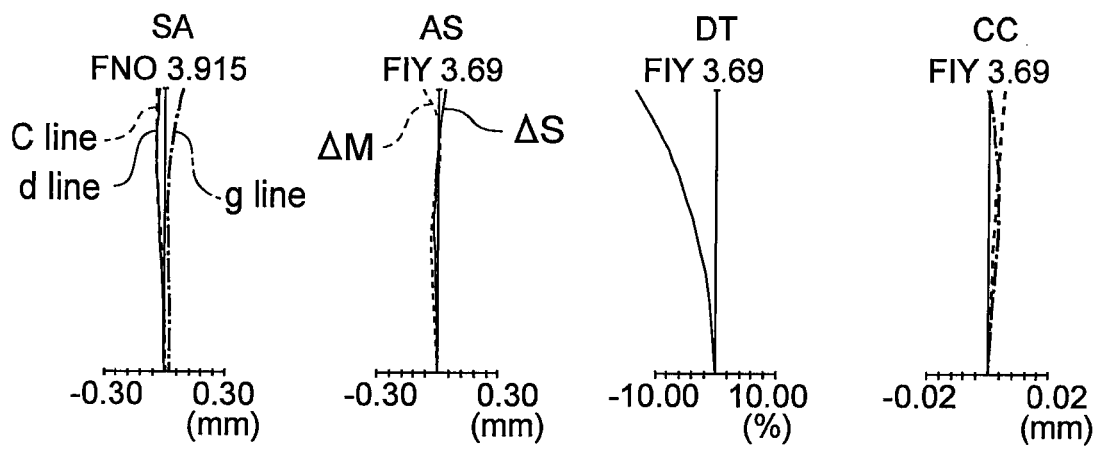
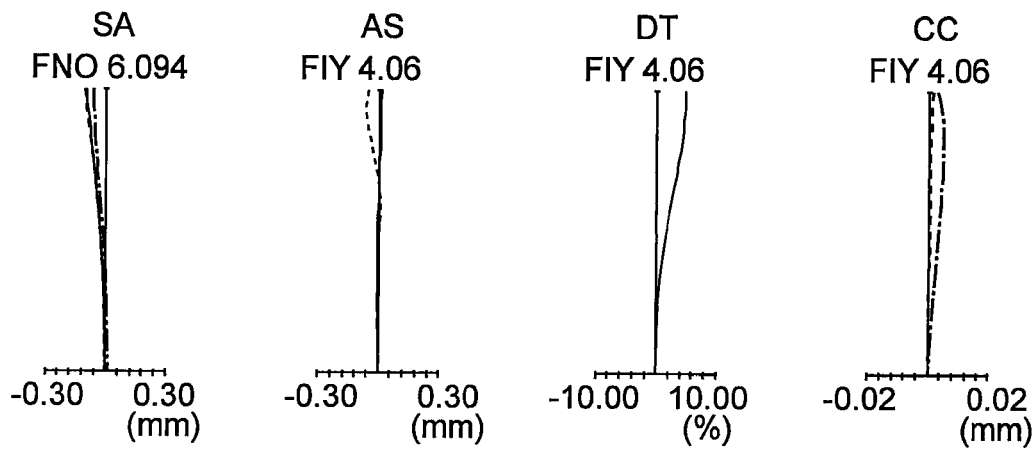
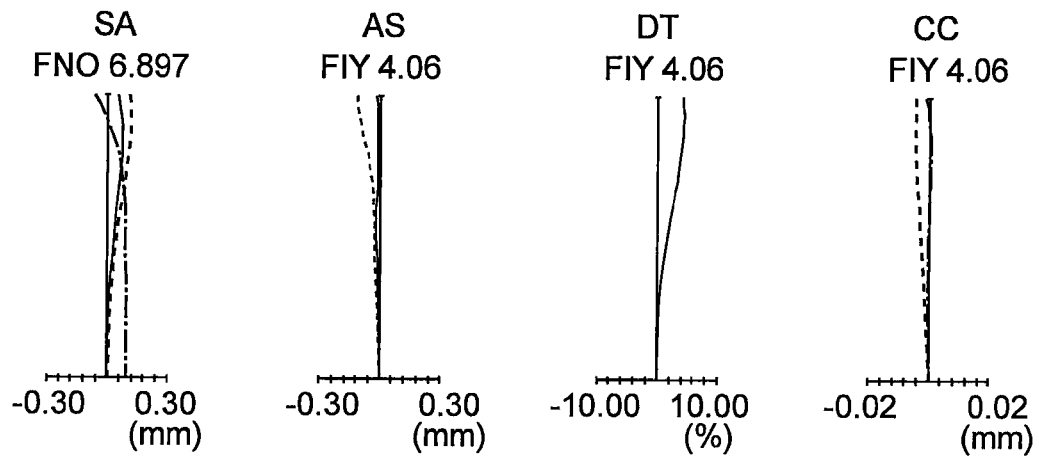

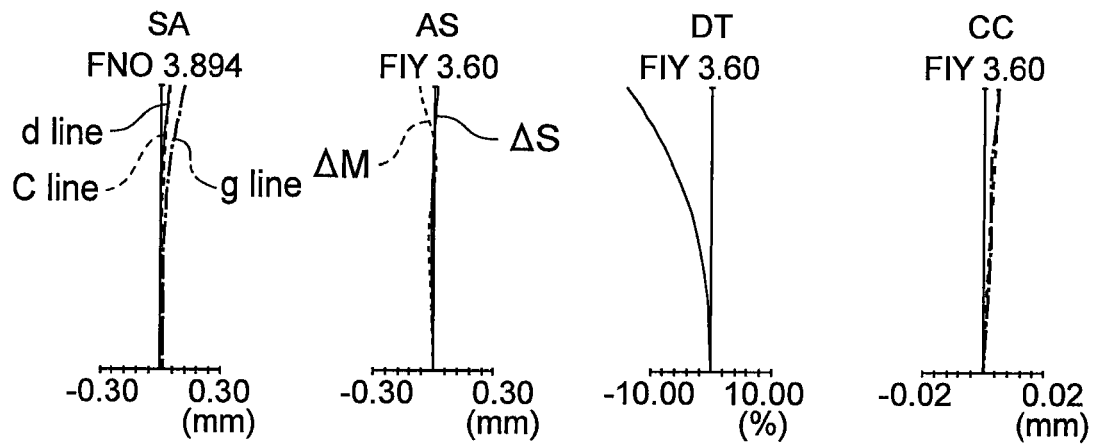
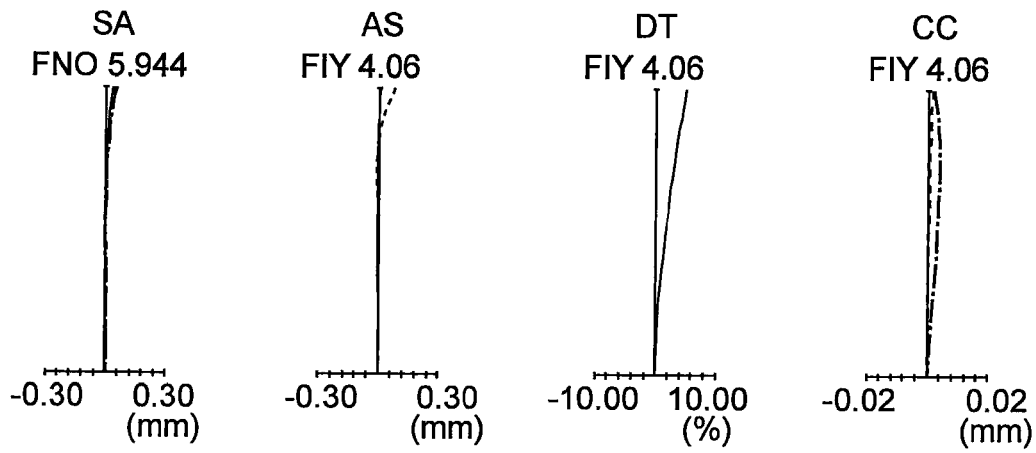
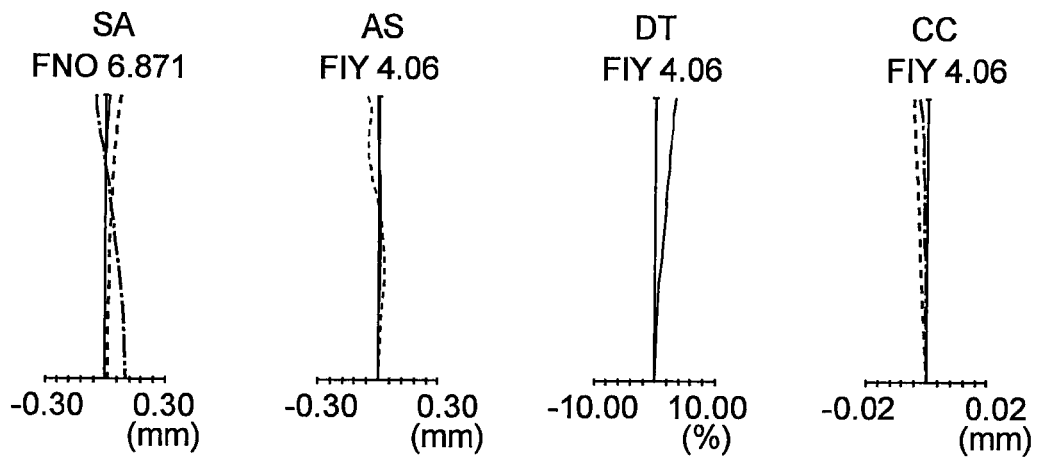

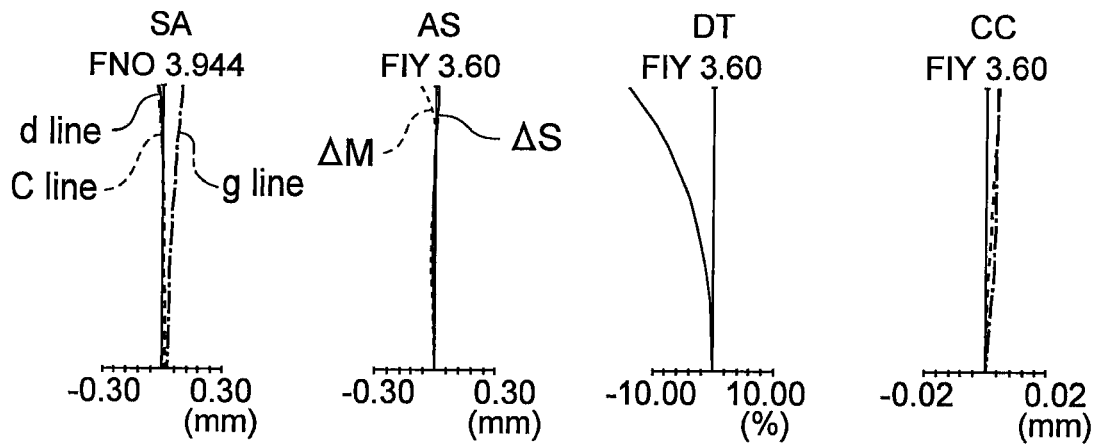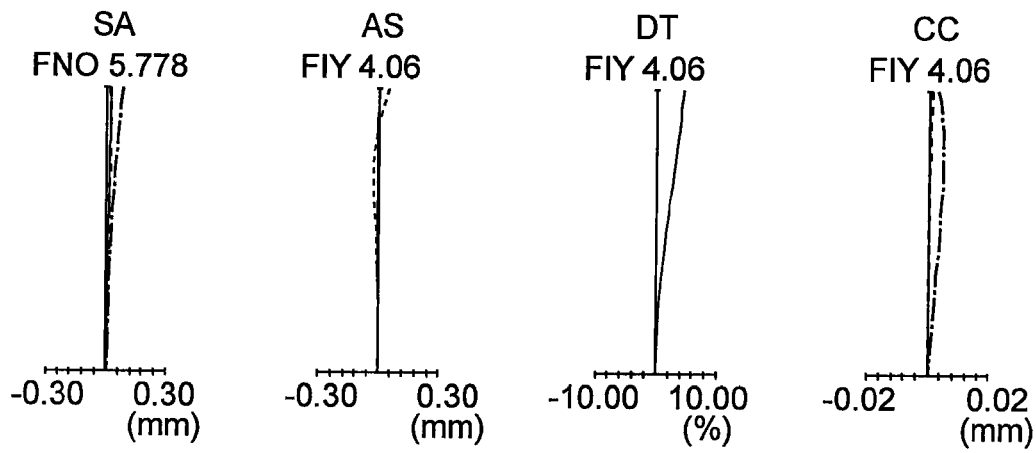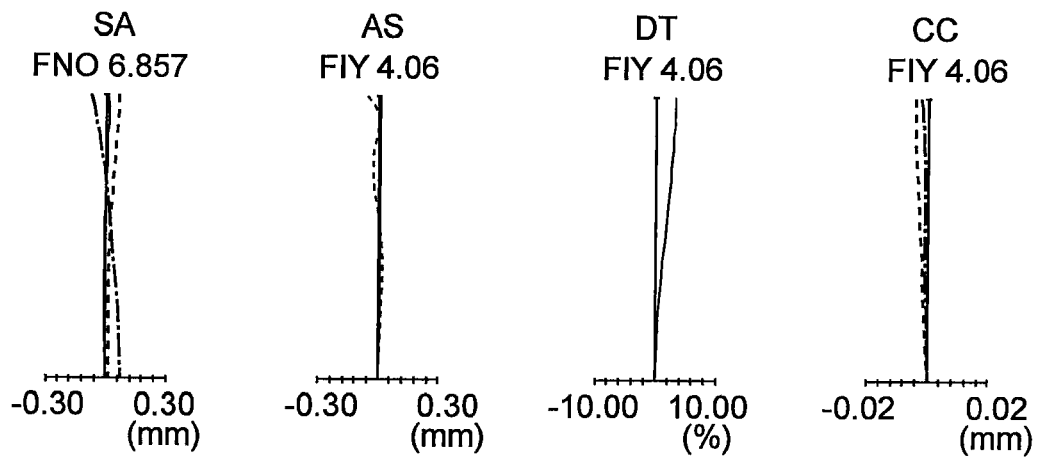

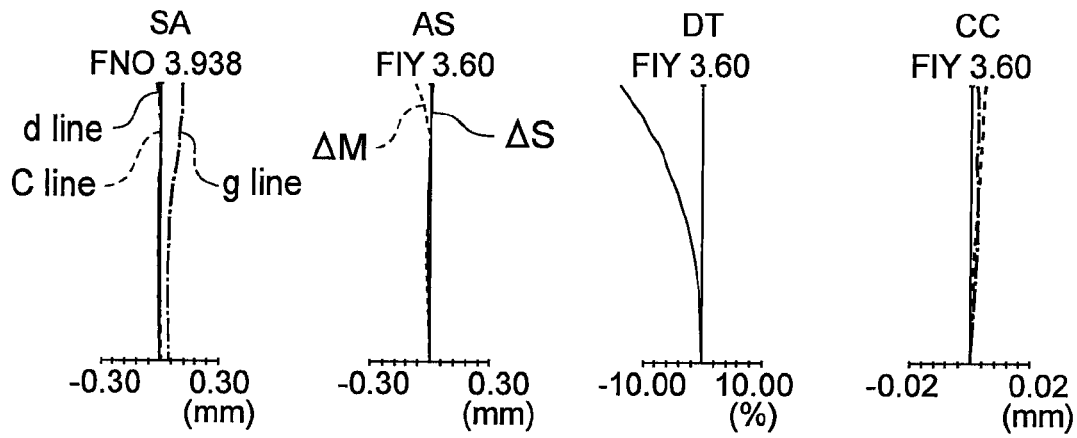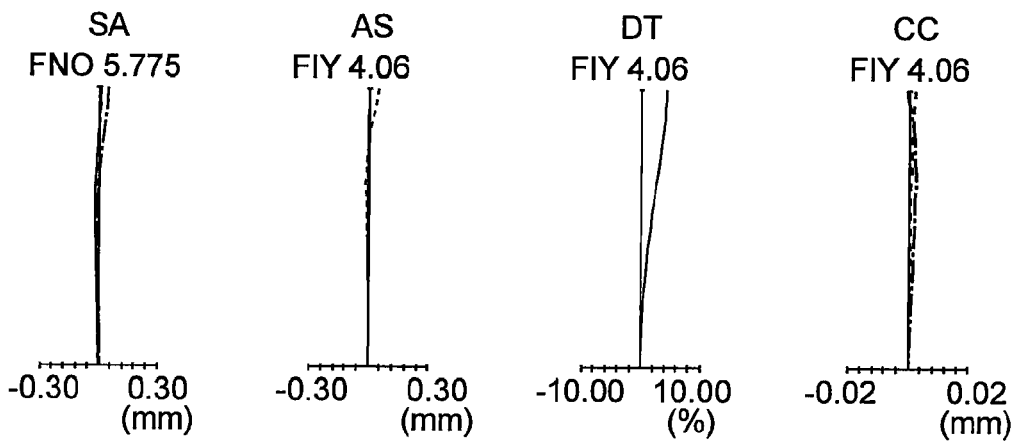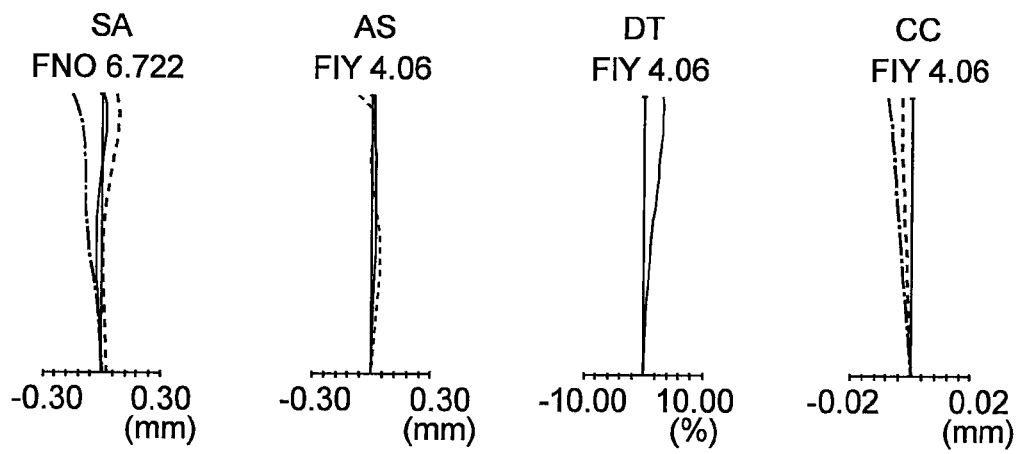

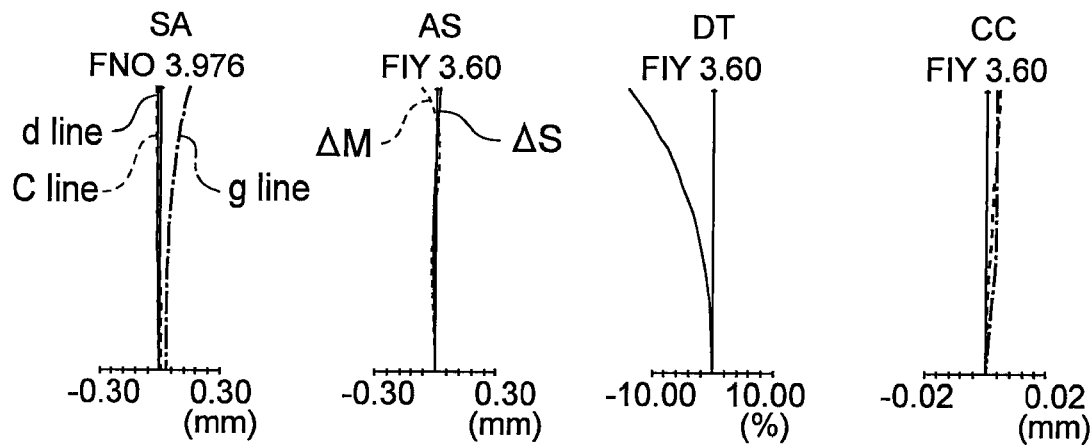
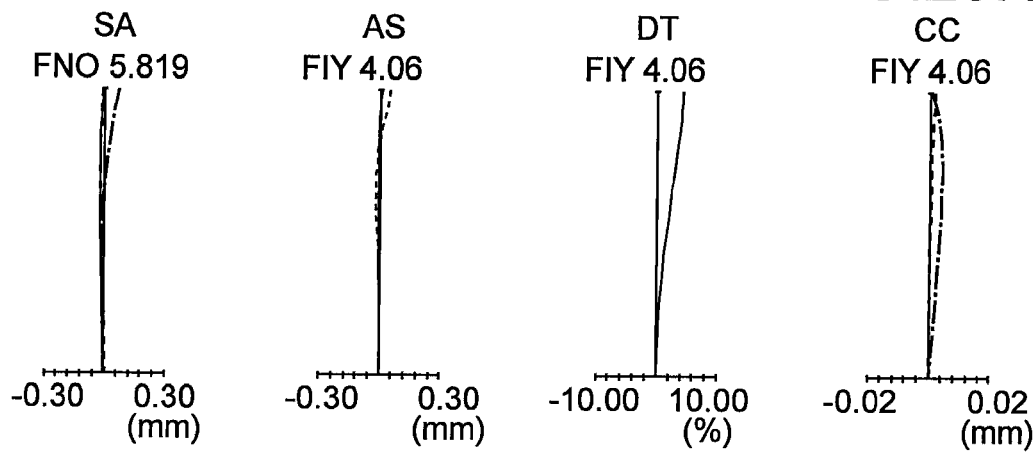
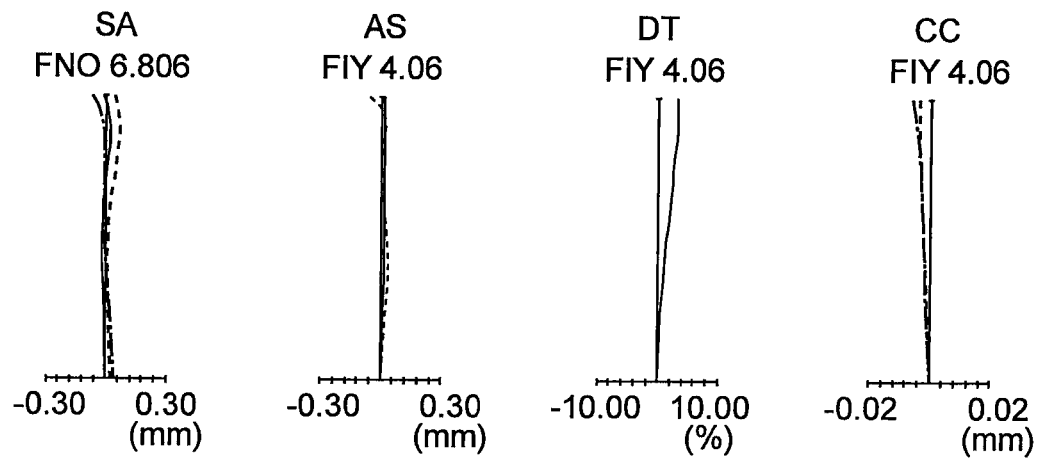

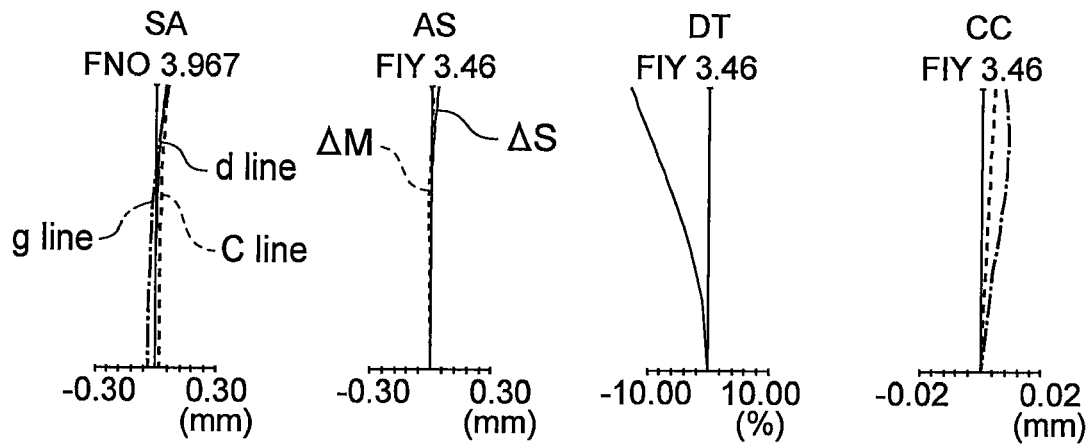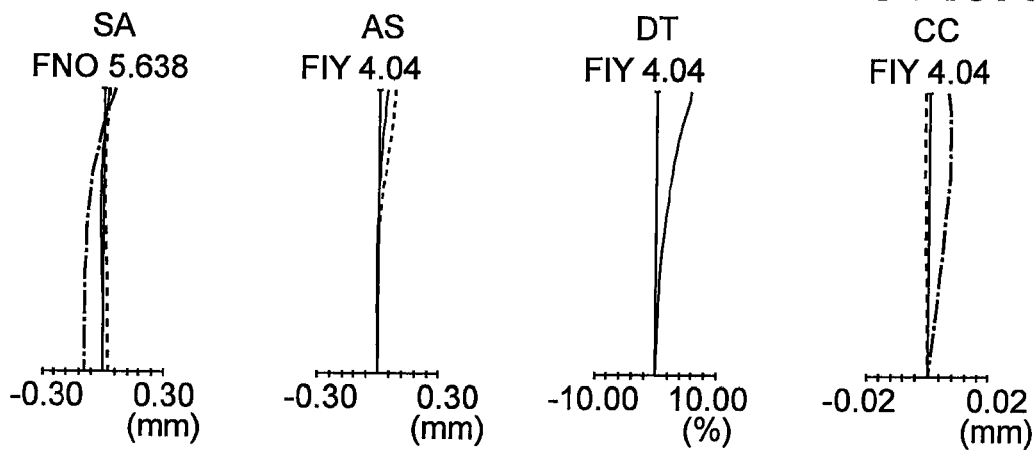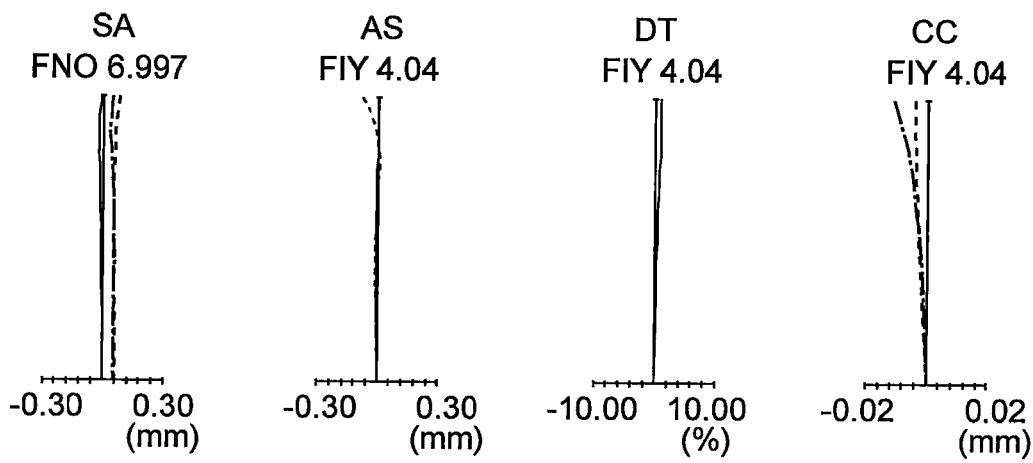

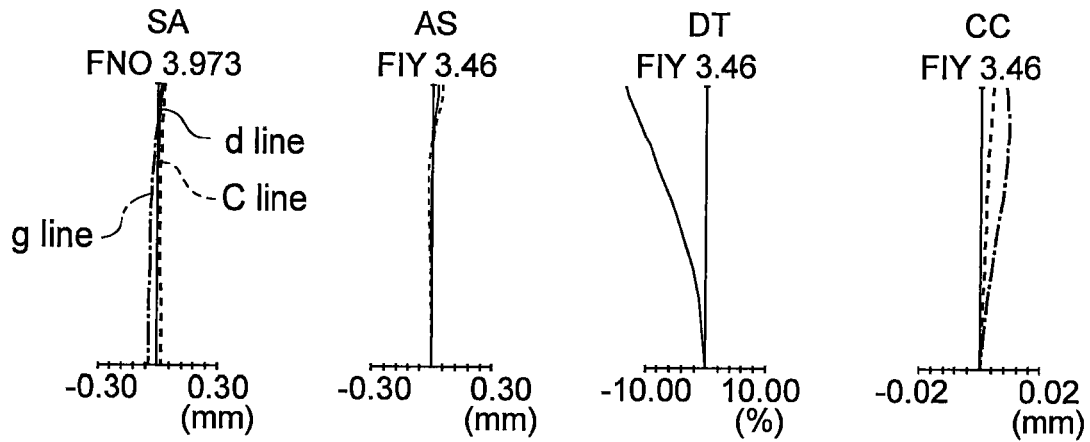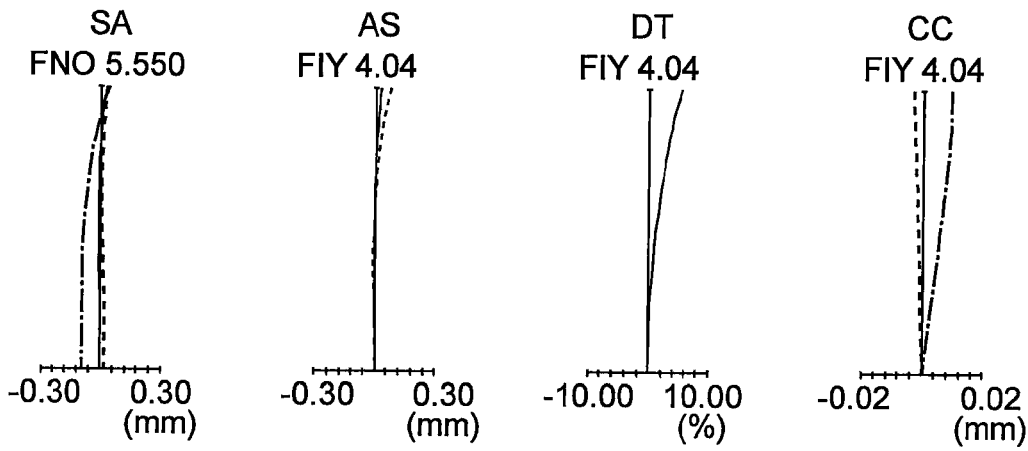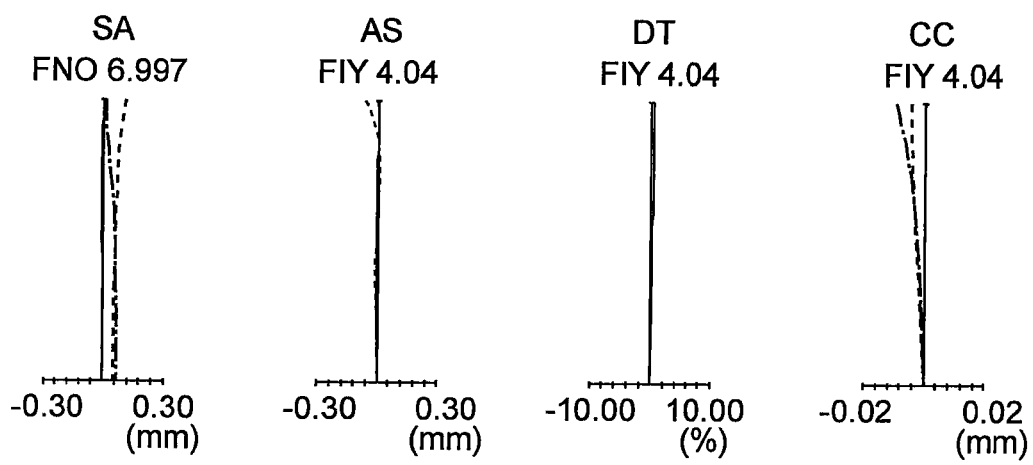

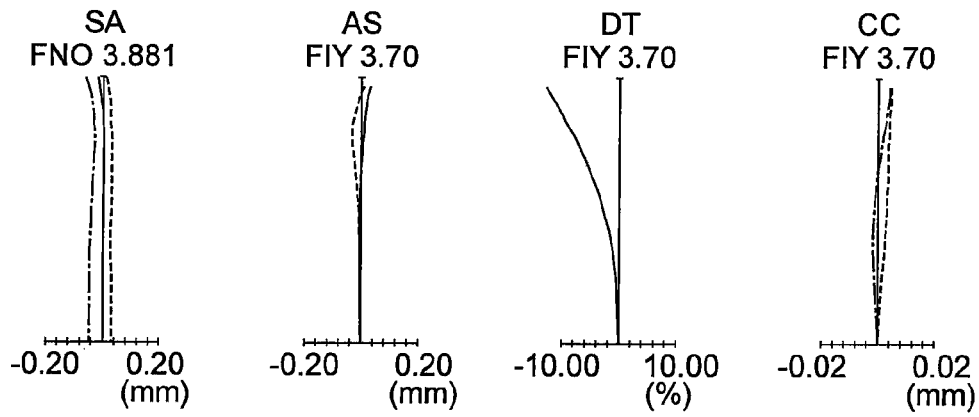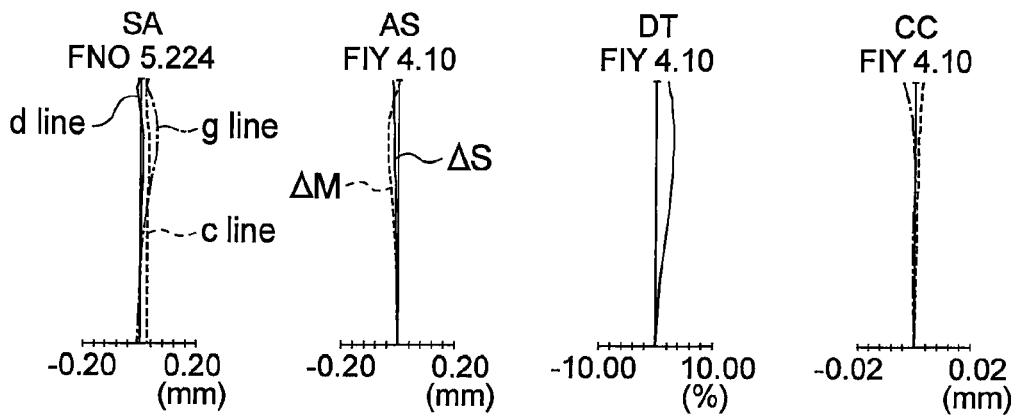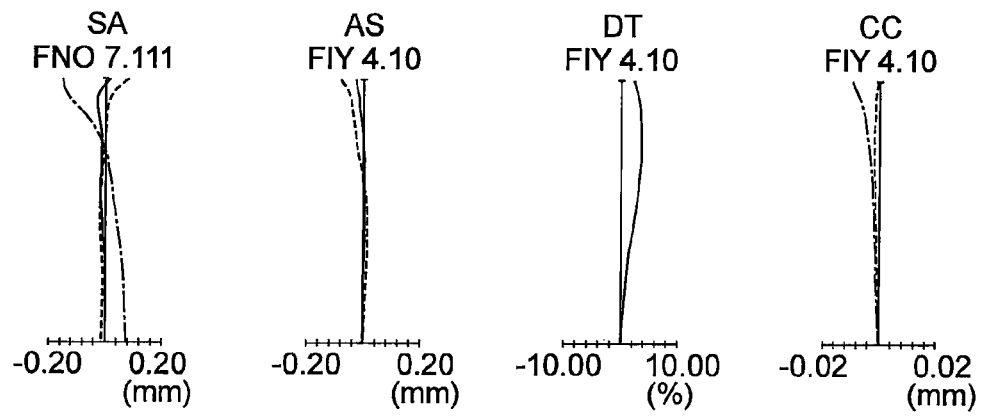

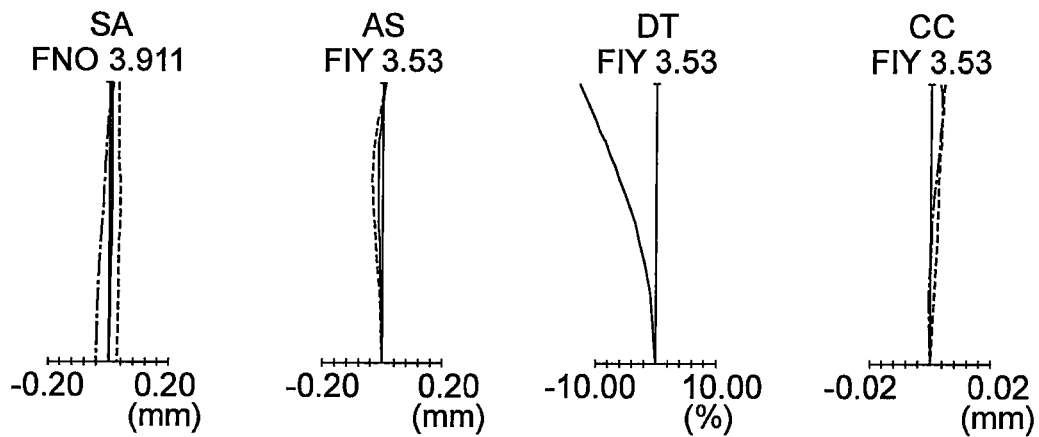
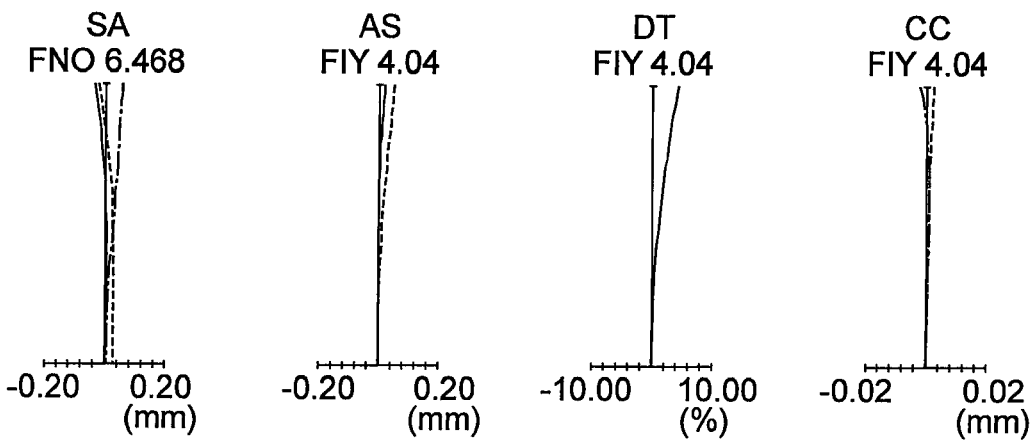
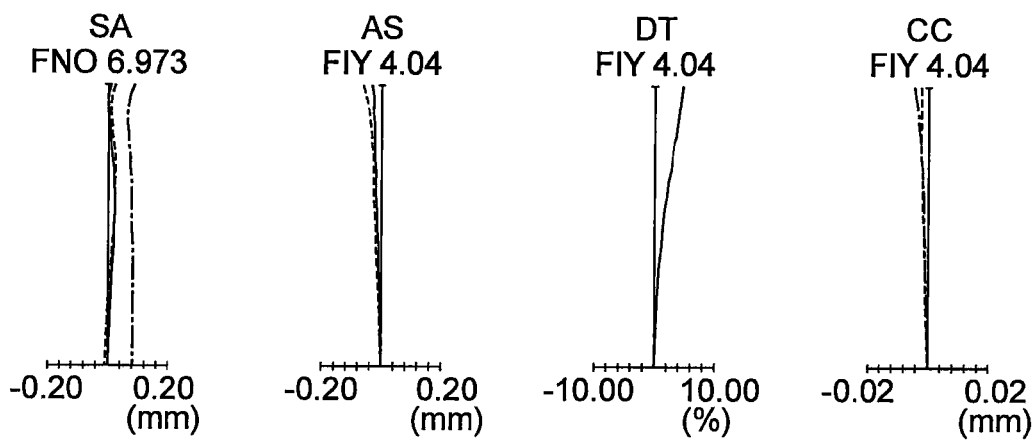

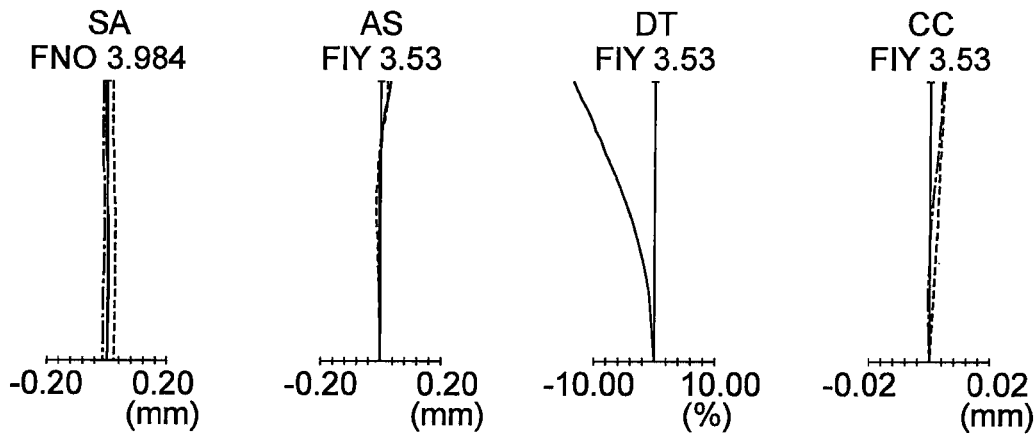
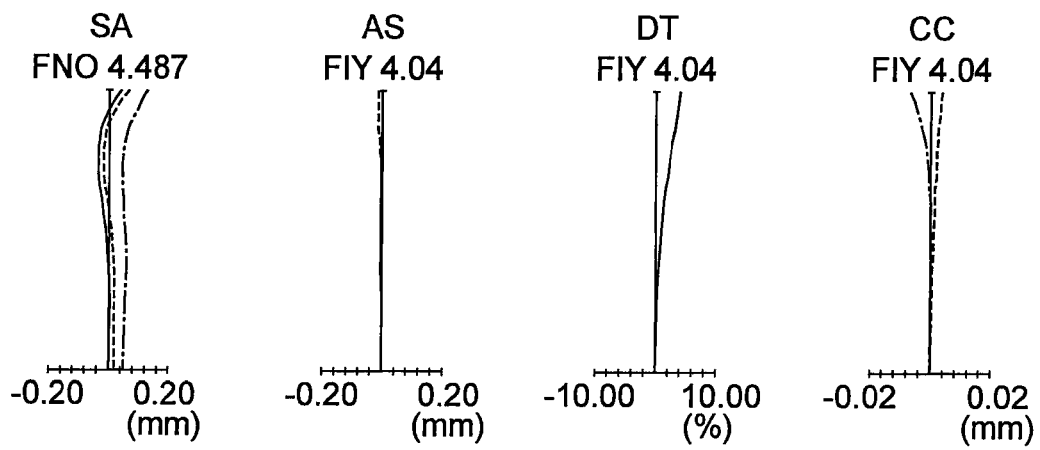
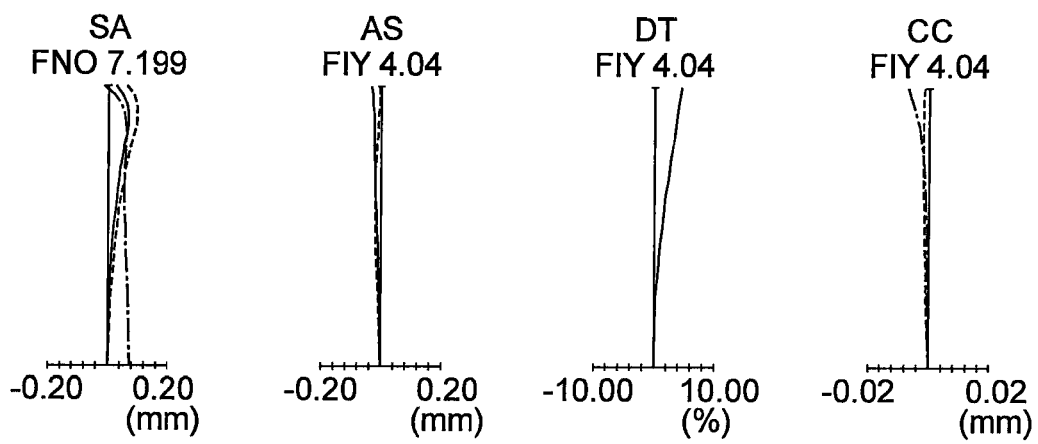

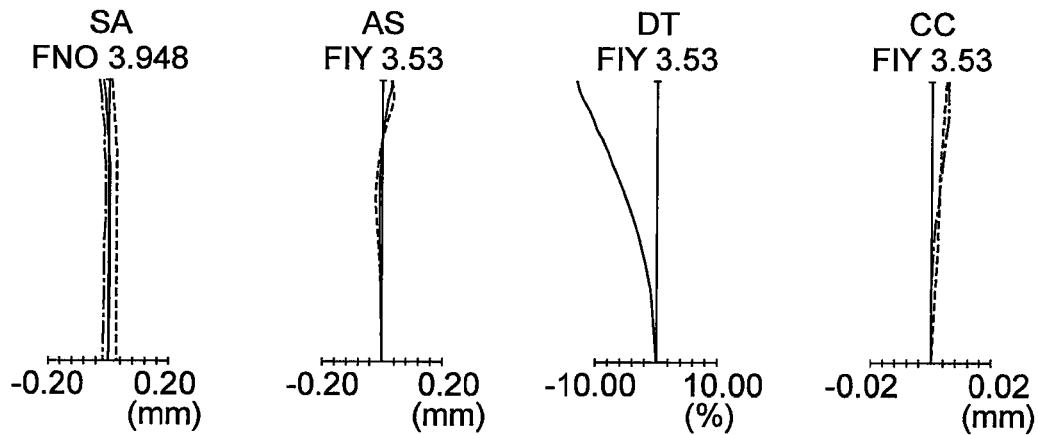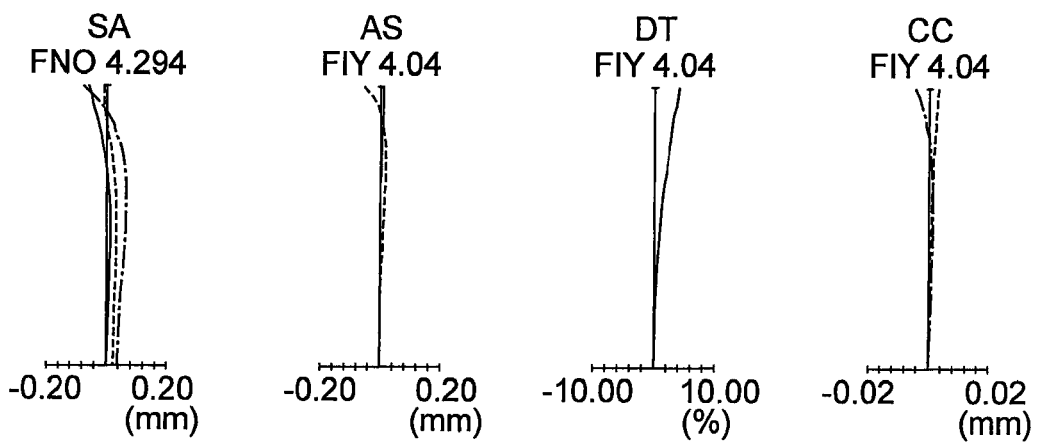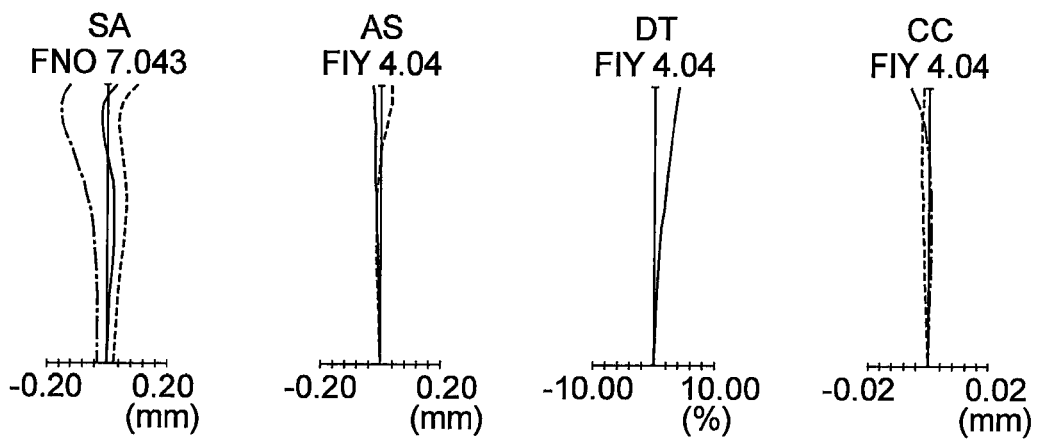

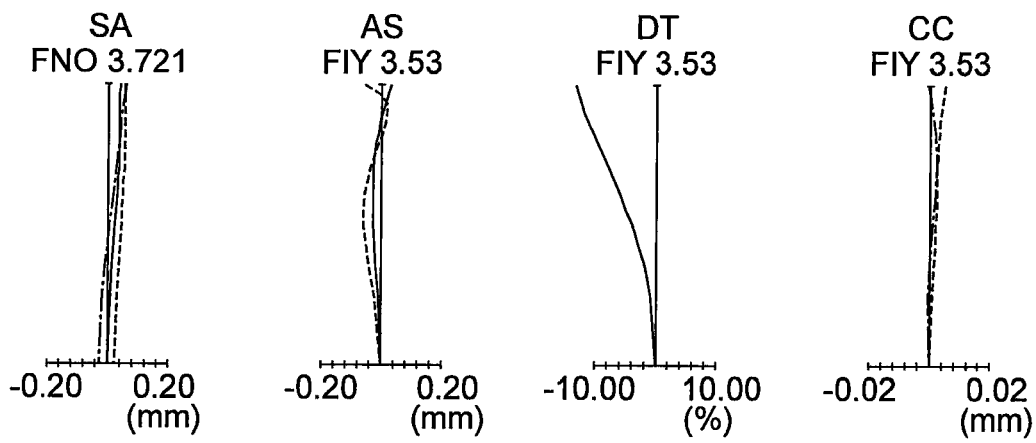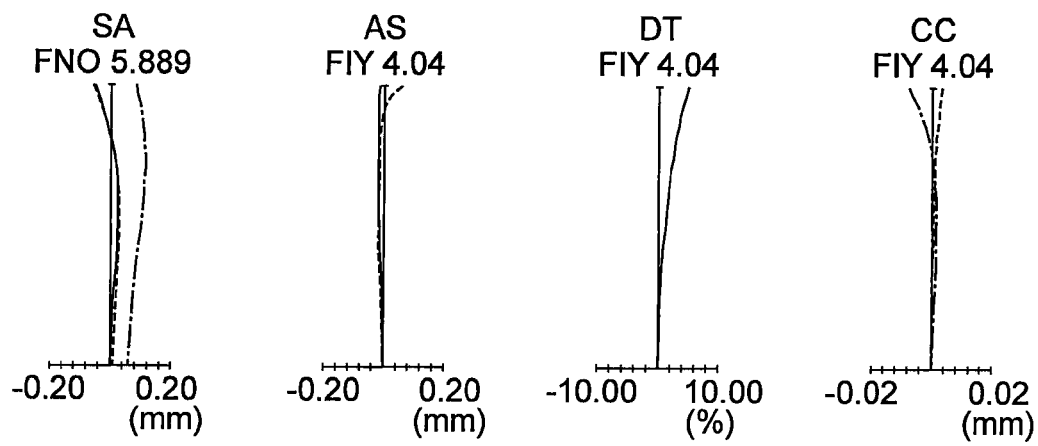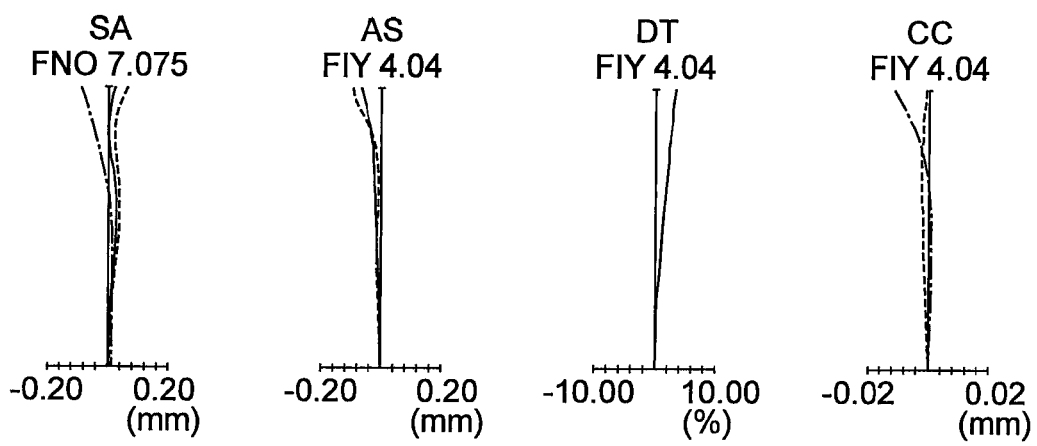

ZOOM LENS WITH BENT OPTICAL PATH AND IMAGE PICKUP APPARATUS USING THE SAME

CROSS-REFERENCE TO RELATED APPLICATION

The present application is based upon and claims the benefit of priority from the prior Japanese Patent Application No. 2011-112723 filed on May 19, 2011 and the prior Japanese Patent Application No. 2011-140594 filed on Jun. 24, 2011; the entire contents of which are incorporated herein by reference.

BACKGROUND OF THE INVENTION

1. Field of the Invention

The present invention relates to a zoom lens, in particular to a zoom lens with a bent optical path, and an image pickup apparatus equipped with such a zoom lens.

2. Description of the Related Art

Japanese Patent Application Laid-Open No. 2007-304195 discloses a zoom lens with a bent optical path. Two types of zoom lenses are disclosed in Japanese Patent Application Laid-Open No. 2007-304195. The zoom lens of one type includes, in order from the object side to the image side, a first lens unit having a positive refractive power, a second lens unit having a negative refractive power, a third lens unit having a positive refractive power, a fourth lens unit having a positive refractive power, and a fifth lens unit having a negative refractive power.

The zoom lens of the other type includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power. A zoom lens disclosed in Japanese Patent Application Laid-Open No. 2007-304195 has an angle of view equivalent to a focal length of 35 mm in the 135 format at the wide angle end and a zoom ratio of 7.

SUMMARY OF THE INVENTION

A zoom lens with a bent optical path according to a first aspect of the present invention comprises, in order from the object side to the image side,
a first lens unit having a positive refractive power;
a second lens unit having a negative refractive power; and
a rear lens unit group having a positive refractive power as a whole, wherein
the first lens unit comprises a reflecting member having a reflecting surface that reflects rays,
the rear lens unit group comprises, in order from the object side to the image side, a third lens unit having a positive refractive power, a fourth lens unit having a negative refractive power, and a fifth lens unit having a positive refractive power,
the total number of lens units in the rear lens unit group is three,
the distances between the lens units change during zooming from the wide angle end to the telephoto end, and the following conditional expressions (1A), (2A), (3A), and (4A) are satisfied:

$$0.1 < f_{1G}/f_T < 0.8 \tag{1A}$$

$$-0.5 < f_{2G}/f_T < -0.05 \tag{2A}$$

$$5.5 < \beta_{2T}/\beta_{2W} < 20 \tag{3A, and}$$

$$0.5 < \beta_{RT}/\beta_{RW} < 3 \tag{4A}$$

where $f_{1G}$ is the focal length of the first lens unit, $f_{2G}$ is the focal length of the second lens unit, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RT}$ is the lateral magnification of the rear lens unit group in the state in which the zoom lens is focused at the longest distance at the telephoto end, and $\beta_{RW}$ is the lateral magnification of the rear lens unit group in the state in which the zoom lens is focused at the longest distance at the wide angle end.

A zoom lens with a bent optical path according to second aspect of the present invention comprises, in order from the object side to the image side:
a first lens unit having a positive refractive power;
a second lens unit having a negative refractive power;
a rear lens unit group including a plurality of lens units and having a positive refractive power as a whole, wherein
the first lens unit comprises a reflecting member having a reflecting surface that reflects rays,
the reflecting member is a reflecting prism having an internal reflecting surface that constitutes the reflecting surface, an object side surface, which is an object side refracting surface, and an image side surface, which is an image side refracting surface,
the combined refractive power of the portion of the first lens unit that is located on the object side of the reflecting surface is negative,
the combined refractive power of the portion of the first lens unit that is located on the image side of the reflecting surface is positive,
the distances between the lens units change during zooming from the wide angle end to the telephoto end, and
the following conditional expressions (1A), (2A), (3A), and (16A) are satisfied:

$$0.1 < f_{1G}/f_T < 0.8 \tag{1A}$$

$$-0.5 < f_{2G}/f_T < -0.05 \tag{2A}$$

$$5.5 < \beta_{2T}/\beta_{2W} < 20 \tag{3A, and}$$

$$1.0 < f_W/IH_{max} < 1.43 \tag{16A}$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, and $IH_{max}$ is the image height in the zoom lens with a bent optical path or the highest image height in the case where the image height varies.

A zoom lens with a bent optical path according to a third aspect of the present invention comprises, in order from the object side to the image side:

a first lens unit having a positive refractive power;
a second lens unit having a negative refractive power;
a rear lens unit group including a plurality of lens units and having a positive refractive power as a whole, wherein the first lens unit comprises a reflecting member having a reflecting surface that reflects rays, the reflecting member is a reflecting prism having an internal reflecting surface that constitutes the reflecting surface, an object side surface, which is an object side refracting surface, and an image side surface, which is an image side refracting surface.

the combined refractive power of the portion of the first lens unit that is located on the object side of the reflecting surface is negative, the combined refractive power of the portion of the first lens unit that is located on the image side of the reflecting surface is positive, the rear lens unit group comprises, in order from the object side to the image side, an object side sub lens unit group and an image side lens unit in which all the gaps between the lens elements are constant, the distances between the lens units change during zooming from the wide angle end to the telephoto end, and the following conditional expressions (5A), (6A), (7A), and (8A) are satisfied:

$$0.1 < f_{1G}/f_T < 0.38 \quad (5A)$$

$$-0.18 < f_{2G}/f_T < -0.09 \quad (6A)$$

$$7 < (\beta_{2T} \times \beta_{RFT})/(\beta_{2W} \times \beta_{RFW}) < 20 \quad (7A), \text{ and}$$

$$2.1 < P/f_W < 3.1 \quad (8A)$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RFT}$ is the lateral magnification of the object side sub lens unit group in the state in which the zoom lens is focused at the longest distance at the telephoto end, $\beta_{RFW}$ is the lateral magnification of the object side sub lens unit group in the state in which the zoom lens is focused at the longest distance at the wide angle end, and P is the actual distance along the optical axis from the object side surface to the image side surface of the reflecting member in the first lens unit.

An image pickup apparatus comprises:

a zoom lens with a bent optical path according to any one of the first to third aspects of the present invention; and an image pickup element that is disposed on the image side of the zoom lens with a bent optical path and converts an optical image formed by the zoom lens with a bent optical path into an electrical signal.

A zoom lens with a bent optical path according to a fourth aspect of the present invention comprises, in order from the object side to the image side:

a first lens unit having a positive refractive power;
a second lens unit having a negative refractive power;
a third lens unit having a positive refractive power;
a fourth lens unit having a negative refractive power; and
a fifth lens unit having a positive refractive power, wherein the total number of lens units in the zoom lens with a bent optical path is five, the first lens unit comprises a reflecting member having a reflecting surface that reflects rays, the distances between the lens units change during zooming from the wide angle end to the telephoto end, the third lens unit comprises one cemented lens component comprising three lenses including a positive lens and a negative lens, the refractive surface closest to the object side and the refractive surface closest to the image side of the cemented lens component are convex surfaces, one negative lens in the cemented lens component is a biconcave lens, which has the smallest Abbe constant among the lenses in the cemented lens component.

An image pickup apparatus comprises:

a zoom lens with a bent optical path according to the fourth aspect of the present invention; and an image pickup element disposed on the image side of the zoom lens with a bent optical path and having an image pickup surface that receives an image formed by the zoom lens with a bent optical path.

BRIEF DESCRIPTION OF THE DRAWINGS

FIGS. 17A, 17B, 17C, 17D, 17E, 17F, 17G, 17H, 17I, 17J, 17K, and 17L show aberrations of the zoom lens according to the first embodiment in the state in which the zoom lens is focused on an object point at infinity;

FIGS. 18A, 18B, 18C, 18D, 18E, 18F, 18G, 18H, 18I, 18J, 18K, and 18L show aberrations of the zoom lens according to the second embodiment in the state in which the zoom lens is focused on an object point at infinity;

FIGS. 19A, 19B, 19C, 19D, 19E, 19F, 19G, 19H, 19I, 19J, 19K, and 19L show aberrations of the zoom lens according to the third embodiment in the state in which the zoom lens is focused on an object point at infinity;

FIGS. 20A, 20B, 20C, 20D, 20E, 20F, 20G, 20H, 20I, 20J, 20K, and 20L show aberrations of the zoom lens according to the fourth embodiment in the state in which the zoom lens is focused on an object point at infinity;

FIGS. 21A, 21B, 21C, 21D, 21E, 21F, 21G, 21H, 21I, 21J, 21K, and 21L show aberrations of the zoom lens according to the fifth embodiment in the state in which the zoom lens is focused on an object point at infinity;

FIGS. 22A, 22B, 22C, 22D, 22E, 22F, 22G, 22H, 22I, 22J, 22K, and 22L show aberrations of the zoom lens according to the sixth embodiment in the state in which the zoom lens is focused on an object point at infinity;

FIGS. 23A, 23B, 23C, 23D, 23E, 23F, 23G, 23H, 23I, 23J, 23K, and 23L show aberrations of the zoom lens according to the seventh embodiment in the state in which the zoom lens is focused on an object point at infinity;

FIGS. 24A, 24B, 24C, 24D, 24E, 24F, 24G, 24H, 24I, 24J, 24K, and 24L show aberrations of the zoom lens according to the eighth embodiment in the state in which the zoom lens is focused on an object point at infinity;

FIGS. 25A, 25B, 25C, 25D, 25E, 25F, 25G, 25H, 25I, 25J, 25K, and 25L show aberrations of the zoom lens according to the ninth embodiment in the state in which the zoom lens is focused on an object point at infinity;

FIGS. 26A, 26B, 26C, 26D, 26E, 26F, 26G, 26H, 26I, 26J, 26K, and 26L show aberrations of the zoom lens according to the tenth embodiment in the state in which the zoom lens is focused on an object point at infinity;

FIGS. 27A, 27B, 27C, 27D, 27E, 27F, 27G, 27H, 27I, 27J, 27K, and 27L show aberrations of the zoom lens according to the eleventh embodiment in the state in which the zoom lens is focused on an object point at infinity;

FIGS. 28A, 28B, 28C, 28D, 28E, 28F, 28G, 28H, 28I, 28J, 28K, and 28L show aberrations of the zoom lens according to the twelfth embodiment in the state in which the zoom lens is focused on an object point at infinity;

FIGS. 29A, 29B, 29C, 29D, 29E, 29F, 29G, 29H, 29I, 29J, 29K, and 29L show aberrations of the zoom lens according to the thirteenth embodiment in the state in which the zoom lens is focused on an object point at infinity;

FIGS. 30A, 30B, 30C, 30D, 30E, 30F, 30G, 30H, 30I, 30J, 30K, and 30L show aberrations of the zoom lens according to the fourteenth embodiment in the state in which the zoom lens is focused on an object point at infinity;

FIGS. 31A, 31B, 31C, 31D, 31E, 31F, 31G, 31H, 31I, 31J, 31K, and 31L show aberrations of the zoom lens according to the fifteenth embodiment in the state in which the zoom lens is focused on an object point at infinity;

FIGS. 32A, 32B, 32C, 32D, 32E, 32F, 32G, 32H, 32I, 32J, 32K, and 32L show aberrations of the zoom lens according to the sixteenth embodiment in the state in which the zoom lens is focused on an object point at infinity;

DETAILED DESCRIPTION OF THE INVENTION

Figure 1A:
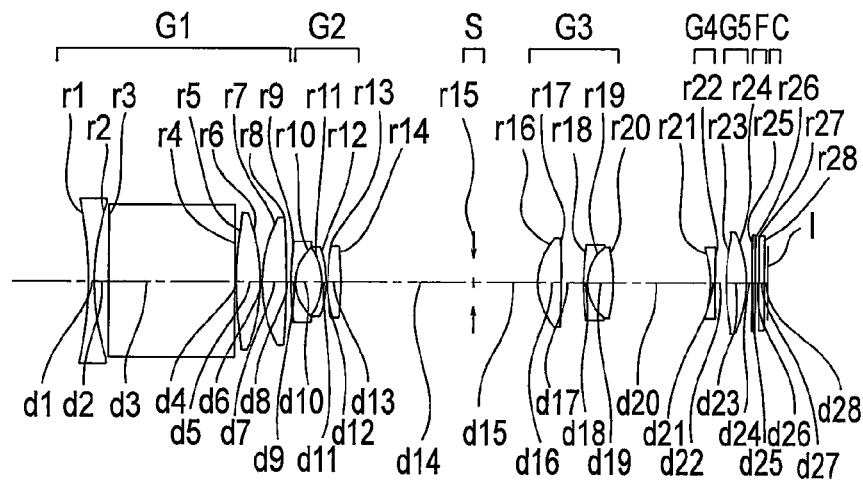
FIGS. 1A, 1B, and 1C are cross sectional views taken along the optical axis, showing the construction of a zoom lens with a bent optical path according to a first embodiment of the present invention in the state in which the zoom lens is focused on an object point at infinity, respectively at the wide angle end, in an intermediate focal length state, and at the telephoto end.

A zoom lens with a bent optical path according to a first mode of the invention comprises, in order from the object side to the image side, a first lens unit having a positive refractive power;

a second lens unit having a negative refractive power; and a rear lens unit group having a positive refractive power as a whole, wherein the first lens unit comprises a reflecting member having a reflecting surface that reflects rays, the rear lens unit group comprises, in order from the object side to the image side, a third lens unit having a positive refractive power, a fourth lens unit having a negative refractive power, and a fifth lens unit having a positive refractive power, the total number of lens units in the rear lens unit group is three, the distances between the lens units change during zooming from the wide angle end to the telephoto end, and the following conditional expressions (1A), (2A), (3A), and (4A) are satisfied:

$$0.1 < f_{1G}/f_T < 0.8 \quad (1A),$$

$$-0.5 < f_{2G}/f_T < -0.05 \quad (2A),$$

$$5.5 < \beta_{2T}/\beta_{2W} < 20 \quad (3A), \text{ and}$$

$$0.5 < \beta_{RT}/\beta_{RW} < 3 \quad (4A),$$

where $f_{1G}$ is the focal length of the first lens unit, $f_{2G}$ is the focal length of the second lens unit, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RT}$ is the lateral magnification of the rear lens unit group in the state in which the zoom lens is focused at the longest distance at the telephoto end, and $\beta_{RW}$ is the lateral magnification of the rear lens unit group in the state in which the zoom lens is focused at the longest distance at the wide angle end.

In the zoom lens with a bent optical path according to the first mode of the invention, the first lens unit and the second lens unit are designed to have an appropriate positive refractive power and an appropriate negative refractive power respectively. This enables the second lens unit having a negative refractive power to provide a sufficiently large magnification changing effect by its movement. In consequence, a zoom lens that is small in thickness and short in overall optical system length while having a high zoom ratio can be provided. The magnification changing effect may be represented in terms of an amount representing the change in the magnification such as the magnification change ratio, the magnification change rate or the magnification change amount.

In the zoom lens with a bent optical path according to the first mode of the invention, the rear lens unit group includes the third lens unit having a positive refractive power, the fourth lens unit having a negative refractive power, and the fifth lens unit having a positive refractive power. With this configuration, the diameters of the second, third and fourth lens units can be made small. Consequently, the overall size of the zoom lens including the mechanism for moving the lens units can be made small, even if these lens units are moved. In addition, the above-described configuration is advantageous for slimming of the thickness (along the direction from the object toward the image pickup apparatus) of the image pickup apparatus.

Increasing the proportion of the contribution of the rear lens unit group to the magnification changing effect while preventing an increase in the overall length of the zoom lens will lead to an increase in chromatic aberration generated in the rear lens unit group, in particular in chromatic aberration generated at the telephoto end of the zoom range. To avoid this, the zoom lens according to the first mode of the invention is configured to satisfy conditional expressions (1A), (2A), (3A), and (4A).

Conditional expression (1A) specifies a preferred range of the focal length of the first lens unit. If conditional expression (1A) is satisfied, the second lens unit can provide a magnification changing effect as needed and aberration generated in the first lens unit can be made small.

If the refractive power of the first lens unit is not excessively high so that the lower limit of conditional expression (1A) is reached, aberrations generated in the first lens unit can be made small, advantageously.

If the refractive power of the first lens unit is so high that the upper limit of conditional expression (1A) is not exceeded, the second lens unit can contribute to the magnification change sufficiently.

Conditional expression (2A) specifies a preferred range of the focal length of the second lens unit.

If the refractive power of the second lens unit is so high that the lower limit of conditional expression (2A) is reached, the second lens unit can contribute to the magnification change sufficiently.

If the refractive power of the second lens unit is not excessively high so that the upper limit of conditional expression (2A) is not exceeded, aberrations generated in the second lens unit can be made small, advantageously.

Conditional expression (3A) specifies a preferred range of the magnification change provided by the second lens unit.

If the magnification change provided by the second lens unit is so large that the lower limit of conditional expression (3A) is reached, an increase in axial chromatic aberration caused by an increase in the magnification change provided by the rear leans unit group can be controlled easily.

If the magnification change provided by the second lens unit is not excessively high so that the upper limit of conditional expression (3A) is not exceeded, astigmatism in the wide angle zoom range can be controlled easily.

Conditional expression (4A) specifies a preferred range of the magnification change provided by the rear lens unit group. If the lower limit of conditional expression (4A) is reached, an unduly high reduction by the rear lens unit group can be prevented. In consequence, the magnification that the second lens unit is required to provide can be made small, and the amount of movement of the second lens unit can be made small. This leads to a reduction in the size of the zoom lens or facilitates a reduction in aberrations by allowing a decrease in the refractive power of the second lens unit.

Not exceeding the upper limit of conditional expression (4A) facilitates a reduction in axial aberrations generated in the rear lens unit group and cost reduction by allowing a decrease in the number of lenses in the rear lens unit group.

With the above-described features, there can be provided a zoom lens with a bent optical path that is small in size and has excellent optical performance while having a sufficiently high zoom ratio.

A zoom lens with a bent optical path according to a second mode of the invention comprises, in order from the object side to the image side:

a first lens unit having a positive refractive power;

a second lens unit having a negative refractive power;

a rear lens unit group including a plurality of lens units and having a positive refractive power as a whole, wherein the first lens unit comprises a reflecting member having a reflecting surface that reflects rays, the reflecting member is a reflecting prism having an internal reflecting surface that constitutes the reflecting surface, an object side surface, which is an object side refracting surface, and an image side surface, which is an image side refracting surface, the combined refractive power of the portion of the first lens unit that is located on the object side of the reflecting surface is negative, the combined refractive power of the portion of the first lens unit that is located on the image side of the reflecting surface is positive, the distances between the lens units change during zooming from the wide angle end to the telephoto end, and the following conditional expressions (1A), (2A), (3A), and (16A) are satisfied:

$$0.1 < f_{1G}/f_T < 0.8 \quad (1A),$$

$$-0.5 < f_{2G}/f_T < -0.05 \quad (2A),$$

$$5.5 < \beta_{2T}/\beta_{2W} < 20 \quad (3A), \text{ and}$$

$$1.0 < f_W/IH_{max} < 1.43 \quad (16A),$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, and $IH_{max}$ is the image height in the zoom lens with a bent optical path or the highest image height in the case where the image height varies.

In the zoom lens with a bent optical path according to the second mode of the invention, the positive refractive power of the first lens unit and the negative refractive power of the second lens unit are sufficiently high, so that a sufficient magnification change is provided by the movement of the second lens unit having a negative refractive power. In consequence, a zoom lens with a bent optical path that has an appropriately high zoom ratio as a whole and is small in thickness and overall length is provided.

Here, the construction of the first lens unit will be described.

The combined refractive power of the portion of the first lens unit that is located on the object side of the internal reflecting surface is negative, and the combined refractive power of the portion of the first lens unit that is located on the image side of the internal reflecting surface is positive. In consequence, the first lens unit functions like a wide conversion lens. This is advantageous for achieving a large angle of view at the wide angle end. Moreover, constituting the reflecting member by a prism allows to make the length (equivalent distance in air) of the optical path in the prism short. This is advantageous for a reduction in the effective diameter of the zoom lens on the incidence side and for a reduction in the size of the zoom lens with respect to the thickness direction. In addition, the zoom lens is configured in such a way as to satisfy all of the above-mentioned conditional expressions.

Conditional expression (1A) specifies a preferred range of the focal length of the first lens unit.

If the refractive power of the first lens unit is not excessively high so that the lower limit of conditional expression (1A) is reached, aberrations generated in the first lens unit can be made small, advantageously.

If the refractive power of the first lens unit is so high that the upper limit of conditional expression (1A) is not exceeded, the second lens unit can contribute to the magnification change sufficiently.

Conditional expression (2A) specifies a preferred range of the focal length of the second lens unit.

If the refractive power of the second lens unit is so high that the lower limit of conditional expression (2A) is reached, the second lens unit can contribute to the magnification change sufficiently.

If the refractive power of the second lens unit is not excessively high so that the upper limit of conditional expression (2A) is not exceeded, aberrations generated in the second lens unit can be made small, advantageously.

Conditional expression (3A) specifies a preferred range of the magnification change provided by the second lens unit.

If the magnification change provided by the second lens unit is so large that the lower limit of conditional expression (3A) is reached, an increase in axial chromatic aberration caused by an increase in the magnification change provided by the rear lens unit group can be controlled easily.

If the magnification change provided by the second lens unit is not excessively high so that the upper limit of conditional expression (3A) is not exceeded, astigmatism in the wide angle zoom range can be controlled easily.

Conditional expression (16A) specifies a preferred range of the focal length of the zoom lens with a bent optical path at the wide angle end.

If the lower limit of conditional expression (16A) is reached, the effective diameter of the first lens unit at the wide angle end of the zoom range can be made small, and the size of the prism can be made appropriately small. This leads to a reduction in the size of the zoom lens.

If the upper limit of conditional expression (16A) is not exceeded so that the focal length of the zoom lens at the wide angle end is not so long, the brightness (or speed) of the zoom lens at the telephoto end can easily be made high while achieving a high zoom ratio. Then, it is not necessary to make the effective diameter of the first lens unit large for the sake of brightness. Consequently, the zoom lens can be made small.

With the above-described features, there can be provided a zoom lens with a bent optical path that is small in size and has a sufficiently wide angle of view at the wide angle end while having a sufficiently high zoom ratio.

A zoom lens with a bent optical path according to a third mode of the invention comprises, in order from the object side to the image side:

a first lens unit having a positive refractive power;

a second lens unit having a negative refractive power;

a rear lens unit group including a plurality of lens units and having a positive refractive power as a whole, wherein the first lens unit comprises a reflecting member having a reflecting surface that reflects rays, the reflecting member is a reflecting prism having an internal reflecting surface that constitutes the reflecting surface, an object side surface, which is an object side refracting surface, and an image side surface, which is an image side refracting surface.

the combined refractive power of the portion of the first lens unit that is located on the object side of the reflecting surface is negative, the combined refractive power of the portion of the first lens unit that is located on the image side of the reflecting surface is positive, the rear lens unit group comprises, in order from the object side to the image side, an object side sub lens unit group and an image side lens unit in which all the gaps between the lens elements are constant, the distances between the lens units change during zooming from the wide angle end to the telephoto end, and the following conditional expressions (5A), (6A), (7A), and (8A) are satisfied:

$$0.1 < f_{1G}/f_T < 0.38 \quad (5A)$$

$$-0.18 < f_{2G}/f_T < -0.09 \quad (6A)$$

$$7 < (\beta_{2T} \times \beta_{RFT})/(\beta_{2W} \times \beta_{RFW}) < 20 \quad (7A), \text{ and}$$

$$2.1 < P/f_W < 3.1 \quad (8A),$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RFT}$ is the lateral magnification of the object side sub lens unit group in the state in which the zoom lens is focused at the longest distance at the telephoto end, $\beta_{RFW}$ is the lateral magnification of the object side sub lens unit group in the state in which the zoom lens is focused at the longest distance at the wide angle end, and P is the actual distance along the optical axis from the object side surface to the image side surface of the reflecting member in the first lens unit.

In the zoom lens with a bent optical path according to the third mode of the invention, the positive refractive power of the first lens unit and the negative refractive power of the second lens unit are sufficiently high, so that a sufficient magnification change is provided by the movement of the second lens unit having a negative refractive power. In consequence, a zoom lens with a bent optical path that has an appropriately high zoom ratio as a whole and is small in thickness and overall length is provided.

Here, the construction of the first lens unit will be described.

The combined refractive power of the portion of the first lens unit that is located on the object side of the internal reflecting surface is negative, and the combined refractive power of the portion of the first lens unit that is located on the image side of the internal reflecting surface is positive. In consequence, the first lens unit functions like a wide conversion lens. This is advantageous for achieving a large angle of view at the wide angle end. Moreover, constituting the reflecting member by a prism allows to make the length (equivalent distance in air) of the optical path in the prism short. This is advantageous for a reduction in the effective diameter of the zoom lens on the incidence side and for a reduction in the size of the zoom lens with respect to the thickness direction.

In addition, the zoom lens is configured in such a way as to satisfy all of the above-mentioned conditional expressions.

Conditional expression (5A) specifies a preferred range of the focal length of the first lens unit. Conditional expression (5A) further limits the upper bound of conditional expression (1A).

If the refractive power of the first lens unit is not excessively high so that the lower limit of conditional expression (5A) is reached, aberrations generated in the first lens unit can be made small, advantageously.

If the refractive power of the first lens unit is so high that the upper limit of conditional expression (5A) is not exceeded, the second lens unit can contribute to the magnification change sufficiently.

Conditional expression (6A) specifies a preferred range of the focal length of the second lens unit. Conditional expression (6A) further limits the lower bound of conditional expression (2A).

If the refractive power of the second lens unit is so high that the lower limit of conditional expression (6A) is reached, the second lens unit can contribute to the magnification change sufficiently.

If the refractive power of the second lens unit is not excessively high so that the upper limit of conditional expression (6A) is not exceeded, aberrations generated in the second lens unit can be made small, advantageously.

Conditional expression (7A) specifies a preferred range of the magnification change of the combined optical system made up of the second lens unit and the object side sub lens unit group.

The contribution of the combined optical system made up of the second lens unit and the object side sub lens unit group to the magnification change is designed to be so high that the lower limit of conditional expression (7A) is reached. Consequently, the contribution of the image side lens unit to the magnification change may be made small, and the driving mechanism for zooming can be prevented from becoming complex.

Not exceeding the upper limit of conditional expression (7A) facilitates a reduction in the contribution of the rear lens unit group to the magnification change, which in turn facilitates a reduction in variation in axial chromatic aberration.

Conditional expression (8A) specifies a preferred range concerning the size of the prism in the first lens unit.

If the size of the prism is so large that the lower limit of conditional expression (8A) is reached, the peripheral light quantity can be kept high advantageously while achieving a wide angle of view and a high zoom ratio.

If the size of the prism is so small that the upper limit of conditional expression (8A) is not exceeded, the size of the zoom lens can be made small.

With the above-described features, there can be provided a zoom lens with a bent optical path that is small in size and has a sufficiently wide angle of view at the wide angle end while having a sufficiently high zoom ratio.

According to a preferred mode of the present invention, it is desirable that the object side sub lens unit group include a plurality of lens units that move during zooming from the wide angle end to the telephoto end.

According to a preferred mode of the present invention, it is desirable that the object side sub lens unit group include a positive lens unit and a negative lens unit that move with a varying distance therebetween during zooming from the wide angle end to the telephoto end.

These features are advantageous for achieving a high zoom ratio.

It is more preferred that both of the above two features be adopted in combination.

It is also preferred that one or plurality of the features described in the following be adopted in combination.

A according to a preferred mode of the present invention, in the zoom lens with a bent optical path, the first lens unit consists of the reflecting member, an object side sub lens unit having a negative refractive power located on the object side of the reflecting member, and an image side sub lens unit having a positive refractive power located on the image side of the reflecting member, the object side sub lens unit consisting of one negative lens having a concave surface facing the image side, and the image side sub lens unit consisting of two positive lenses.

With the above-described construction, the first lens unit has a lens configuration similar to a wide conversion lens, which is advantageous for achieving a large angle of view at the wide angle end. In addition, this lens configuration allows the first lens unit to have a sufficient positive refractive power as needed while leaving a space in which the reflecting member is provided. This is advantageous for a reduction in the size of the first lens unit and facilitates a reduction in the size of the zoom lens with respect to the thickness direction.

According to a preferred mode of the present invention, the zoom lens with a bent optical path satisfies the following conditional expression (9A):

$$1.2 < P/f_w < 5 \quad (9A)$$

where, $f_w$ is the focal length of the entire zoom lens system at the wide angle end in the state in which the zoom lens is focused at the longest distance, and P is the actual distance along the optical axis from the object side surface to the image side surface of the reflecting member in the first lens unit.

Reaching the lower limit of conditional expression (9A) facilitates preparing a space in which the reflecting member is provided and achieving a sufficiently wide angle of view with sufficient peripheral light quantity.

Not exceeding the upper limit of conditional expression (9A) allows a reduction in the size of the reflecting member and facilitates a reduction in the size of the zoom lens with respect to the thickness direction.

According to a preferred mode of the present invention, in the zoom lens with a bent optical path, the first lens unit comprises an object side sub lens unit having a negative refractive power located on the object side of the reflecting member and an image side sub lens unit having a positive refractive power located on the image side of the reflecting member, the object side sub lens unit including a negative lens and the image side sub lens unit including two positive lenses, and the zoom lens satisfies the following conditional expressions (10A) and (11A):

$$20 < |\nu_{d1} - \nu_{d2}| < 70 \quad (10A), \text{ and}$$

$$20 < |\nu_{d1} - \nu_{d3}| < 70 \quad (11A)$$

where $\nu_{d1}$ is the Abbe constant with respect to the d-line of the negative lens located closest to the object side in the first lens unit, $\nu_{d2}$ is the Abbe constant with respect to the d-line of the object side positive lens in the image side sub lens unit in the first lens unit, and $\nu_{d3}$ is the Abbe constant with respect to the d-line of the image side positive lens in the image side sub lens unit in the first lens unit.

In the optical system having a high zoom ratio and short overall optical length, if the Abbe constants are so large that the lower limits of conditional expressions (10A) and (11A) are reached, chromatic aberration of magnification generated by the negative lens located closest to the object side in the first lens unit can efficiently be made small.

If the upper limits of conditional expressions (10A) and (11A) are not exceeded, a decrease in the workability of the materials used in combination can be prevented. In addition, cost effectiveness will be improved.

According to a preferred mode of the present invention, in the zoom lens with a bent optical path, the second lens unit comprises, in order from the object side to the image side, a first negative meniscus lens, a second negative meniscus lens, and a positive lens, and the first negative meniscus lens and the second negative meniscus lens satisfy the following conditional expressions (12A) and (13A):

$$1 < SF_{21} \quad (12A), \text{ and}$$

$$SF_{22} < -1 \quad (13A),$$

where $SF_{21}$ is the shape factor of the first negative meniscus lens defined by the following equation:

$$SF_{21} = (R_{21} + R_{22})/(R_2 - R_{22}),$$

where $R_{21}$ is the paraxial radius of curvature of the object side surface of the first negative meniscus lens, $R_{22}$ is the paraxial radius of curvature of the image side surface of the first negative meniscus lens, and $SF_{22}$ is the shape factor of the second negative meniscus lens defined by the following equation:

$$SF_{22} = (R_{23} + R_{24})/(R_{23} - R_{24}),$$

where $R_{23}$ is the paraxial radius of curvature of the object side surface of the second negative meniscus lens, $R_{24}$ is the paraxial radius of curvature of the image side surface of the second negative meniscus lens.

If the lower limit of conditional expression (12A) is reached and the upper limit of conditional expression (13A) is not exceeded, correction of coma in the wide angle zoom range and correction of curvature of field in the entire zoom range will be facilitated.

According to a preferred mode of the present invention, in the zoom lens with a bent optical path, the rear lens unit group comprises a lens unit having a negative refractive power comprising a cemented lens made up of a positive lens and a negative lens that are cemented together, and the following conditional expression (14A) is satisfied:

$$0.1 < |n_{d1} - n_{d2}| < 0.5 \quad (14A),$$

where $n_{d1}$ is the refractive index for the d-line of the positive lens in the cemented lens, and $n_{d2}$ is the refractive index for the d-line of the negative lens in the cemented lens.

Having a cemented lens in the fourth lens unit and using two lenses whose refractive index difference satisfies the conditional expression (14A) facilitates correction of curvature of field.

If the lower limit of conditional expression (14A) is reached, the lenses have a sufficient difference in the refractive indices. This facilitates correction of curvature of field.

If the upper limit of conditional expression (14A) is not exceeded, a decrease in the workability of the materials used in combination can be prevented. In addition, cost effectiveness will be improved.

According to a preferred mode of the present invention, in the zoom lens with a bent optical path, the rear lens unit group comprises, in order from the object side to the image side, a positive lens unit group comprising one or two lens units each having a positive refractive power, a negative lens unit having a negative refractive power, and a positive lens unit having a positive refractive power, wherein the distances between the lens units change during zooming from the wide angle end to the telephoto end.

Overall beams are diverged by the lens unit having a negative refractive power located on the image side of the one or two lens units each having a positive refractive power and then converged by the image side lens unit having a positive refractive power. This facilitates making the overall diameter of the zoom lens smaller and slimming the zoom lens while maintaining good telecentricity on the image side.

According to a preferred mode of the present invention, in the zoom lens with a bent optical path, it is preferred that the following conditional expression (15A) be satisfied:

$$0.25 < (\beta_{RNT}/\beta_{RNW})/(\beta_{RPFT}/\beta_{RPFW}) < 7 \quad (15A),$$

where $\beta_{RNT}$ is the lateral magnification of the negative lens unit in the rear lens unit group in the state in which the zoom lens is focused at the longest distance at the telephoto end, $\beta_{RNW}$ is the lateral magnification of the negative lens unit in the rear lens unit group in the state in which the zoom lens is focused at the longest distance at the wide angle end, $\beta_{RPFT}$ is the lateral magnification of the positive lens unit group in the rear lens unit group in the state in which the zoom lens is focused at the longest distance at the telephoto end, and $\beta_{RPFW}$ is the lateral magnification of the positive lens unit group in the rear lens unit group in the state in which the zoom lens is focused at the longest distance at the wide angle end.

Conditional expression (15A) specifies a preferred range of the ratio of the magnification change provided by the positive lens unit group in the rear lens unit group and the magnification change provided by the negative lens unit in the rear lens unit group.

If the magnification change provided by the negative lens unit is so large that the lower limit of conditional expression (15A) is reached, an increase in the zoom ratio can be facilitated.

If the magnification change provided by the negative lens unit is not excessively large so that the upper limit of conditional expression (15A) is not exceeded, correction of axial chromatic aberration and chromatic aberration of magnification can be facilitated.

According to a preferred mode of the present invention, it is desirable that the lens unit having a negative refractive power in the rear lens unit group include one single lens or one cemented lens and move for focusing and that the positive lens unit on the image side of the negative lens unit in the rear lens unit group be fixed during zooming.

The above features allow a reduction in the diameter and weight of the lens unit moved for focusing. This facilitates the installation of the driving mechanism and is advantageous for slimming of the zoom lens including the mechanisms.

According to the present invention, there can be provided an image pickup apparatus having the zoom lens with a bent optical path described above and an image pickup element disposed on the image side of the zoom lens with a bent optical path to convert an optical image formed by the zoom lens with a bent optical path into an electrical signal.

Thus, there can be provided a slim image pickup apparatus with well corrected aberrations while having a large angle of view and high zoom ratio.

It is more preferred that the conditional expressions described in the foregoing be further limited as follows. With the following further limitations, the advantageous effects described with the respective conditional expressions can be achieved more effectively.

It is more preferred that the lower limit value in conditional expression (1A) be 0.15, still more preferably 0.2, still more preferably 0.23.

It is more preferred that the upper limit value in conditional expression (1A) be 0.7, still more preferably 0.5, still more preferably 0.32.

It is more preferred that the lower limit value in conditional expression (2A) be −0.4, still more preferably −0.3, still more preferably −0.18.

It is more preferred that the upper limit value in conditional expression (2A) be −0.07, still more preferably −0.1, still more preferably −0.11, still more preferably −0.12.

It is more preferred that the lower limit value in conditional expression (3A) be 6, still more preferably 6.5, still more preferably 7, still more preferably 7.5.

It is more preferred that the upper limit value in conditional expression (3A) be 17, still more preferably 15, still more preferably 13.

It is more preferred that the lower limit value in conditional expression (4A) be 0.6, still more preferably 0.7, still more preferably 0.8.

It is more preferred that the upper limit value in conditional expression (4A) be 2.5, still more preferably 2, still more preferably 1.5.

It is more preferred that the lower limit value in conditional expression (5A) be 0.15, still more preferably 0.2, still more preferably 0.23.

It is more preferred that the upper limit value in conditional expression (5A) be 0.36, still more preferably 0.34, still more preferably 0.32.

It is more preferred that the lower limit value in conditional expression (6A) be −0.175, still more preferably −0.17, still more preferably −0.16.

It is more preferred that the upper limit value in conditional expression (6A) be −0.1, still more preferably −0.11, still more preferably −0.12, still more preferably −0.13.

It is more preferred that the lower limit value in conditional expression (7A) be 7.5, still more preferably 8, still more preferably 8.5, more preferably 9.

It is more preferred that the upper limit value in conditional expression (7A) be 17, still more preferably 14, still more preferably 12.

It is more preferred that the lower limit value in conditional expression (8A) be 2.2, still more preferably 2.3.

It is more preferred that the upper limit value in conditional expression (8A) be 3, still more preferably 2.9, still more preferably 2.8.

It is more preferred that the lower limit value in conditional expression (9A) be 1.5, still more preferably 1.8, still more preferably 2.1, still more preferably 2.3.

It is more preferred that the upper limit value in conditional expression (9A) be 4, still more preferably 3.5, still more preferably 3, still more preferably 2.8.

It is more preferred that the lower limit value in conditional expression (10A) be 25, still more preferably 30, still more preferably 35, still more preferably 40.

It is more preferred that the upper limit value in conditional expression (10A) be 66, still more preferably 62, still more preferably 58.

It is more preferred that the lower limit value in conditional expression (11A) be 23, still more preferably 26, still more preferably 29.

It is more preferred that the upper limit value in conditional expression (11A) be 65, still more preferably 60, still more preferably 55, still more preferably 50.

It is more preferred that the lower limit value in conditional expression (12A) be 1.1, still more preferably 1.15.

It is preferred that an upper limit of 10 be set for conditional expression (12A). If this upper limit is not exceeded, the first negative meniscus lens can easily be designed to have an appropriate negative refractive power. Then, the second lens unit can have an appropriate refractive power.

It is more preferred that the upper limit value in conditional expression (12A) be 5.0, still more preferably 3.6, still more preferably 1.6.

It is more preferred that a lower limit of −10 be set for conditional expression (13A). If this lower limit is reached, the first negative meniscus lens can easily be designed to have an appropriate negative refractive power. Then, the second lens unit can have an appropriate refractive power.

It is more preferred that the lower limit value in conditional expression (13A) be −5.0, still more preferably −3.6.

It is more preferred that the upper limit value in conditional expression (13A) be −1.1, still more preferably −1.15, still more preferably −1.25.

It is more preferred that the lower limit value in conditional expression (14A) be 0.15, still more preferably 0.2, still more preferably 0.25.

It is more preferred that the upper limit value in conditional expression (14A) be 0.45, still more preferably 0.4, still more preferably 0.35, still more preferably 0.32.

It is more preferred that the lower limit value in conditional expression (15A) be 0.5, still more preferably 1, still more preferably 1.5, still more preferably 2.

It is more preferred that the upper limit value in conditional expression (15A) be 6, still more preferably 5, still more preferably 4, still more preferably 3.5.

It is more preferred that the lower limit value in conditional expression (16A) be 1.05, still more preferably 1.1, still more preferably 1.2.

It is more preferred that the upper limit value in conditional expression (16A) be 1.38, still more preferably 1.34, still more preferably 1.3.

A zoom lens with a bent optical path according to a fourth mode of the invention comprises, in order from the object side to the image side:

a first lens unit having a positive refractive power;
a second lens unit having a negative refractive power;
a third lens unit having a positive refractive power;
a fourth lens unit having a negative refractive power; and
a fifth lens unit having a positive refractive power, wherein
the total number of lens units in the zoom lens with a bent optical path is five,
the first lens unit comprises a reflecting member having a reflecting surface that reflects rays,
the distances between the lens units change during zooming from the wide angle end to the telephoto end,
the third lens unit comprises one cemented lens component comprising three lenses including a positive lens and a negative lens,
the refractive surface closest to the object side (or the frontmost refractive surface) and the refractive surface closest to the image side (or the rearmost refractive surface) of the cemented lens component are convex surfaces,
one negative lens in the cemented lens component is a biconcave lens, which has the smallest Abbe constant among the lenses in the cemented lens component.

In the zoom lens with a bent optical path according to the fourth mode of the invention, the first lens unit having a positive refractive power, the second lens unit having a negative refractive power, the third lens unit having a positive refractive power, the fourth lens unit having a negative refractive power, and the fifth lens unit having a positive refractive power are arranged in order from the object side to the image side. With this arrangement, the forth lens unit refracts off-axis rays in directions away from the optical axis, and then the fifth lens unit refracts the rays in such a way as to shift the exit pupil away from the image plane. This facilitates a reduction in the effective diameter of the second to fourth lens units while making the position of the exit pupil more distant from the image plane. The zoom lens according to this mode of the invention has a reflecting surface in the first lens unit. This is advantageous for a reduction in the size of the image pickup apparatus with respect to the thickness direction, because the overall size of the zoom lens including the mechanism for moving the subsequent movable lens units can be made small.

If the third unit having a positive refractive power is designed to provide a substantial magnification changing effect, aberration variation (in particular variation in chromatic aberration) tends to occur in the third lens unit.

In view of this, one cemented lens component made up of a three lenses including a positive lens and a negative lens is used in the third lens unit having a positive refractive power. This is advantageous for a reduction of aberration variation caused by the magnification change provided by the third lens unit.

Especially, since one negative lens in the cemented lens component is a biconcave lens having a small Abbe constant, a reduction of spherical aberration including chromatic aberration and adjustment of the Petzval sum are facilitated.

Moreover, the cemented lens component in the third lens unit has a biconvex shape, which is advantageous for correction of aberrations. In addition, the object side surface and the image side surface contribute to the positive refractive power. This configuration is advantageous for correction of aberrations. In this type of configuration, the angle of off-axis beams exiting from the cemented lens component with respect to the optical axis tends to be small. In the present invention, the angle of the off-axis beams relative to the optical axis is enlarged by the effect of the negative refractive power of the fourth lens unit. This enables to achieve both a size reduction and improvement in optical performance.

With the above configuration, there can be provided a zoom lens with a bent optical path that is small in size and has excellent optical performance while having an appropriately high zoom ratio.

In the case where the zoom lens has the focusing function, the features described in the foregoing should be interpreted as those for the state in which the zoom lens is focused at the longest distance. This also applies to the apparatuses according the other modes of the invention that will be described later.

It is more preferred that the apparatus according to the above mode of the present invention further have one or more of the features described in the following.

According to a preferred mode of the present invention, the zoom lens with a bent optical path satisfies the following conditional expression (1B):

$$7<(\beta_{2T}\times\beta_{3T}\times\beta_{4T})/(\beta_{2W}\times\beta_{3W}\times\beta_{4W})<20 \quad (1B),$$

where $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{3T}$ is the lateral magnification of the third lens unit in the state in which the zoom lens is focused at the longest distance at the telephoto end, $\beta_{3W}$ is the lateral magnification of the third lens unit in the state in which the zoom lens is focused at the longest distance at the wide angle end, $\beta_{4T}$ is the lateral magnification of the fourth lens unit in the state in which the zoom lens is focused at the longest distance at the telephoto end, and $\beta_{4W}$ is the lateral magnification of the fourth lens unit in the state in which the zoom lens is focused at the longest distance at the wide angle end.

Conditional expression (1B) specifies a preferred range of the magnification change provided by the combined system made up of the second to fourth lens units.

If the contribution of the combined system made up of the second to fourth lens units to the magnification change is so large that the lower limit of conditional expression (1B) is reached, the zoom lens can have an appropriately high zoom ratio advantageously.

If the upper limit of conditional expression (1B) is not exceeded, the contribution of the third lens unit and the fourth lens unit to the magnification change can be made small. This facilitates control of variation in axial chromatic aberration.

According to a preferred mode of the present invention, in the zoom lens with a bent optical path, the third lens unit comprises, in order from the object side to the image side, a positive lens component having a positive refractive power and the cemented lens component, and the cemented lens component has a negative refractive power as a whole.

Here, the term "lens component" refers to a lens block whose surfaces that are in contact with air on the optical axis include only two surfaces or an object side surface and an image side surface. The lens component is either a single lens element or a cemented lens.

The above configuration enables the third lens unit to have an appropriate positive refractive power. In addition, the object side principal point of the third lens unit can be made closer to the object side. Thus, the magnification changing effect relative to the amount of change in the distance between the second lens unit and the third lens unit in the zoom range near the telephoto end can readily be made large. This is advantageous for achieving both size reduction and high zoom ratio.

According to a preferred mode of the present invention, the zoom lens with a bent optical path satisfies the following conditional expression (2B):

$$-0.9 < f_{3GF}/f_{3GR} < -0.1 \quad (2B),$$

where $f_{3GF}$ is the focal length of the positive lens component in the third lens unit, and $f_{3GR}$ is the focal length of the cemented lens component in the third lens unit.

Conditional expression (2B) specifies a preferred condition for achieving excellent optical performance while achieving the effect of making the principal point of the third lens unit closer to the object side.

It is preferred that the refractive power of the positive lens component in the third lens unit be so high that the lower limit of conditional expression (2B) is reached. This is advantageous in making the principal point of the third lens unit closer to the object side and in allowing the third lens unit to have an appropriately high magnification change ratio.

It is preferred that the power of the positive lens component in the third lens unit be so limited that the upper limit of conditional expression (2B) is not exceeded. This is advantageous for correction of aberrations.

According to a preferred mode of the present invention, in the zoom lens with a bent optical path, the cemented lens component in the third lens unit satisfies the following conditional expression (3B):

$$15 < \nu_{Pmax} - \nu_{Nmin} < 70 \quad (3B),$$

where $\nu_{Pmax}$ is the largest Abbe constant of the positive lens (es) in the cemented lens component, and $\nu_{Nmin}$ is the smallest Abbe constant of the negative lens(es) in the cemented lens component.

If the difference in the Abbe constants of the lenses in the cemented lens component is so large that the lower limit of conditional expression (3B) is reached, chromatic aberration of magnification generated in the third lens unit can be controlled efficiently.

If the upper limit of conditional expression (3B) is not exceeded, deterioration in workability of the lens materials used in combination can be prevented. This is cost effective.

According to a preferred mode of the present invention, in the zoom lens with a bent optical path, the cemented lens component consists of three lenses including, in order from the object side to the image side, a first positive lens convex toward the object side, a negative lens, and a second positive lens.

If the lens closest to the object side in the cemented lens component is a positive lens, the principal point of the third lens unit can be made closer to the object side. This is advantageous for making the magnification change ratio of the third lens unit large.

If the second lens in the cemented lens component is a negative lens, chromatic aberration generated in the third lens unit can be controlled efficiently.

If the lens closest to the image side in the cemented lens component is a positive lens, the positive refractive power can be distributed to this positive lens and the positive lens closest to the object side in the cemented lens component. This is advantageous for correction of aberrations.

Moreover, cementing the three lenses together enables efficient correction of aberrations such as chromatic aberration while keeping the thickness of the third lens unit along the optical axis small.

According to a preferred mode of the present invention, in the zoom lens with a bent optical path, the cemented lens component satisfies the following conditional expression (4B):

$$0.05 < f_N/f_{CL} < 0.8 \quad (4B),$$

where $f_N$ is the focal length of the negative lens in the cemented lens component itself, and $f_{CL}$ is the focal length of the cemented lens component.

If the refractive power of the negative lens itself is so low that the lower limit of conditional expression (4B) is reached, the curvature of the lens surfaces of the negative lens can be made low. This facilitates a reduction of the manufacturing cost.

If the refractive power of the negative lens itself is so high that the upper limit of conditional expression (4B) is not exceeded, chromatic aberration in the third lens unit can be controlled efficiently.

According to a preferred mode of the present invention, in the zoom lens with a bent optical path, the cemented lens satisfies the following conditional expression (5B):

$$-0.9 < (R_{OCL} + R_{ICL})/(R_{OCL} - R_{ICL}) < 0.5 \quad (5B),$$

where $R_{OCL}$ is the paraxial radius of curvature of the object side surface of the cemented lens component, $R_{ICL}$ is the paraxial radius of curvature of the image side surface of the cemented lens component.

If the refractive power of the object side convex surface is not excessively high so that the lower limit of conditional expression (5B) is reached, the curvature of the surfaces of the negative lens that provides aberration correction can be made low. This facilitates a reduction of the manufacturing cost.

If the refractive power of the image side convex surface is not excessively high so that the upper limit of conditional expression (5B) is not exceeded, the principal point of the third lens unit can easily be made closer to the object side. Then, an appropriately high zoom ratio can readily be achieved.

According to a preferred mode of the present invention, in the zoom lens with a bent optical path, the third lens unit and the fourth lens unit satisfies the following conditional expression (6B):

$$-4 < f_{3G}/f_{4G} < -0.1 \tag{6B}$$

where $f_{3G}$ is the focal length of the third lens unit, and $f_{4G}$ is the focal length of the fourth lens unit.

The fourth lens unit provides the effect of refracting off-axis rays in directions away from the optical axis. This contributes to correction of curvature of field as well as reduction in the size of the zoom lens. To this end, it is preferred that the negative refractive power of the fourth lens unit be so high that the upper limit of conditional expression (6B) is not exceeded.

On the other hand, it is preferred that the negative refractive power of the fourth lens unit is not excessively high so that the lower limit of conditional expression (6B) is reached, thereby facilitating a reduction of chromatic aberration caused by decentering of the fourth lens unit.

According to a preferred mode of the present invention, the zoom lens with a bent optical path satisfies the following conditional expressions (7B), (8B), and (9B):

$$1.5 < \beta_{2T}/\beta_{2W} < 8 \tag{7B}$$

$$1.5 < \beta_{3T}/\beta_{3W} < 8 \tag{8B, and}$$

$$1 < \beta_{4T}/\beta_{4W} < 5 \tag{9B}$$

where $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{3T}$ is the lateral magnification of the third lens unit in the state in which the zoom lens is focused at the longest distance at the telephoto end, $\beta_{3W}$ is the lateral magnification of the third lens unit in the state in which the zoom lens is focused at the longest distance at the wide angle end, $\beta_{4T}$ is the lateral magnification of the fourth lens unit in the state in which the zoom lens is focused at the longest distance at the telephoto end, and $\beta_{4W}$ is the lateral magnification of the fourth lens unit in the state in which the zoom lens is focused at the longest distance at the wide angle end.

Conditional expressions (7B), (8B), and (9B) specify preferred ranges of the magnification changes provided by the second, third and fourth lens units respectively.

It is preferred that the magnification changes provided by the respective lens units be so large that the lower limits of conditional expressions (7B), (8B), and (9B) are reached and so small that the upper limits of conditional expressions (7B), (8B), and (9B) are not exceeded. Then, size reduction and excellent optical performance can both be achieved.

According to a preferred mode of the present invention, in the zoom lens with a bent optical path, the reflecting member is a reflecting prism having an internal reflecting surface that constitutes the reflecting surface, an object side surface, which is an object side refracting surface, and an image side surface, which is an image side refracting surface, the combined refractive power of the portion of the first lens unit that is located on the object side of the reflecting surface is negative, the combined refractive power of the portion of the first lens unit that is located on the image side of the reflecting surface is positive, and the zoom lens satisfies the following conditional expression (10B):

$$1.2 P/f_w < 5 \tag{10B}$$

where, $f_W$ is the focal length of the entire zoom lens system at the wide angle end in the state in which the zoom lens is focused at the longest distance, and P is the actual distance along the optical axis from the object side surface to the image side surface of the reflecting member in the first lens unit.

Reaching the lower limit of conditional expression (10B) facilitates preparing a space in which the reflecting member is provided and achieving a sufficiently wide angle of view with sufficient peripheral light quantity.

Not exceeding the upper limit of conditional expression (10B) allows a reduction in the size of the reflecting member and facilitates a reduction in the size of the zoom lens with respect to the thickness direction.

An image pickup apparatus according to the present invention comprises a zoom lens with a bent optical path according to any one of the above-described modes, and an image pickup element disposed on the image side of the zoom lens with a bent optical path and having an image pickup surface that receives an image formed by the zoom lens with a bent optical path.

In conditional expression (1B), it is more preferred that the lower limit value be 7.5, still more preferably 8, still more preferably 8.5, still more preferably 9 and that the upper limit value be 17, still more preferably 14, still more preferably 12.

In conditional expression (2B), it is more preferred that the lower limit value be −7, still more preferably −5, still more preferably −4 and that the upper limit value be −0.15, still more preferably −0.2, still more preferably −0.25.

In conditional expression (3B), it is more preferred that the lower limit value be 20, still more preferably 25, still more preferably 30, still more preferably 35 and that the upper limit value be 60, still more preferably 55, still more preferably 50.

In conditional expression (4B), it is more preferred that the lower limit value be 0.06, still more preferably 0.07 and that the upper limit value be 0.6, still more preferably 0.4, still more preferably 0.2.

In conditional expression (5B), it is more preferred that the lower limit value be −0.7, still more preferably −0.6, still more preferably −0.5 and that the upper limit value be 0.3, still more preferably 0.1, still more preferably −0.1.

In conditional expression (6B), it is more preferred that the lower limit value be −3, still more preferably −2, still more preferably −1.7 and that the upper limit value be −0.4, still more preferably −0.7, still more preferably −1.0, still more preferably −1.3.

In conditional expression (7B), it is more preferred that the lower limit value be 1.8, still more preferably 2.1, still more preferably 2.5 and that the upper limit value be 6, still more preferably 5, still more preferably 4, still more preferably 3.

In conditional expression (8B), it is more preferred that the lower limit value be 1.8, still more preferably 2.1, still more preferably 2.5 and that the upper limit value be 6, still more preferably 5, still more preferably 4, still more preferably 3.

In conditional expression (9B), it is more preferred that the lower limit value be 1.1, still more preferably 1.2 and that the upper limit value be 4, still more preferably 3, still more preferably 2, still more preferably 1.5.

In conditional expression (10B), it is more preferred that the lower limit value be 1.5, still more preferably 1.8, still more preferably 2.1, still more preferably 2.3 and that the upper limit value be 4, still more preferably 3.5, still more preferably 3, still more preferably 2.8.

It is more preferred that two or more of the features of the above-described modes be adopted in combination. The further limitations presented above may be applied only one of the upper and lower limits in each conditional expression. The above-described features may be adopted in combination.

In the following, embodiments of the zoom lens with a bent optical path and the image pickup apparatus according to the present invention will be described in detail with reference to the accompanying drawings. It should be understood that the present invention is not limited by the embodiments.

In the following, first to sixteenth embodiments of the zoom lens with a bent optical path (which will be sometimes simply referred to as the zoom lens) according to the present invention will be described. FIGS. 1A, 2A, 3A, 4A, 5A, 6A, 7A, 8A, 9A, 10A, 11A, 12A, 13A, 14A, 15A, and 16A are cross sectional views of the zoom lenses according to the first to sixteenth embodiments in the state in which the they are focused on an object point at infinity at the wide angle end, FIGS. 1B, 2B, 3B, 4B, 5B, 6B, 7B, 8B, 9B, 10B, 11B, 12B, 13B, 14B, 15B, and 16B are cross sectional views of the zoom lenses according to the first to sixteenth embodiments in the state in which the they are focused on an object point at infinity in an intermediate focal length state, and FIGS. 1C, 2C, 3C, 4C, 5C, 6C, 7C, 8C, 9C, 10C, 11C, 12C, 13C, 14C, 15C, and 16C are cross sectional views of the zoom lenses according to the first to sixteenth embodiments in the state in which the they are focused on an object point at infinity at the telephoto end. In FIGS. 1A to 16A, 1B to 16B, and 1C to 16C, a first lens unit is denoted by G1, a second lens unit is denoted by G2, a third lens unit is denoted by G3, a fourth lens unit is denoted by G4, a fifth lens unit is denoted by G5, a sixth lens unit is denoted by G6, an infrared cut filter is denoted by F, a cover glass is denoted by C, and the image plane is denoted by I.

The infrared cut filter may be a low pass filter on which coating (or multi-layer film) that blocks infrared light is applied. The cover glass C is a plane parallel plate of the electronic image pickup element. Coating for blocking infrared light may be applied on the surface of the cover glass C. The cover glass C may be adapted to have the low-pass filtering function.

All the numerical data presented below are for the state in which the zoom lens is focused on an object at infinity. In the numerical data, dimensions are in millimeters and angles are in degrees. Zoom data will be given for the wide angle end (WE), for an intermediate focal length state (ST), and for the telephoto end (TE).

In the first to eleventh embodiments, focusing is performed by moving the second lens unit counted from the image side.

Figure 36:
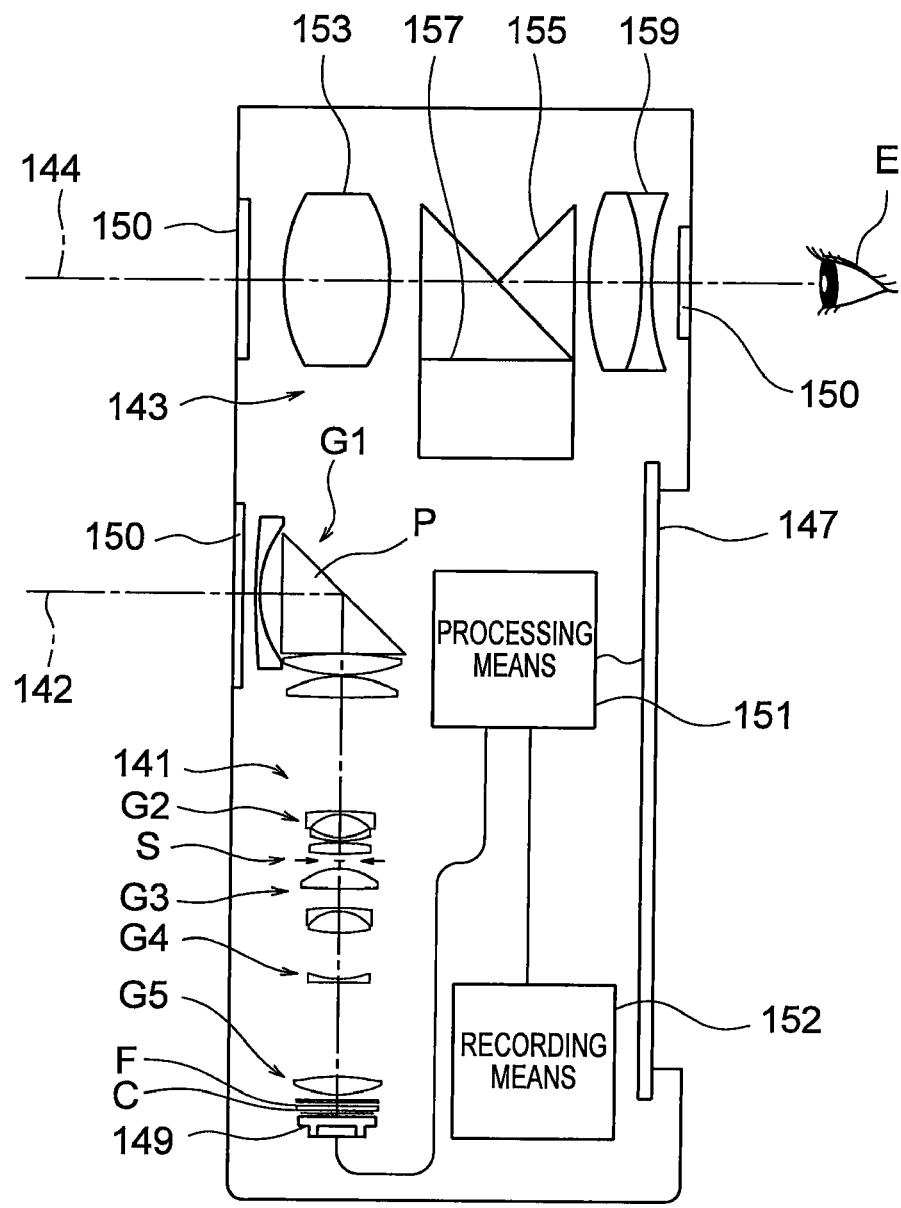
FIG. 36 is a cross sectional view of the digital camera.

FIGS. 1A to 16A, 1B to 16B, and 1C to 16C are extended views in which the reflecting surface of the prism (reflecting member) is not illustrated and the prism is illustrated as one having two flat surfaces. Actually, the prism is a rectangular prism as shown in FIG. 36.

In the first to sixteenth embodiments, the cover glass C may have a multi-layer film for wavelength range restriction applied on its surface. The cover glass C may be adapted to have the low-pass filtering function. The low-pass filtering function of the plane parallel plate F may be eliminated.

In the zoom lenses according to the eleventh to sixteenth embodiments, the aperture stop S is fixed.

Figure 1B:
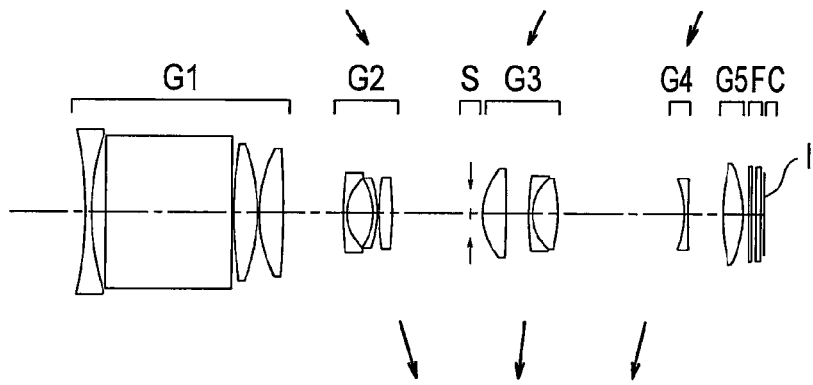
Figure 1C:
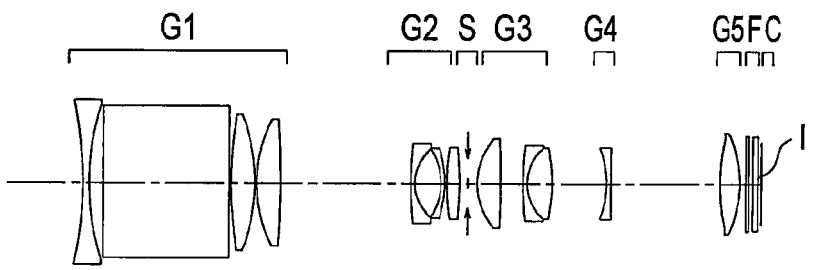

As shown in FIGS. 1A, 1B, and 1C, the zoom lens according to the first embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens and a cemented lens made up of a negative meniscus lens having a convex surface directed toward the object side and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the biconvex positive lens in the third lens unit G3, the image side surface of the biconvex positive lens in the cemented lens in the third lens unit G3, and both surfaces of the biconvex positive lens in the fifth lens unit G5.

In the zoom lens shown in FIGS. 1A, 1B, and 1C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 2A:
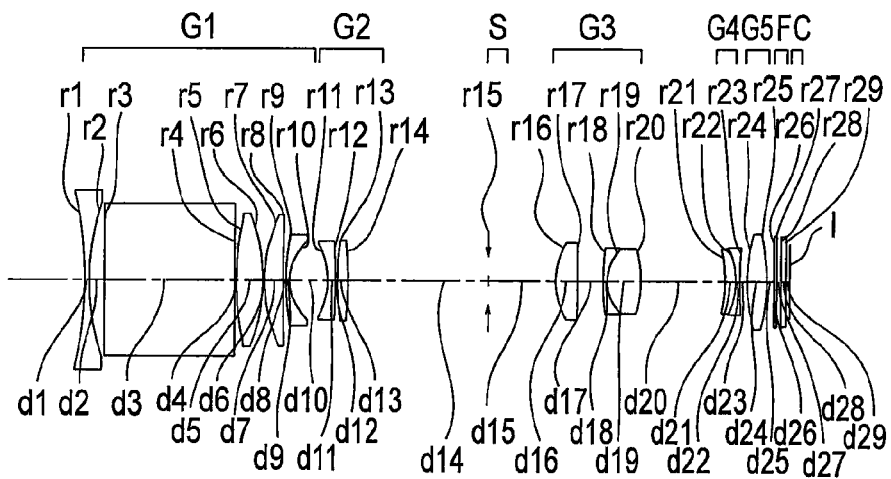
FIGS. 2A, 2B, and 2C are cross sectional views taken along the optical axis, showing the construction of a zoom lens with a bent optical path according to a second embodiment of the present invention in the state in which the zoom lens is focused on an object point at infinity, respectively at the wide angle end, in an intermediate focal length state, and at the telephoto end.
Figure 2B:
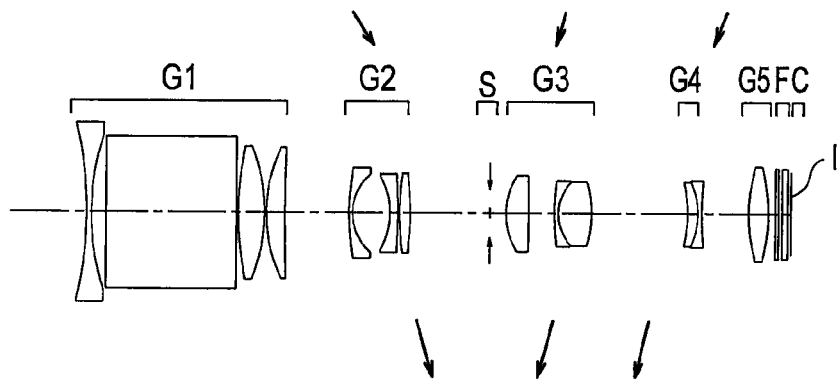
Figure 2C:
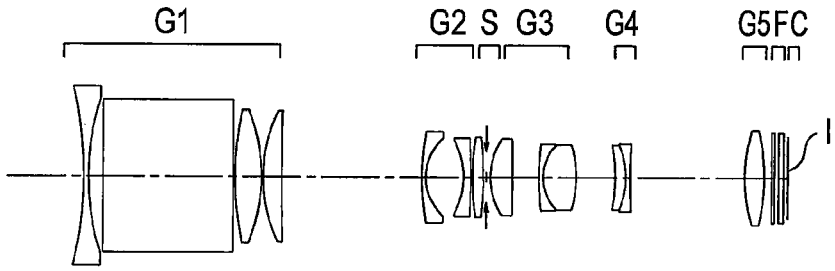

As shown in FIGS. 2A, 2B, and 2C, the zoom lens according to the second embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a positive meniscus lens having a convex surface directed toward the object side. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens and a cemented lens made up of a negative meniscus lens having a convex surface directed toward the object side and a biconvex positive lens. The fourth lens unit G4 is composed of a cemented lens made up of a positive meniscus lens having a convex surface directed toward the image side and a biconcave negative lens. The fifth lens unit G5 is composed of a biconvex positive lens. The lens elements in each lens unit are arranged in the mentioned order from the object side.

There are eight aspheric surfaces, which include both surfaces of the object side biconvex positive lens in the first lens unit G1, both surfaces of the negative meniscus lens having a convex surface directed toward the object side in the second lens unit G2, both surfaces of the biconvex positive lens in the third lens unit G3, the image side surface of the biconvex positive lens in the cemented lens in the third lens unit G3, and the object side surface of the biconvex positive lens in the fifth lens unit G5.

In the zoom lens shown in FIGS. 2A, 2B, and 2C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 3A:
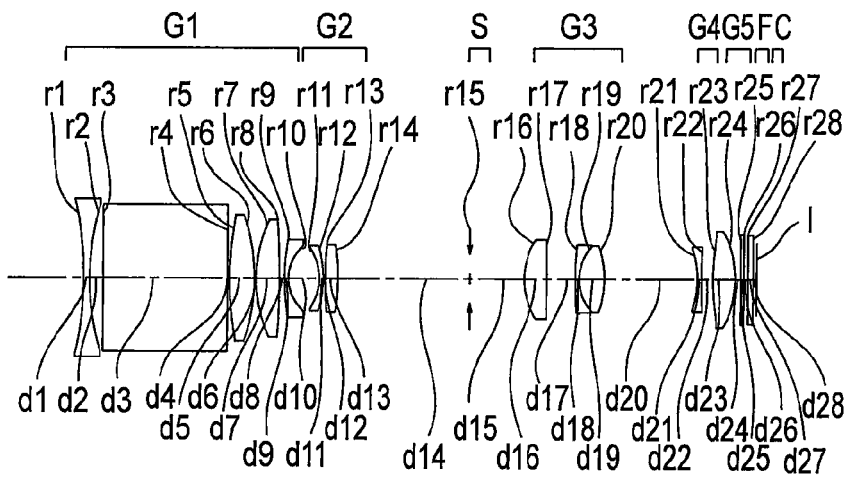
FIGS. 3A, 3B, and 3C are cross sectional views taken along the optical axis, showing the construction of a zoom lens with a bent optical path according to a third embodiment of the present invention in the state in which the zoom lens is focused on an object point at infinity, respectively at the wide angle end, in an intermediate focal length state, and at the telephoto end.
Figure 3B:
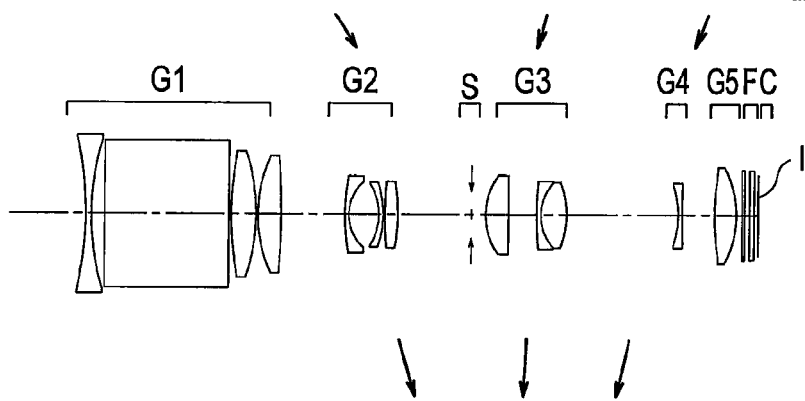
Figure 3C:
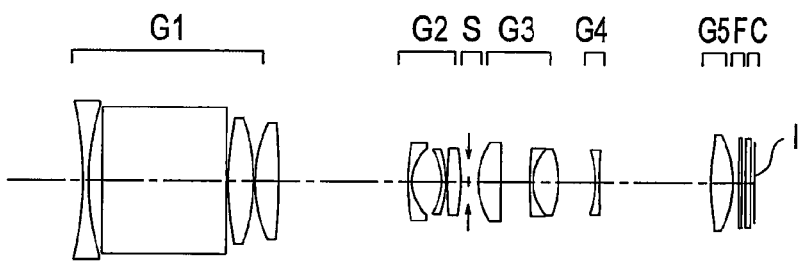

As shown in FIGS. 3A, 3B, and 3C, the zoom lens according to the third embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens and a cemented lens made up of a negative meniscus lens having a convex surface directed toward the object side and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the biconvex positive lens in the third lens unit G3, the image side surface of the biconvex positive lens in the cemented lens in the third lens unit G3, and both surfaces of the biconvex positive lens in the fifth lens unit G5.

In the zoom lens shown in FIGS. 3A, 3B, and 3C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 4A:
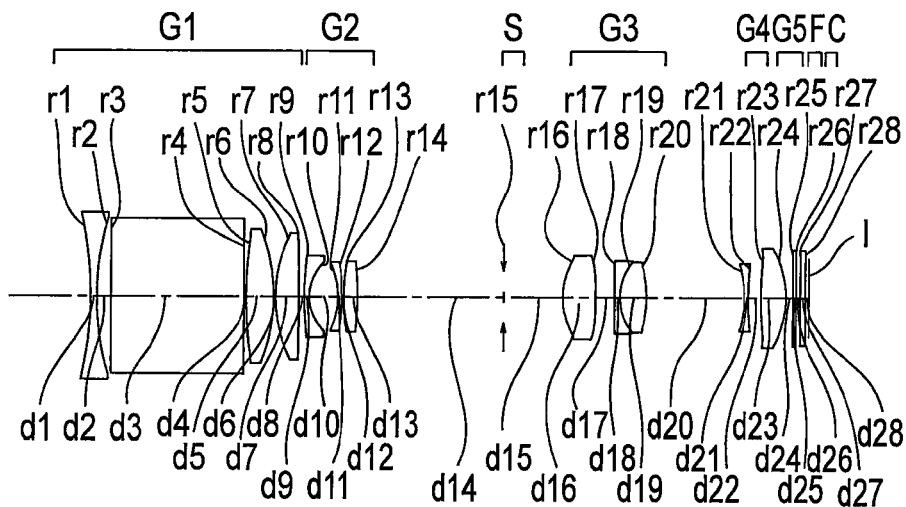
FIGS. 4A, 4B, and 4C are cross sectional views taken along the optical axis, showing the construction of a zoom lens with a bent optical path according to a fourth embodiment of the present invention in the state in which the zoom lens is focused on an object point at infinity, respectively at the wide angle end, in an intermediate focal length state, and at the telephoto end.
Figure 4B:
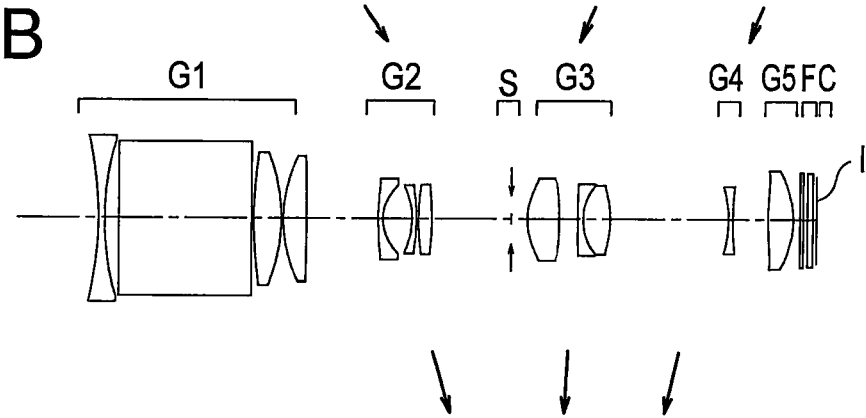
Figure 4C:
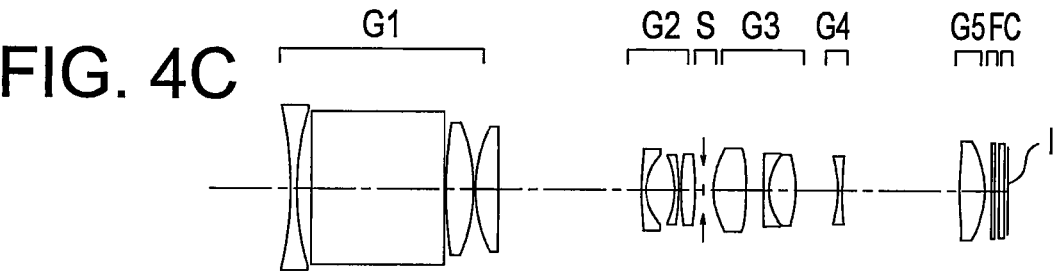

As shown in FIGS. 4A, 4B, and 4C, the zoom lens according to the fourth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens and a cemented lens made up of a negative meniscus lens having a convex surface directed toward the object side and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the biconvex positive lens in the third lens unit G3, the image side surface of the biconvex positive lens in the cemented lens in the third lens unit G3, and both surfaces of the biconvex positive lens in the fifth lens unit G5.

In the zoom lens shown in FIGS. 4A, 4B, and 4C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 5A:
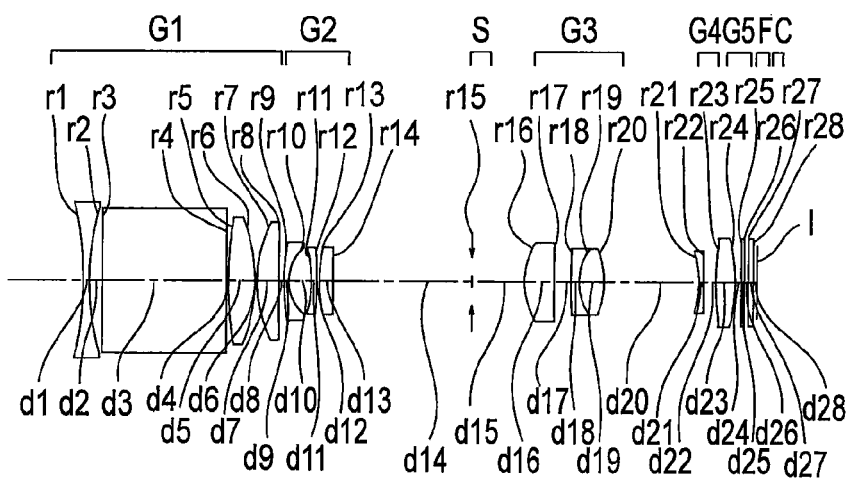
FIGS. 5A, 5B, and 5C are cross sectional views taken along the optical axis, showing the construction of a zoom lens with a bent optical path according to a fifth embodiment of the present invention in the state in which the zoom lens is focused on an object point at infinity, respectively at the wide angle end, in an intermediate focal length state, and at the telephoto end.
Figure 5B:
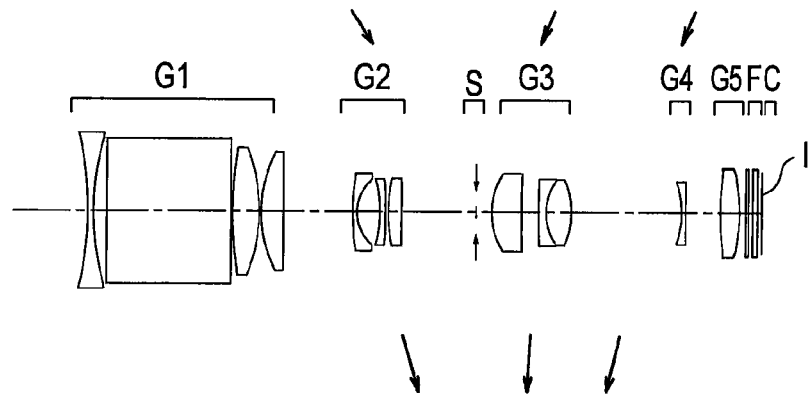
Figure 5C:
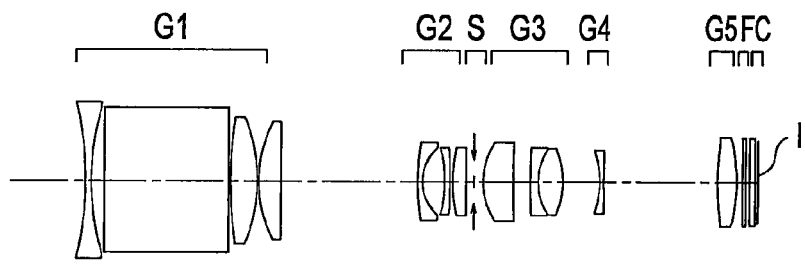

As shown in FIGS. 5A, 5B, and 5C, the zoom lens according to the fifth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a positive meniscus lens having a convex surface directed toward the object side. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens and a cemented lens made up of a negative meniscus lens having a convex surface directed toward the object side and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the biconvex positive lens in the third lens unit G3, the image side surface of the biconvex positive lens in the cemented lens in the third lens unit G3, and both surfaces of the biconvex positive lens in the fifth lens unit G5.

In the zoom lens shown in FIGS. 5A, 5B, and 5C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 6A:
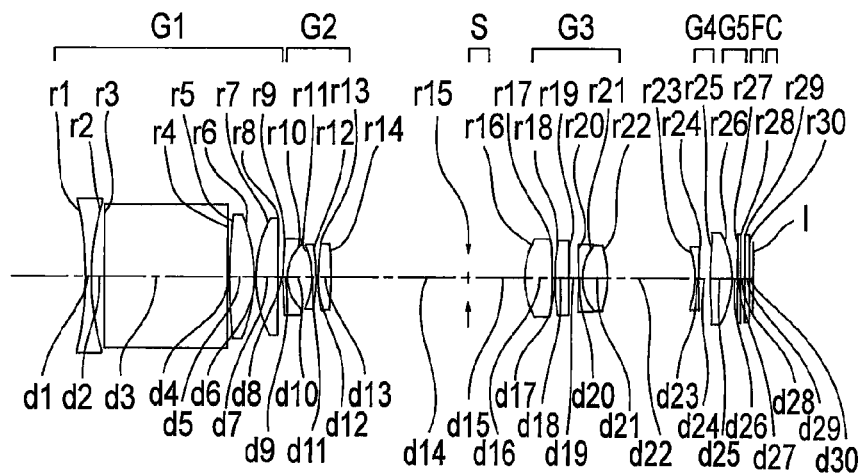
FIGS. 6A, 6B, and 6C are cross sectional views taken along the optical axis, showing the construction of a zoom lens with a bent optical path according to a sixth embodiment of the present invention in the state in which the zoom lens is focused on an object point at infinity, respectively at the wide angle end, in an intermediate focal length state, and at the telephoto end.
Figure 6B:
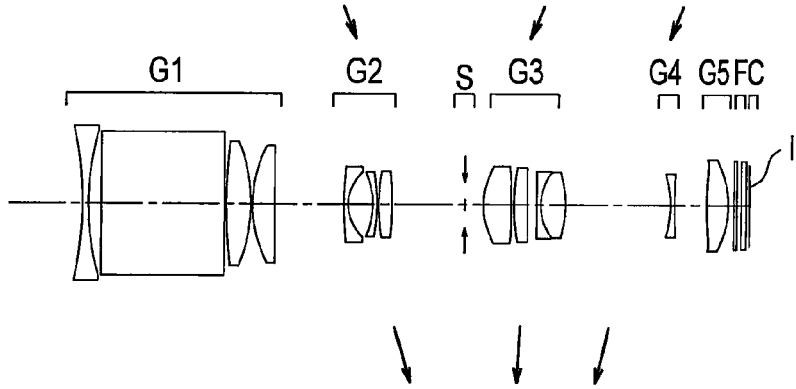
Figure 6C:
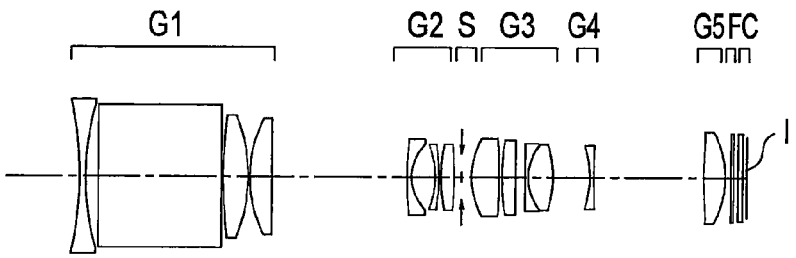

As shown in FIGS. 6A, 6B, and 6C, the zoom lens according to the sixth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a biconvex positive lens, a biconvex positive lens, and a cemented lens made up of a biconcave negative lens and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the object side biconvex positive lens in the third lens unit G3, the image side surface of the biconvex positive lens in the cemented lens in the third lens unit G3, and both surfaces of the biconvex positive lens in the fifth lens unit G5.

In the zoom lens shown in FIGS. 6A, 6B, and 6C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 7A:
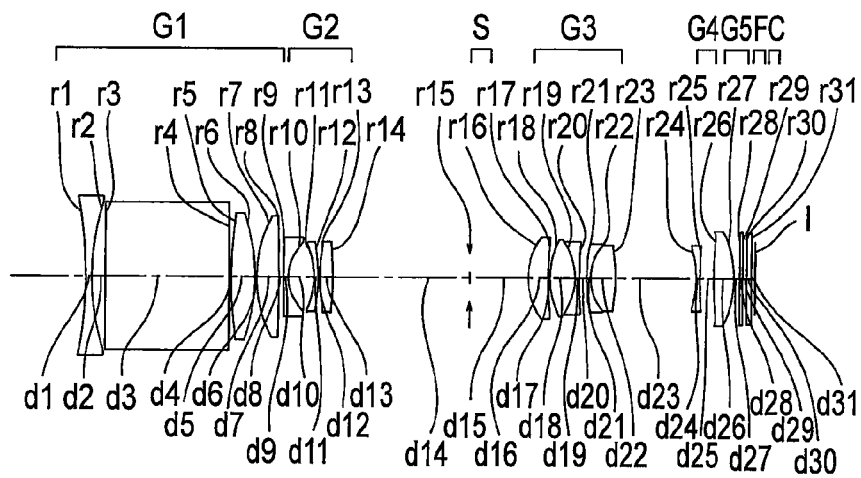
FIGS. 7A, 7B, and 7C are cross sectional views taken along the optical axis, showing the construction of a zoom lens with a bent optical path according to a seventh embodiment of the present invention in the state in which the zoom lens is focused on an object point at infinity, respectively at the wide angle end, in an intermediate focal length state, and at the telephoto end.
Figure 7B:
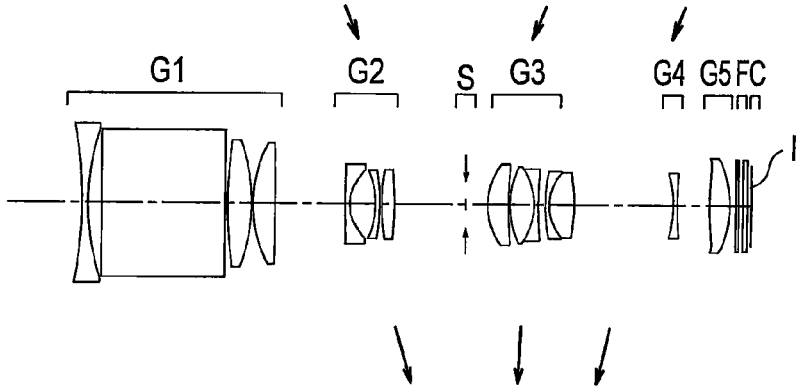
Figure 7C:
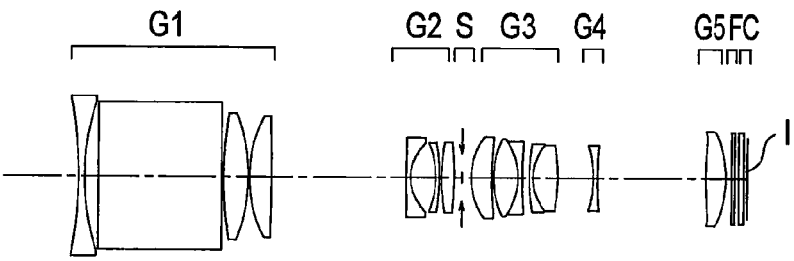

As shown in FIGS. 7A, 7B, and 7C, the zoom lens according to the seventh embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a positive meniscus lens having a convex surface directed toward the object side, a cemented lens made up of a biconvex positive lens and a biconcave negative lens, and a cemented lens made up of a negative meniscus lens having a convex surface directed toward the object side and a biconvex positive lens. The fourth lens unit G4 is composed of a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the positive meniscus lens having a convex surface directed toward the object side in the third lens unit G3, the image side surface of the biconvex positive lens in the image side cemented lens in the third lens unit G3, and both surfaces of the biconvex positive lens in the fifth lens unit G5.

In the zoom lens shown in FIGS. 7A, 7B, and 7C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 8A:
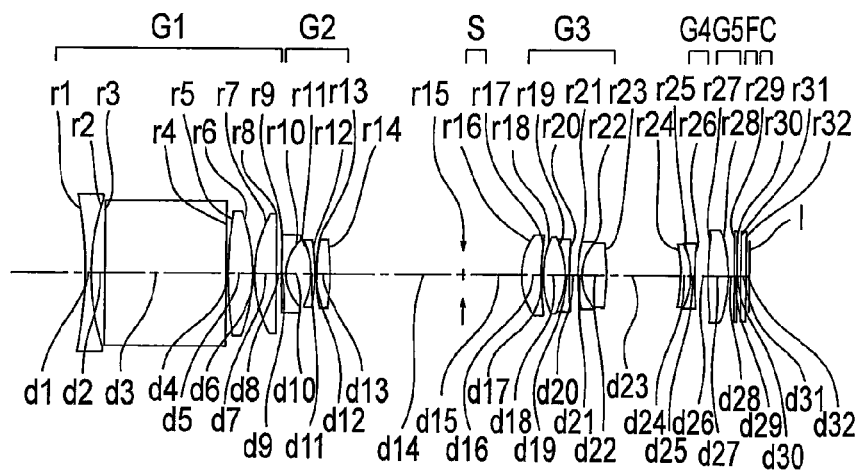
FIGS. 8A, 8B, and 8C are cross sectional views taken along the optical axis, showing the construction of a zoom lens with a bent optical path according to a eighth embodiment of the present invention in the state in which the zoom lens is focused on an object point at infinity, respectively at the wide angle end, in an intermediate focal length state, and at the telephoto end.
Figure 8B:
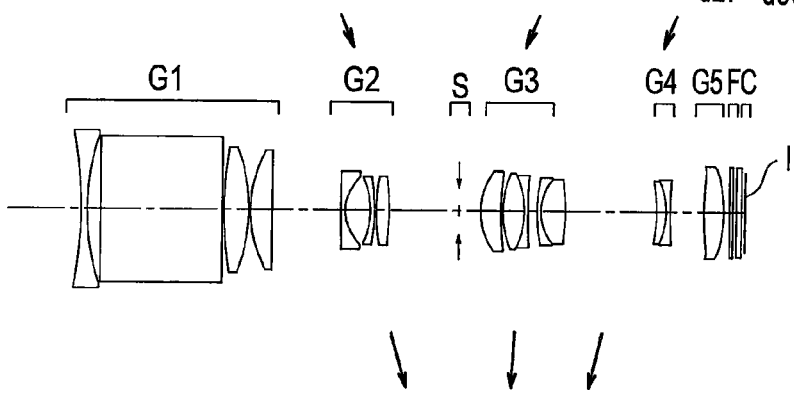
Figure 8C:
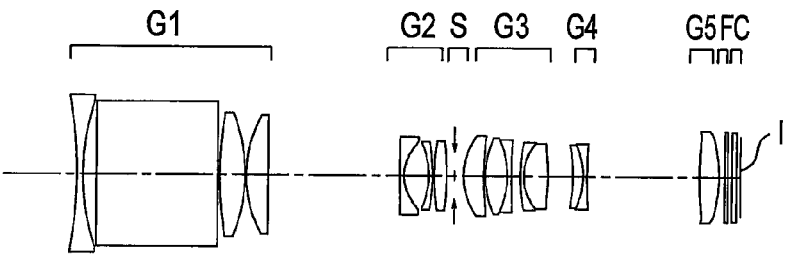

As shown in FIGS. 8A, 8B, and 8C, the zoom lens according to the eighth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is composed of a positive meniscus lens having a convex surface directed toward the object side, a cemented lens made up of a biconvex positive lens and a biconcave negative lens, and a cemented lens made up of a negative meniscus lens having a convex surface directed toward the object side and a biconvex positive lens. The fourth lens unit G4 is composed of a positive meniscus lens having a convex surface directed toward the image side and a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of the positive meniscus lens having a convex surface directed toward the object side in the third lens unit G3, the image side surface of the biconvex positive lens in the image side cemented lens in the third lens unit G3, and both surfaces of the biconvex positive lens in the fifth lens unit G5.

In the zoom lens shown in FIGS. 8A, 8B, and 8C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 9A:
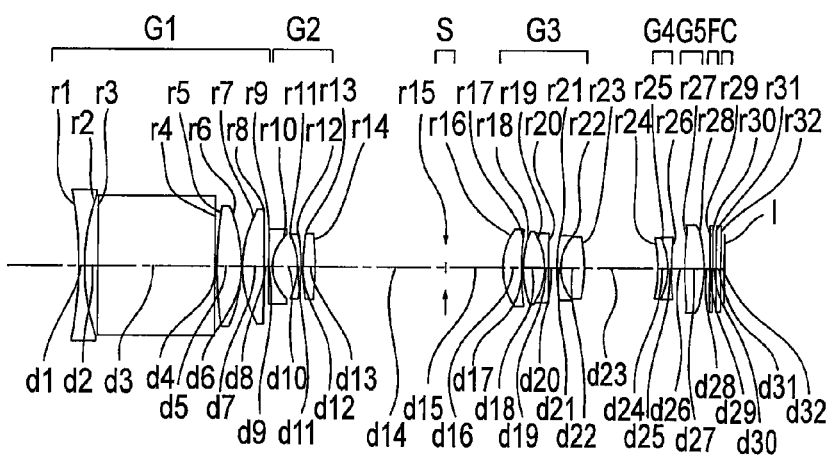
FIGS. 9A, 9B, and 9C are cross sectional views taken along the optical axis, showing the construction of a zoom lens with a bent optical path according to a ninth embodiment of the present invention in the state in which the zoom lens is focused on an object point at infinity, respectively at the wide angle end, in an intermediate focal length state, and at the telephoto end.
Figure 9B:
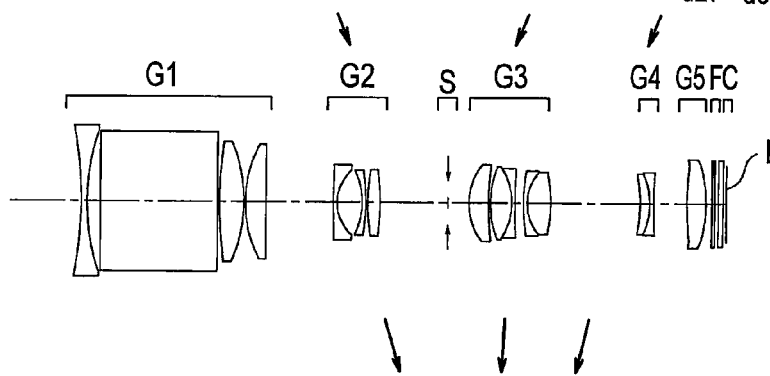
Figure 9C:
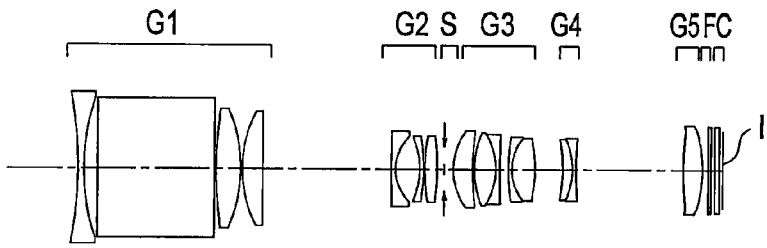

As shown in FIGS. 9A, 9B, and 9C, the zoom lens according to the ninth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed. The aperture size of the aperture stop S is varied to adjust the light quantity.

The first lens unit G1 is composed of a biconcave negative lens, a prism that bends the optical path, a biconvex positive lens, and a biconvex positive lens. The second lens unit G2 is composed of a negative meniscus lens having a convex surface directed toward the object side, a negative meniscus lens having a convex surface directed toward the image side, and a biconvex positive lens. The third lens unit G3 is a positive meniscus lens having a convex surface directed toward the object side, a cemented lens made up of a biconvex positive lens and a biconcave negative lens, and a cemented lens made up of a negative meniscus lens having a convex surface directed toward the object side and a biconvex positive lens. The fourth lens unit G4 is composed of a positive meniscus lens having a convex surface directed toward the image side and a biconcave negative lens. The fifth lens unit G5 is composed of a biconvex positive lens. The lens elements in each lens unit are arranged in the mentioned order from the object side.

There are nine aspheric surfaces, which include both surfaces of the object side biconvex positive lens in the first lens unit G1, both surfaces of the negative meniscus lens having a convex surface directed toward the object side in the second lens unit G2, both surfaces of a positive meniscus lens having a convex surface directed toward the object side in the third lens unit G3, the image side surface of the biconvex positive lens in the image side cemented lens in the third lens unit G3, and both surfaces of the biconvex positive lens in the fifth lens unit G5.

In the zoom lens shown in FIGS. 9A, 9B, and 9C, the object side surface and the image side surface of the prism are both flat surfaces, between which a reflecting surface (not shown) is provided. The third lens unit G3, the fourth lens unit G4, and the fifth lens unit G5 constitute the rear lens unit group. The third lens unit G3 and the fourth lens unit G4 constitute the object side sub lens unit group. The fifth lens unit G5 constitutes the image side lens unit. The lens units in the object side sub lens unit group that move during zooming are the third lens unit G3 and the fourth lens unit G4.

Figure 10A:
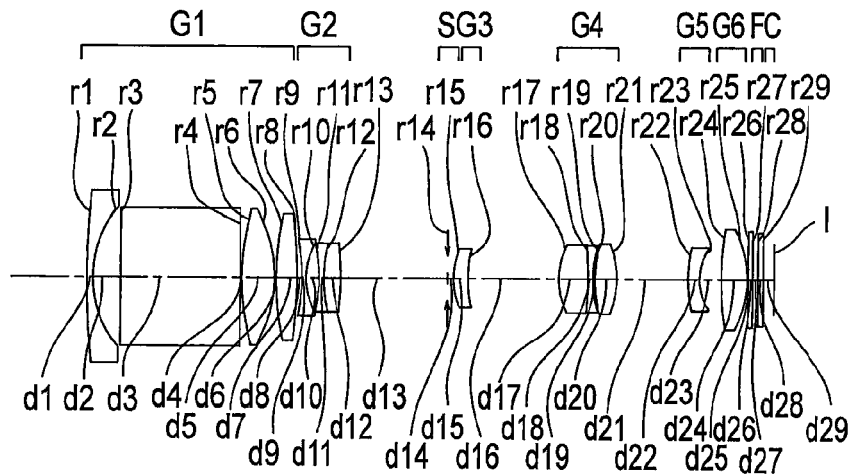
FIGS. 10A, 10B, and 10C are cross sectional views taken along the optical axis, showing the construction of a zoom lens with a bent optical path according to a tenth embodiment of the present invention in the state in which the zoom lens is focused on an object point at infinity, respectively at the wide angle end, in an intermediate focal length state, and at the telephoto end.
Figure 10B:
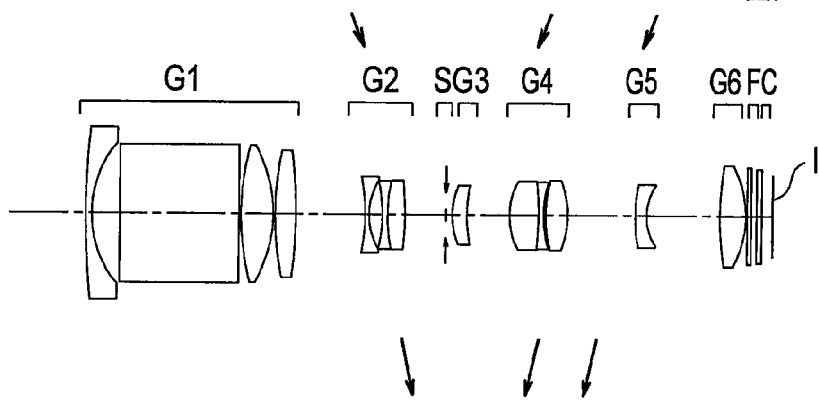
Figure 10C:
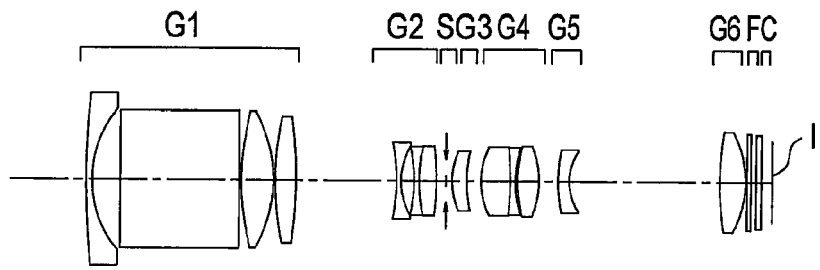

As shown in FIGS. 10A, 10B, and 10C, the zoom lens according to the tenth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a positive refractive power, a fifth lens unit G5 having a negative refractive power, and a sixth lens unit G6 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed. The aperture stop S is fixed. The aperture size of the aperture stop S is varied to adjust the light quantity.

The first lens unit G1 is composed of a negative meniscus lens having convex surface directed toward the object side, a prism that bends the optical path, a biconvex positive lens, and a biconvex positive lens. The second lens unit G2 is composed of a biconcave negative lens and a cemented lens made up of a biconcave negative lens and biconvex positive lens. The third lens unit G3 is composed of a positive meniscus lens having a convex surface directed toward the object side. The fourth lens unit G4 is composed of a cemented lens made up of a biconvex positive lens and a biconcave negative lens, and a biconvex positive lens. The fifth lens unit G5 is composed of a negative meniscus lens having a convex surface directed toward the object side. The sixth lens unit G6 is composed of a biconvex positive lens. The lens elements in each lens unit are arranged in the mentioned order from the object side.

There are eight aspheric surfaces, which include the image side surface of the negative meniscus lens having a convex surface directed toward the object side in the first lens unit G1, both surfaces of the object side biconvex positive lens in the first lens unit G1, both surfaces of the object side biconcave negative lens in the second lens unit G2, the object side surface of the positive meniscus lens having a convex surface directed toward the object side in the third lens unit G3, and both surfaces of the image side biconvex positive lens in the fourth lens unit G4.

In the zoom lens shown in FIGS. 10A, 10B, and 10C, the object side surface and the image side surface of the prism are both flat surfaces, between which a reflecting surface (not shown) is provided. The third lens unit G3, the fourth lens unit G4, the fifth lens unit G5, and the sixth lens unit G6 constitute the rear lens unit group. The third lens unit G3, the fourth lens unit G4, and the fifth lens unit G5 constitute the object side sub lens unit group. The sixth lens unit G6 constitutes the image side lens unit. The lens units in the object side sub lens unit group that move during zooming are the fourth lens unit G4 and the fifth lens unit G5.

Figure 11A:
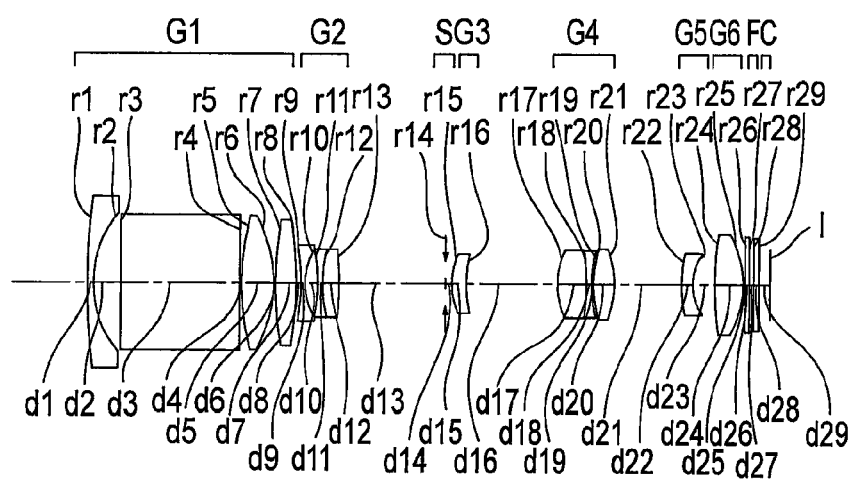
FIGS. 11A, 11B, and 11C are cross sectional views taken along the optical axis, showing the construction of a zoom lens with a bent optical path according to a eleventh embodiment of the present invention in the state in which the zoom lens is focused on an object point at infinity, respectively at the wide angle end, in an intermediate focal length state, and at the telephoto end.
Figure 11B:
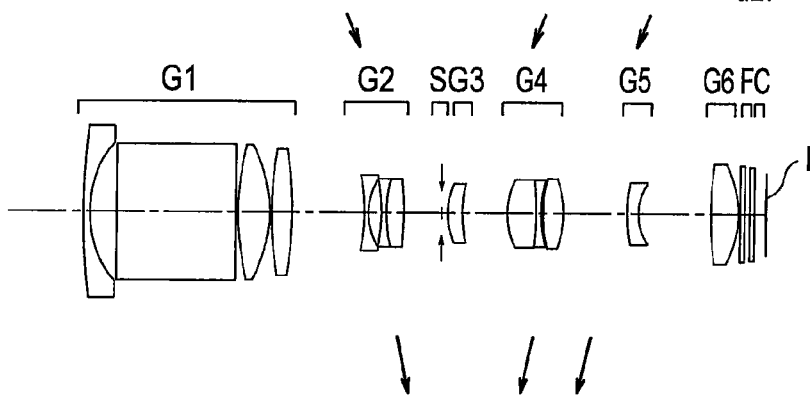
Figure 11C:
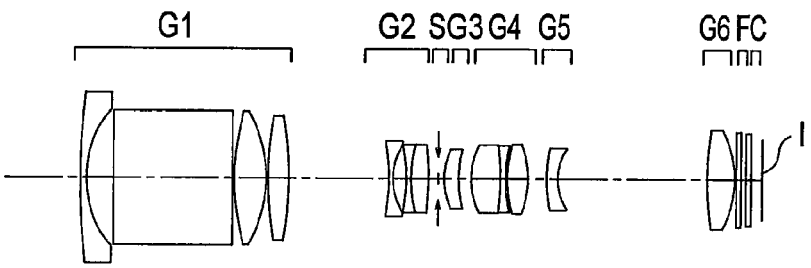

As shown in FIGS. 11A, 11B, and 11C, the zoom lens according to the eleventh embodiment includes, in order from the object side, a first lens unit G1 having a positive refractive power, a second lens unit G2 having a negative refractive power, an aperture stop S, a third lens unit G3 having a positive refractive power, a fourth lens unit G4 having a positive refractive power, a fifth lens unit G5 having a negative refractive power, and a sixth lens unit G6 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 moves toward the object side, and the sixth lens unit G6 is fixed. The aperture stop S is fixed. The aperture size of the aperture stop S is varied to adjust the light quantity.

The first lens unit G1 is composed of a negative meniscus lens having convex surface directed toward the object side, a prism that bends the optical path, a biconvex positive lens, and a biconvex positive lens. The second lens unit G2 is composed of a biconcave negative lens and a cemented lens made up of a biconcave negative lens and biconvex positive lens. The third lens unit G3 is composed of a positive meniscus lens having a convex surface directed toward the object side. The fourth lens unit G4 is composed of a cemented lens made up of a biconvex positive lens and a biconcave negative lens and a biconvex positive lens. The fifth lens unit G5 is composed of a negative meniscus lens having a convex surface directed toward the object side. The sixth lens unit G6 is composed of a biconvex positive lens. The lens elements in each lens unit are arranged in the mentioned order from the object side.

There are eight aspheric surfaces, which include the image side surface of the negative meniscus lens having a convex surface directed toward the object side in the first lens unit G1, both surfaces of the object side biconvex positive lens in the first lens unit G1, both surfaces of the object side biconcave negative lens in the second lens unit G2, the object side surface of the positive meniscus lens having a convex surface directed toward the object side in the third lens unit G3, and both surfaces of the image side biconvex positive lens in the fourth lens unit G4.

In the zoom lens shown in FIGS. 11A, 11B, and 11C, the object side surface and the image side surface of the prism are both flat surfaces, between which a reflecting surface (not shown) is provided. The third lens unit G3, the fourth lens unit G4, the fifth lens unit G5, and the sixth lens unit G6 constitute the rear lens unit group. The third lens unit G3, the fourth lens unit G4, and the fifth lens unit G5 constitute the object side sub lens unit group. The sixth lens unit G6 constitutes the image side lens unit. The lens units in the object side sub lens unit group that move during zooming are the fourth lens unit G4 and the fifth lens unit G5.

Figure 12A:
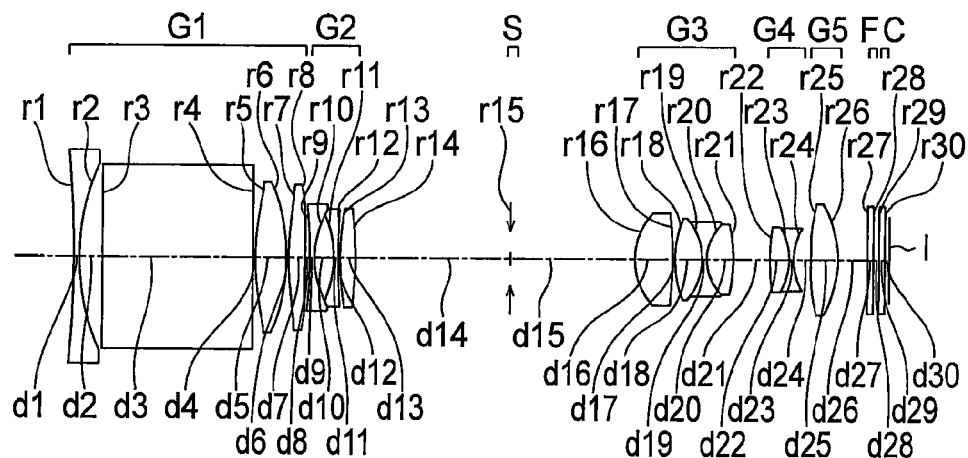
FIGS. 12A, 12B, and 12C are cross sectional views taken along the optical axis, showing the construction of a zoom lens with a bent optical path according to a twelfth embodiment of the present invention in the state in which the zoom lens is focused on an object point at infinity, respectively at the wide angle end, in an intermediate focal length state, and at the telephoto end.
Figure 12B:
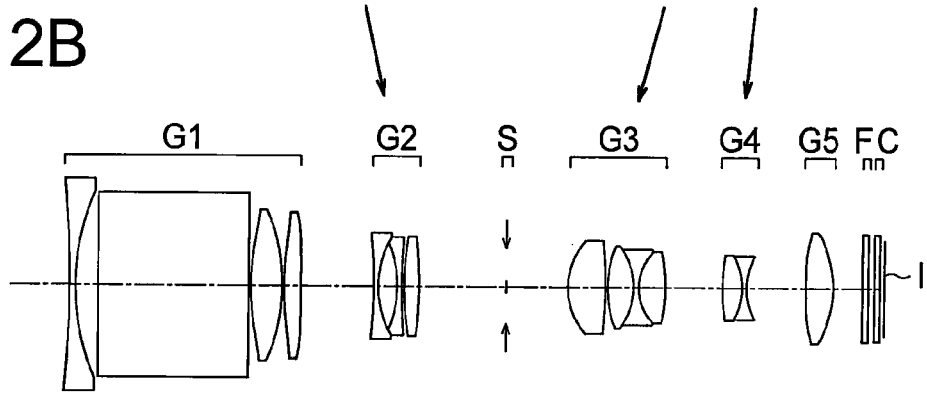
Figure 12C:
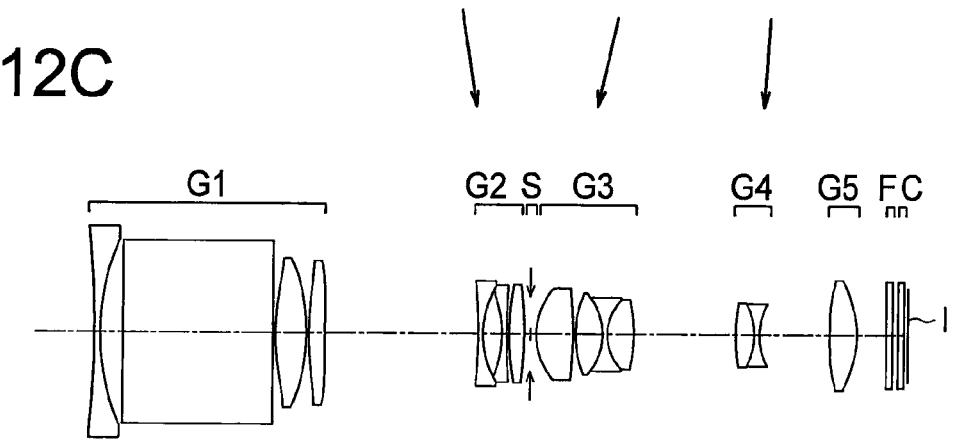

As shown in FIGS. 12A, 12B, and 12C, the zoom lens according to the twelfth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

The first lens unit G1 is composed of a biconcave negative lens, a prism, a biconvex positive lens, and a positive meniscus lens having a convex surface directed toward the object side. The second lens unit G2 is composed of a biconcave negative lens, a biconcave negative lens, and a biconvex positive lens. The third lens unit G3 is composed of a biconvex positive lens and a cemented lens made up of a biconvex positive lens, a biconcave negative lens, and a biconvex positive lens. The fourth lens unit G4 is composed of a cemented lens made up of a biconvex positive lens and a biconcave negative lens. The fifth lens unit G5 is composed of a biconvex positive lens. The lens elements in each lens unit are arranged in the mentioned order from the object side. The lens elements in each lens unit are arranged in the mentioned order from the object side. FIGS. 12A to 16A, 12B to 16B, and 12C to 16C are extended views in which the reflecting surface of the prism is not illustrated. Actually, the prism is a rectangular prism as shown in FIG. 36.

There are ten aspheric surfaces, which include both surfaces of the biconvex positive lens in the first lens unit G1, both surfaces of the positive meniscus lens in the first lens unit G!, both surfaces of the object side biconcave negative lens in the second lens unit G2, both surfaces of the biconvex positive lens located closest to the object side in the third lens unit G3, and both surfaces of the biconvex positive lens in the fifth lens unit G5.

Figure 13A:
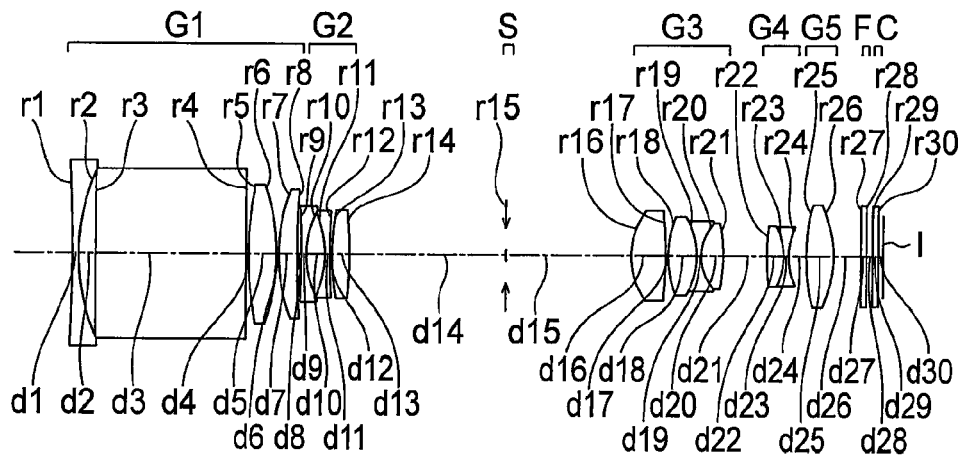
FIGS. 13A, 13B, and 13C are cross sectional views taken along the optical axis, showing the construction of a zoom lens with a bent optical path according to a thirteenth embodiment of the present invention in the state in which the zoom lens is focused on an object point at infinity, respectively at the wide angle end, in an intermediate focal length state, and at the telephoto end.
Figure 13B:
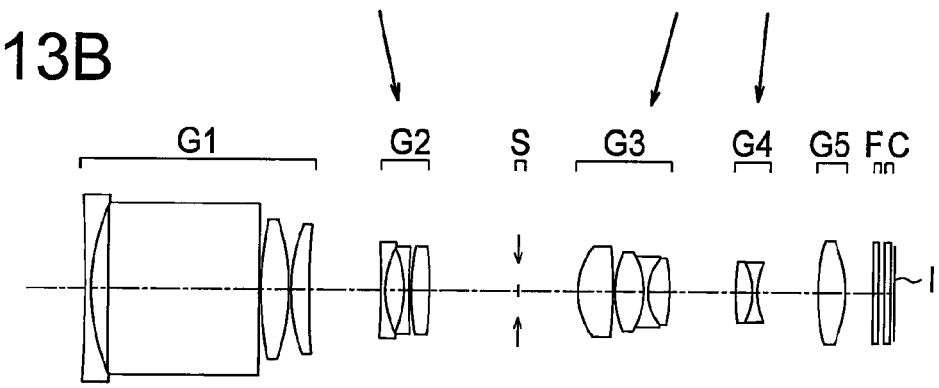
Figure 13C:
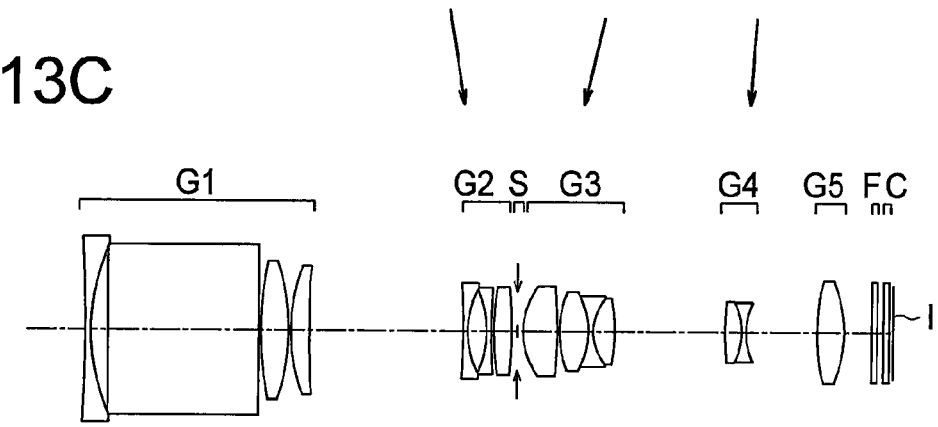

As shown in FIGS. 13A, 13B, and 13C, the zoom lens according to the thirteenth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

The first lens unit G1 is composed of a biconcave negative lens, a prism, a biconvex positive lens, and a positive meniscus lens having a convex surface directed toward the object side. The second lens unit G2 is composed of a biconcave negative lens, a biconcave negative lens, and a biconvex positive lens. The third lens unit G3 is composed of a biconvex positive lens and a cemented lens made up of a biconvex positive lens, a biconcave negative lens, and a biconvex positive lens. The fourth lens unit G4 is composed of a cemented lens made up of a biconvex positive lens and a biconcave negative lens. The fifth lens unit G5 is composed of a biconvex positive lens. The lens elements in each lens unit are arranged in the mentioned order from the object side.

There are ten aspheric surfaces, which include both surfaces of the biconvex positive lens in the first lens unit G1, both surfaces of the positive meniscus lens in the first lens unit G!, both surfaces of the object side biconcave negative lens in the second lens unit G2, both surfaces of the biconvex positive lens located closest to the object side in the third lens unit G3, and both surfaces of the biconvex positive lens in the fifth lens unit G5.

Figure 14A:
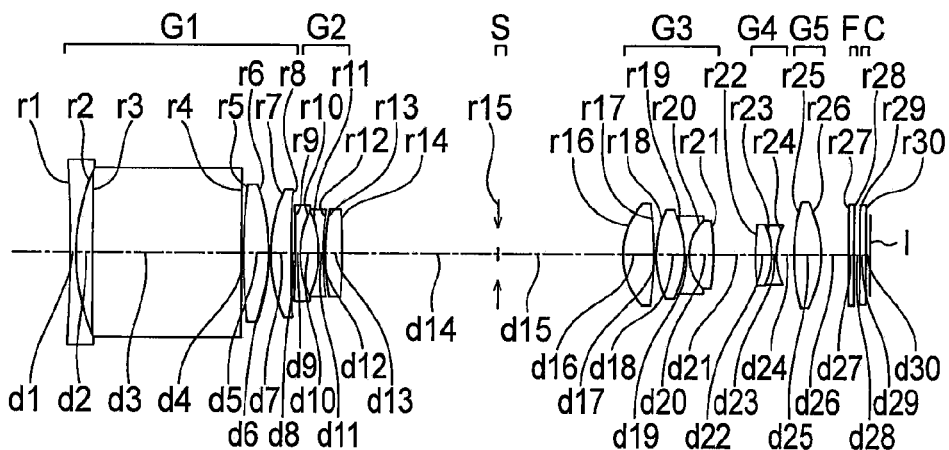
FIGS. 14A, 14B, and 14C are cross sectional views taken along the optical axis, showing the construction of a zoom lens with a bent optical path according to a fourteenth embodiment of the present invention in the state in which the zoom lens is focused on an object point at infinity, respectively at the wide angle end, in an intermediate focal length state, and at the telephoto end.
Figure 14B:
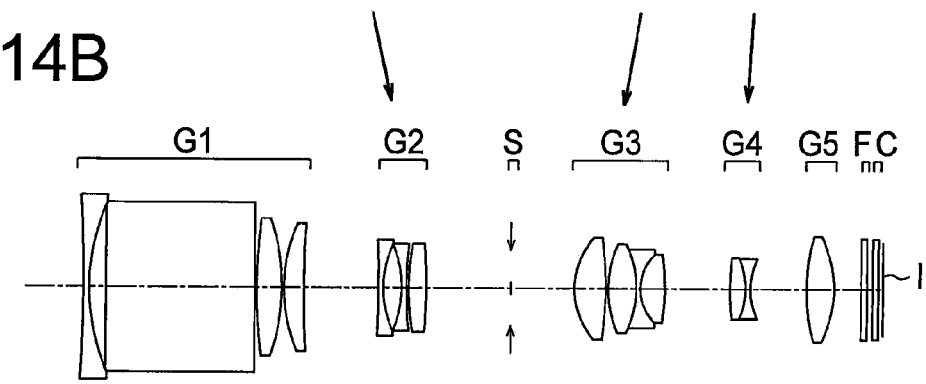
Figure 14C:
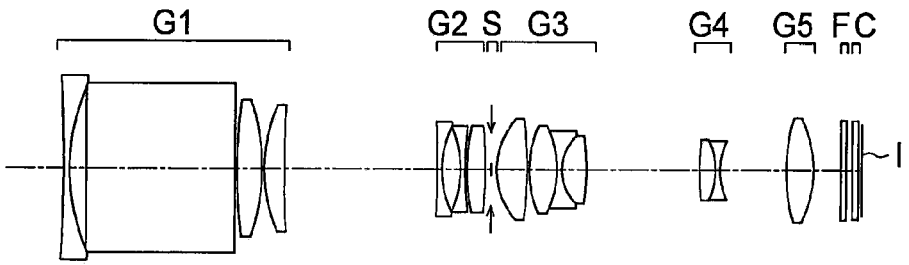

As shown in FIGS. 14A, 14B, and 14C, the zoom lens according to the fourteenth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

The first lens unit G1 is composed of a biconcave negative lens, a prism, a biconvex positive lens, and a positive meniscus lens having a convex surface directed toward the object side. The second lens unit G2 is composed of a biconcave negative lens, a biconcave negative lens, and a biconvex positive lens. The third lens unit G3 is composed of a biconvex positive lens and a cemented lens made up of a biconvex positive lens, a biconcave negative lens, and a biconvex positive lens. The fourth lens unit G4 is composed of a cemented lens made up of a biconvex positive lens and a biconcave negative lens. The fifth lens unit G5 is composed of a biconvex positive lens. The lens elements in each lens unit are arranged in the mentioned order from the object side.

There are ten aspheric surfaces, which include both surfaces of the biconvex positive lens in the first lens unit G1, both surfaces of the positive meniscus lens in the first lens unit G!, both surfaces of the object side biconcave negative lens in the second lens unit G2, both surfaces of the biconvex positive lens located closest to the object side in the third lens unit G3, and both surfaces of the biconvex positive lens in the fifth lens unit G5.

Figure 15A:
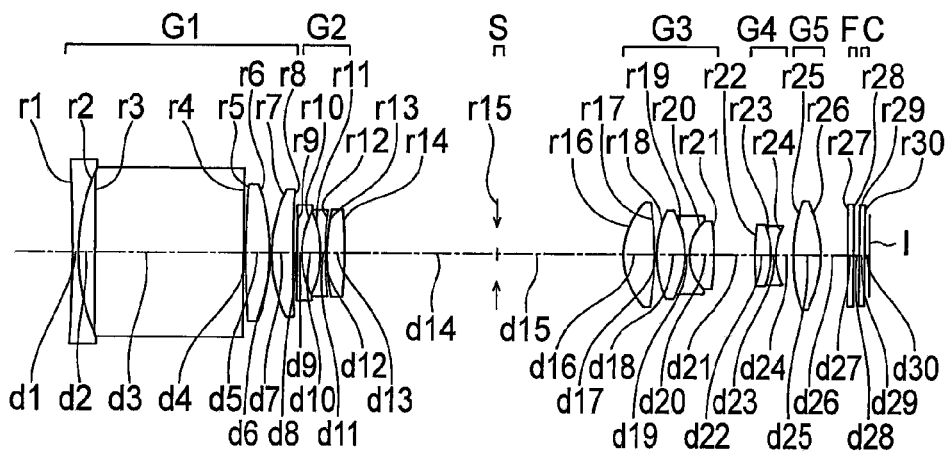
FIGS. 15A, 15B, and 15C are cross sectional views taken along the optical axis, showing the construction of a zoom lens with a bent optical path according to a fifteenth embodiment of the present invention in the state in which the zoom lens is focused on an object point at infinity, respectively at the wide angle end, in an intermediate focal length state, and at the telephoto end.
Figure 15B:
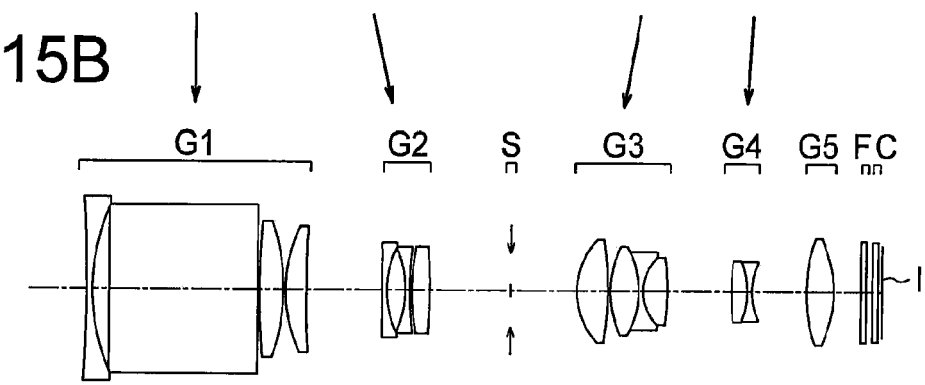
Figure 15C:
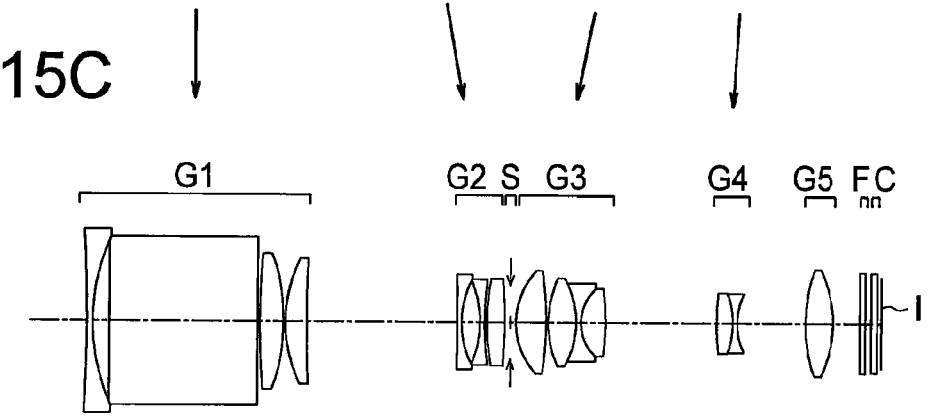

As shown in FIGS. 15A, 15B, and 15C, the zoom lens according to the fifteenth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

The first lens unit G1 is composed of a biconcave negative lens, a prism, a biconvex positive lens, and a positive meniscus lens having a convex surface directed toward the object side. The second lens unit G2 is composed of a biconcave negative lens, a biconcave negative lens, and a biconvex positive lens. The third lens unit G3 is composed of a biconvex positive lens and a cemented lens made up of a biconvex positive lens, a biconcave negative lens, and a biconvex positive lens. The fourth lens unit G4 is composed of a cemented lens made up of a biconvex positive lens and a biconcave negative lens. The fifth lens unit G5 is composed of a biconvex positive lens. The lens elements in each lens unit are arranged in the mentioned order from the object side.

There are ten aspheric surfaces, which include both surfaces of the biconvex positive lens in the first lens unit G1, both surfaces of the positive meniscus lens in the first lens unit G!, both surfaces of the object side biconcave negative lens in the second lens unit G2, both surfaces of the biconvex positive lens located closest to the object side in the third lens unit G3, and both surfaces of the biconvex positive lens in the fifth lens unit G5.

Figure 16A:
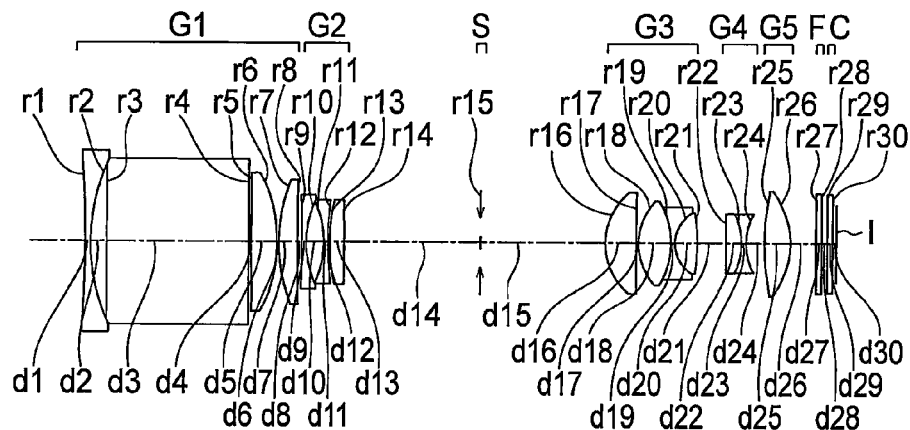
FIGS. 16A, 16B, and 16C are cross sectional views taken along the optical axis, showing the construction of a zoom lens with a bent optical path according to a sixteenth embodiment of the present invention in the state in which the zoom lens is focused on an object point at infinity, respectively at the wide angle end, in an intermediate focal length state, and at the telephoto end.
Figure 16B:
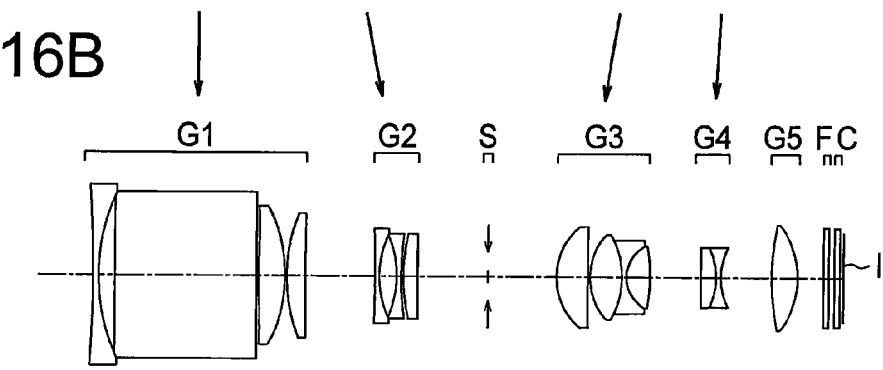
Figure 16C:
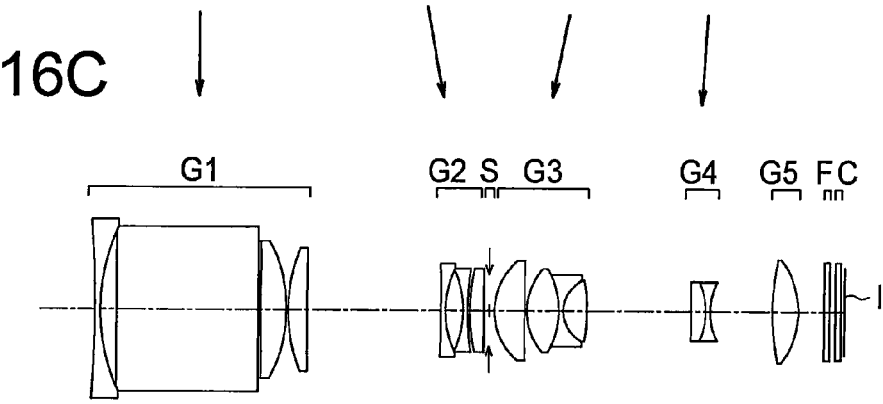

As shown in FIGS. 16A, 16B, and 16C, the zoom lens according to the sixteenth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 is fixed, the second lens unit G2 moves toward the image side, the third lens unit G3 moves toward the object side, the fourth lens unit G4 moves toward the object side, and the fifth lens unit G5 is fixed. The aperture stop S is fixed.

The first lens unit G1 is composed of a biconcave negative lens, a prism, a biconvex positive lens, and a positive meniscus lens having a convex surface directed toward the object side. The second lens unit G2 is composed of a biconcave negative lens, a biconcave negative lens, and a biconvex positive lens. The third lens unit G3 is composed of a biconvex positive lens and a cemented lens made up of a biconvex positive lens, a biconcave negative lens, and a biconvex positive lens. The fourth lens unit G4 is composed of a cemented lens made up of a biconvex positive lens and a biconcave negative lens. The fifth lens unit G5 is composed of a biconvex positive lens. The lens elements in each lens unit are arranged in the mentioned order from the object side.

There are ten aspheric surfaces, which include both surfaces of the biconvex positive lens in the first lens unit G1, both surfaces of the positive meniscus lens in the first lens unit G1, both surfaces of the object side biconcave negative lens in the second lens unit G2, both surfaces of the biconvex positive lens located closest to the object side in the third lens unit G3, and both surfaces of the biconvex positive lens in the fifth lens unit G5.

Numerical data of each embodiment described above is shown below. Apart from symbols described above, f denotes a focal length of an imaging optical system, BF denotes a back focus, f1, f2, ... denotes a focal length of each lens unit, IH denotes an image height, FNO denotes an F number, ω denotes a half image angle, WE denotes a wide angle end, ST denotes an intermediate state, TE denotes a telephoto end, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

A shape of the aspheric surface is described by the following expression (I) using each aspherical surface coefficient in each embodiment, when x is let to be an optical axis in which a light passing direction is let to be a positive direction, and y is let to be a direction orthogonal to the optical axis.

$$x=(y^2/r)/[1+\{1-(K+1)(y/r)^2\}^{1/2}]+A_4 y^4+A_6 y^6+A_8 y^8+A_{10} y^{10}+A_{12} y^{12} \quad (I)$$

where, r denotes a paraxial radius of curvature, K denotes a conical coefficient, $A_4, A_6, A_8, A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

In the numerical embodiments described in the following, the image height at the wide angle end is lower than that in the intermediate focal length state and that telephoto end. This is due to barrel distortion, as described above. In the numerical embodiments, the value of the full angle of field (2ω) at the wide angle end is given as the angle of view corresponding to the image height in the effective image pickup area having a barrel shape.

In the numerical embodiments, numerical data concerning the reflecting surface of the reflecting member (i.e. reflecting prism) is not presented. The third surface and the fourth surface in the numerical embodiments correspond respectively to the incidence surface and the exit surface of the reflecting member. This means that the reflecting surface exists between the third surface and the fourth surface.

Example 1

| Unit mm | | | | |
|---|---|---|---|---|
| Surface data | | | | |
| Surface no. | r | d | nd | vd |
| Object plane | ∞ | ∞ | | |
| 1 | −38.646 | 0.60 | 1.91082 | 35.25 |
| 2 | 25.525 | 1.38 | | |
| 3 | ∞ | 12.50 | 1.90366 | 31.32 |
| 4 | ∞ | 0.20 | | |
| 5* | 30.399 | 2.41 | 1.49710 | 81.56 |
| 6* | −19.351 | 0.20 | | |
| 7 | 13.699 | 2.37 | 1.49700 | 81.61 |
| 8 | −101.298 | Variable | | |

-continued

| Unit mm | | | | |
|---|---|---|---|---|
| 9* | 23.420 | 0.40 | 1.85135 | 40.10 |
| 10* | 3.900 | 2.61 | | |
| 11 | −6.136 | 0.40 | 1.77250 | 49.60 |
| 12 | −10.960 | 0.20 | | |
| 13 | 21.168 | 1.29 | 1.92286 | 20.88 |
| 14 | −33.044 | Variable | | |
| 15(stop) | ∞ | Variable | | |
| 16* | 6.156 | 2.28 | 1.58313 | 59.38 |
| 17* | −160.000 | 2.20 | | |
| 18 | 26.793 | 0.40 | 1.91082 | 35.25 |
| 19 | 4.533 | 2.50 | 1.49710 | 81.56 |
| 20* | −14.522 | Variable | | |
| 21 | −9.613 | 0.40 | 1.88300 | 40.76 |
| 22 | 154.684 | Variabl | | |
| 23* | 20.000 | 2.03 | 1.53071 | 55.69 |
| 24* | −10.075 | 0.60 | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.37 | | |
| Image plane (Light receiving surface) | ∞ | | | |

| Aspherical surface data |
|---|

5th surface k = 0.000
A4 = −8.77447e−05, A6 = 1.19932e−07, A8 = −4.22253e−09

6th surface k = 0.000
A4 = −2.44399e−05, A6 = 1.40843e−08, A8 = −4.66640e−09

9th surface k = 0.000
A4 = −5.29160e−04, A6 = 6.90232e−06, A8 = 7.89760e−08

10th surface k = 0.000
A4 = −1.63560e−03, A6 = −8.13594e−05, A8 = 1.38576e−06,
A10 = −4.45546e−07

16th surface k = 0.000
A4 = −3.32461e−04, A6 = −1.03060e−05, A8 = −1.51250e−07

17th surface k = 0.000
A4 = 5.59151e−05, A6 = −1.14432e−05, A8 = 2.35680e−07

20th surface k = 0.000
A4 = 2.86930e−04, A6 = 8.49386e−06, A8 = −1.19082e−07

23rd surface k = 0.000
A4 = −1.51026e−05, A6 = 1.42653e−05, A8 = −5.78961e−07,
A10 = −1.52863e−08

24th surface k = 0.000
A4 = 1.18036e−03, A6 = −4.25065e−05, A8 = 1.45214e−06,
A10 = −4.58349e−08

| Zoom data | | | |
|---|---|---|---|
| | Wide angle | Intermediate | Telephoto |
| Focal length | 4.94 | 14.32 | 47.75 |
| Fno. | 3.99 | 6.39 | 6.80 |
| Angle of field 2ω | 81.76 | 30.72 | 9.48 |
| fb (in air) | 1.86 | 1.86 | 1.86 |
| Lens total length (in air) | 67.00 | 67.00 | 67.00 |
| d8 | 0.50 | 5.92 | 12.90 |
| d14 | 13.17 | 7.75 | 0.78 |

-continued

| Unit mm | | | |
|---|---|---|---|
| d15 | 6.30 | 1.20 | 0.92 |
| d20 | 9.68 | 12.49 | 5.33 |
| d22 | 1.11 | 3.41 | 10.83 |

| Unit focal length |
|---|
| f1 = 14.71  f2 = −7.26  f3 = 12.38  f4 = −10.24  f5 = 12.93 |

Example 2

| Unit mm | | | | |
|---|---|---|---|---|
| Surface data | | | | |
| Surface no. | r | d | nd | vd |
| Object plane | ∞ | ∞ | | |
| 1 | −38.491 | 0.50 | 1.91082 | 35.25 |
| 2 | 24.582 | 1.47 | | |
| 3 | ∞ | 13.00 | 2.00100 | 29.14 |
| 4 | ∞ | 0.20 | | |
| 5* | 26.807 | 2.62 | 1.49710 | 81.56 |
| 6* | −18.492 | 0.20 | | |
| 7 | 15.124 | 1.87 | 1.55332 | 71.68 |
| 8 | 202.717 | Variable | | |
| 9* | 22.779 | 0.35 | 1.80566 | 36.85 |
| 10* | 4.742 | 3.76 | | |
| 11 | −7.842 | 0.77 | 1.55023 | 73.61 |
| 12 | −70.000 | 0.20 | | |
| 13 | 25.371 | 1.04 | 1.92286 | 20.88 |
| 14 | −34.812 | Variable | | |
| 15(stop) | ∞ | Variable | | |
| 16* | 6.630 | 2.20 | 1.58313 | 59.38 |
| 17* | −136.608 | 2.55 | | |
| 18 | 25.759 | 0.40 | 1.91082 | 35.25 |
| 19 | 4.493 | 3.30 | 1.49710 | 81.56 |
| 20* | −11.799 | Variable | | |
| 21 | −15.313 | 1.05 | 1.58784 | 39.29 |
| 22 | −7.675 | 0.40 | 1.88300 | 40.76 |
| 23 | 37.579 | Variable | | |
| 24* | 14.191 | 2.00 | 1.52542 | 55.78 |
| 25 | −19.310 | 0.70 | | |
| 26 | ∞ | 0.30 | 1.51633 | 64.14 |
| 27 | ∞ | 0.40 | | |
| 28 | ∞ | 0.50 | 1.51633 | 64.14 |
| 29 | ∞ | 0.37 | | |
| Image plane (Light receiving surface) | ∞ | | | |

| Aspherical surface data |
|---|
| 5th surface |
| k = 0.000 |
| A4 = −2.71360e−05, A6 = −1.35516e−06, A8 = 2.99419e−08, A10 = −1.39186e−10, A12 = −4.46089e−12 |
| 6th surface |
| k = 0.000 |
| A4 = 1.89772e−05, A6 = −1.10300e−06, A8 = 1.57845e−08, A10 = 1.79050e−10, A12 = −7.15821e−12 |
| 9th surface |
| k = 0.000 |
| A4 = 1.47502e−05, A6 = −8.08548e−06 |
| 10th surface |
| k = 0.000 |
| A4 = −4.48141e−04, A6 = −2.24110e−05, A8 = −5.55792e−07, A10 = −9.67179e−08 |
| 16th surface |
| k = 0.000 |
| A4 = −2.76758e−04, A6 = −2.17307e−07, A8 = −1.19918e−06, A10 = 1.15396e−07, A12 = −5.46985e−09 |
| 17th surface |
| k = 0.000 |
| A4 = 1.00226e−04, A6 = −2.86487e−06, A8 = −5.67227e−07, A10 = 9.66144e−08, A12 = −6.30352e−09 |
| 20th surface |
| k = 0.000 |
| A4 = −8.30132e−06, A6 = 4.62547e−06, A8 = −2.21987e−06, A10 = 1.02141e−07 |
| 24th surface |
| k = 0.000 |
| A4 = −4.17529e−04, A6 = 1.93617e−05, A8 = −5.57160e−07 |

| Zoom data | | | |
|---|---|---|---|
| | Wide angle | Intermediate | Telephoto |
| Focal length | 5.04 | 14.72 | 48.69 |
| Fno. | 4.00 | 6.49 | 6.99 |
| Angle of field 2ω | 80.55 | 29.86 | 9.22 |
| fb (in air) | 2.00 | 2.00 | 2.00 |
| Lens total length(in air) | 69.93 | 69.93 | 69.93 |
| d8 | 0.30 | 6.33 | 13.97 |
| d14 | 13.97 | 7.94 | 0.30 |
| d15 | 6.60 | 1.58 | 0.40 |
| d20 | 8.45 | 9.57 | 3.88 |
| d23 | 0.73 | 4.62 | 11.49 |

| Unit focal length |
|---|
| f1 = 16.14  f2 = −8.41  f3 = 12.79  f4 = −9.78  f5 = 15.89 |

Example 3

| Unit mm | | | | |
|---|---|---|---|---|
| Surface data | | | | |
| Surface no. | r | d | nd | vd |
| Object plane | ∞ | ∞ | | |
| 1 | −36.182 | 0.60 | 1.91082 | 35.25 |
| 2 | 26.698 | 1.30 | | |
| 3 | ∞ | 12.50 | 1.90366 | 31.32 |
| 4 | ∞ | 0.20 | | |
| 5* | 27.415 | 2.51 | 1.49710 | 81.56 |
| 6* | −20.194 | 0.20 | | |
| 7 | 14.115 | 2.30 | 1.49700 | 81.61 |
| 8 | −75.293 | Variable | | |
| 9* | 19.065 | 0.40 | 1.85135 | 40.10 |
| 10* | 4.007 | 3.03 | | |
| 11 | −5.658 | 0.40 | 1.77250 | 49.60 |
| 12 | −10.960 | 0.20 | | |
| 13 | 34.741 | 1.29 | 1.92286 | 20.88 |
| 14 | −21.223 | Variable | | |
| 15(stop) | ∞ | Variable | | |
| 16* | 6.618 | 2.25 | 1.58313 | 59.38 |
| 17* | −400.190 | 2.85 | | |
| 18 | 35.885 | 0.40 | 1.91082 | 35.25 |
| 19 | 4.908 | 2.50 | 1.49710 | 81.56 |
| 20* | −9.691 | | | |
| 21 | −10.122 | 0.40 | 1.88300 | 40.76 |
| 22 | 58.737 | Variable | | |
| 23* | 18.828 | 2.25 | 1.53071 | 55.69 |
| 24* | −10.493 | 0.60 | | |

-continued

Unit mm

| | | | | |
|---|---|---|---|---|
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.37 | | |
| Image plane (Light receiving surface) | ∞ | | | |

Aspherical surface data

5th surface $k = 0.000$
$A4 = -7.68593e-05, A6 = -2.08825e-07, A8 = -2.60631e-09$ 6th surface $k = 0.000$
$A4 = -7.72156e-06, A6 = -2.45929e-07, A8 = -3.49853e-09$ 9th surface $k = 0.000$
$A4 = -3.40844e-04, A6 = 8.15533e-06, A8 = 1.31968e-09$ 10th surface $k = 0.000$
$A4 = -1.37937e-03, A6 = -5.08949e-05, A8 = 2.12493e-07,$
$A10 = -2.74517e-07$ 16th surface $k = 0.000$
$A4 = -2.70089e-04, A6 = -6.54167e-06, A8 = -4.34110e-08$ 17th surface $k = 0.000$
$A4 = 1.45744e-04, A6 = -8.09878e-06, A8 = 1.63509e-07$ 20th surface $k = 0.000$
$A4 = 1.43426e-04, A6 = 3.01580e-06, A8 = -3.98364e-07$ 23rd surface $k = 0.000$
$A4 = -4.60178e-04, A6 = 2.72937e-05, A8 = -1.21822e-06,$
$A10 = -5.38348e-10$ 24th surface $k = 0.000$
$A4 = 2.73798e-04, A6 = -6.72354e-09, A8 = -5.96964e-07,$
$A10 = -2.03935e-10$ Zoom data

| | Wide angle | Intermediate | Telephoto |
|---|---|---|---|
| Focal length | 5.01 | 14.01 | 48.18 |
| Fno. | 3.99 | 6.06 | 6.81 |
| Angle of field 2ω | 79.63 | 31.25 | 9.46 |
| fb (in air) | 1.90 | 1.90 | 1.90 |
| Lens total length(in air) | 66.97 | 66.97 | 66.97 |
| d8 | 0.50 | 6.34 | 12.94 |
| d14 | 13.22 | 7.37 | 0.78 |
| d15 | 5.33 | 1.40 | 0.93 |
| d20 | 9.29 | 11.20 | 3.66 |
| d22 | 1.15 | 3.17 | 11.16 |

Unit focal length $f1 = 14.43 \quad f2 = -7.24 \quad f3 = 12.39 \quad f4 = -9.75 \quad f5 = 13.04$ Example 4

Unit mm

Surface data

| Surface no. | r | d | nd | vd |
|---|---|---|---|---|
| Object plane | ∞ | ∞ | | |
| 1 | -35.640 | 0.60 | 1.91082 | 35.25 |
| 2 | 26.599 | 1.30 | | |
| 3 | ∞ | 12.50 | 1.90366 | 31.32 |
| 4 | ∞ | 0.20 | | |
| 5* | 34.287 | 2.57 | 1.49710 | 81.56 |
| 6* | -17.495 | 0.20 | | |
| 7 | 13.040 | 2.21 | 1.49700 | 81.61 |
| 8 | -358.603 | Variable | | |
| 9* | 23.806 | 0.45 | 1.80610 | 40.88 |
| 10* | 4.014 | 2.69 | | |
| 11 | -7.645 | 0.40 | 1.77250 | 49.60 |
| 12 | -21.350 | 0.20 | | |
| 13 | 21.001 | 1.29 | 1.92286 | 20.88 |
| 14 | -29.482 | Variable | | |
| 15(stop) | ∞ | Variable | | |
| 16* | 6.450 | 3.02 | 1.58313 | 59.38 |
| 17* | -39.000 | 1.73 | | |
| 18 | 284.896 | 0.50 | 1.91082 | 35.25 |
| 19 | 5.213 | 2.49 | 1.49710 | 81.56 |
| 20* | -9.795 | Variable | | |
| 21 | -11.803 | 0.40 | 1.88300 | 40.76 |
| 22 | 32.483 | Variable | | |
| 23* | 30.000 | 2.33 | 1.53071 | 55.69 |
| 24* | -8.370 | 0.60 | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.37 | | |
| Image plane (Light receiving surface) | ∞ | | | |

Aspherical surface data

5th surface $k = 0.000$
$A4 = -6.73485e-05, A6 = -1.91241e-07, A8 = 6.59739e-09,$
$A10 = -4.51795e-11$ 6th surface $k = 0.000$
$A4 = -8.11814e-06, A6 = -2.33240e-07, A8 = 3.97526e-09,$
$A10 = -1.65226e-11$ 9th surface $k = 0.000$
$A4 = -3.02998e-04, A6 = -1.17258e-05, A8 = 3.33223e-07,$
$A10 = 5.63001e-10$ 10th surface $k = 0.000$
$A4 = -1.17291e-03, A6 = -6.32284e-05, A8 = -2.08134e-06,$
$A10 = -2.77928e-07$ 16th surface $k = 0.000$
$A4 = -4.54822e-04, A6 = -1.39454e-05, A8 = -9.72912e-07,$
$A10 = -4.50729e-08$ 17th surface $k = 0.000$
$A4 = -1.77671e-04, A6 = -1.78840e-05, A8 = -2.45050e-06,$
$A10 = 5.39837e-08$ 20th surface $k = 0.000$
$A4 = 5.29117e-04, A6 = 8.02554e-06, A8 = 4.10645e-06,$
$A10 = -1.95603e-07$ -continued Unit mm 23th surface k = 0.000
A4 = −6.62860e−04, A6 = 1.10689e−04, A8 = −8.48041e−06,
A10 = 1.69964e−07

24th surface k = 0.000
A4 = −1.16707e−05, A6 = 1.86095e−04, A8 = −1.39048e−05,
A10 = 2.82049e−07

Zoom data

| | Wide angle | Intermediate | Telephoto |
|---|---|---|---|
| Focal length | 4.99 | 14.54 | 48.08 |
| Fno. | 3.94 | 6.11 | 6.81 |
| Angle of field 2ω | 79.83 | 29.84 | 9.31 |
| fb (in air) | 1.90 | 1.90 | 1.90 |
| Lens total length(in air) | 67.00 | 67.00 | 67.00 |
| d8 | 0.50 | 6.70 | 13.38 |
| d14 | 13.65 | 7.45 | 0.78 |
| d15 | 5.55 | 1.50 | 0.93 |
| d20 | 9.12 | 11.03 | 3.86 |
| d22 | 1.18 | 3.32 | 11.05 |

Unit focal length f1 = 14.87  f2 = −7.42  f3 = 12.14  f4 = −9.76  f5 = 12.60

Example 5

Unit mm

Surface data

| Surface no. | r | d | nd | vd |
|---|---|---|---|---|
| Object plane | ∞ | ∞ | | |
| 1 | −34.017 | 0.60 | 1.91082 | 35.25 |
| 2 | 26.036 | 1.30 | | |
| 3 | ∞ | 12.50 | 1.90366 | 31.32 |
| 4 | ∞ | 0.20 | | |
| 5* | 34.353 | 2.71 | 1.49710 | 81.56 |
| 6* | −16.380 | 0.20 | | |
| 7 | 13.188 | 2.19 | 1.49700 | 81.61 |
| 8 | 4859.001 | Variable | | |
| 9 | 23.759 | 0.45 | 1.88300 | 40.76 |
| 10 | 4.417 | 2.23 | | |
| 11* | −13.541 | 0.54 | 1.74320 | 49.29 |
| 12* | −119.194 | 0.31 | | |
| 13 | 15.321 | 1.29 | 1.94595 | 17.98 |
| 14 | −2927.944 | Variable | | |
| 15(stop) | ∞ | Variable | | |
| 16* | 6.924 | 3.02 | 1.58313 | 59.38 |
| 17* | −181.891 | 1.68 | | |
| 18 | 57.499 | 0.81 | 1.91082 | 35.25 |
| 19 | 5.604 | 2.49 | 1.49710 | 81.56 |
| 20* | −8.552 | Variable | | |
| 21 | −9.659 | 0.40 | 1.88300 | 40.76 |
| 22 | 207.971 | Variable | | |
| 23* | 30.000 | 1.96 | 1.53071 | 55.69 |
| 24* | −12.866 | 0.60 | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.37 | | |
| Image plane (Light receiving surface) | ∞ | | | |

-continued

Unit mm

Aspherical surface data

5th surface k = 0.000
A4 = −5.21636e−05, A6 = 4.12593e−07, A8 = −2.50862e−09,
A10 = −1.75695e−11

6th surface k = 0.000
A4 = 4.07273e−06, A6 = 2.68010e−07, A8 = −2.66164e−10,
A10 = −2.45670e−11

11th surface k = 0.000
A4 = 1.06235e−03, A6 = −1.54699e−04, A8 = 2.15426e−06

12th surface k = 0.000
A4 = 5.36376e−04, A6 = −1.51632e−04, A8 = 2.92988e−06

16th surface k = 0.000
A4 = −1.44787e−04, A6 = 1.02960e−06, A8 = −2.96739e−07,
A10 = 4.74654e−09

17th surface k = 0.000
A4 = 3.97649e−04, A6 = 4.43858e−06, A8 = −3.76271e−07

20th surface k = 0.000
A4 = 4.89562e−05, A6 = −2.75931e−06, A8 = −8.79122e−08,
A10 = 2.63682e−09

23rd surface k = 0.000
A4 = 2.89414e−05, A6 = 3.60745e−05, A8 = −2.55996e−06,
A10 = 6.59659e−10

24th surface k = 0.000
A4 = 4.73922e−04, A6 = 1.68428e−04, A8 = −1.28948e−05,
A10 = 2.17813e−07

Zoom data

| | Wide angle | Intermediate | Telephoto |
|---|---|---|---|
| Focal length | 4.99 | 14.45 | 47.88 |
| Fno. | 3.91 | 6.09 | 6.90 |
| Angle of field 2ω | 79.59 | 30.04 | 9.30 |
| fb (in air) | 1.92 | 1.92 | 1.92 |
| Lens total length(in air) | 67.10 | 67.10 | 67.10 |
| d8 | 0.50 | 6.93 | 13.61 |
| d14 | 13.85 | 7.45 | 0.78 |
| d15 | 5.21 | 1.51 | 0.93 |
| d20 | 9.48 | 11.00 | 3.66 |
| d22 | 1.26 | 3.44 | 11.35 |

Unit focal length f1 = 14.88  f2 = −7.49  f3 = 12.07  f4 = −10.44  f5 = 17.24

Example 6

Unit mm

Surface data

| Surface no. | r | d | nd | vd |
|---|---|---|---|---|
| Object plane | ∞ | ∞ | | |
| 1 | −35.617 | 0.60 | 1.91082 | 35.25 |
| 2 | 26.397 | 1.30 | | |
| 3 | ∞ | 12.50 | 1.90366 | 31.32 |
| 4 | ∞ | 0.20 | | |
| 5* | 40.941 | 2.54 | 1.49710 | 81.56 |
| 6* | −16.570 | 0.20 | | |
| 7 | 12.788 | 2.21 | 1.49700 | 81.61 |
| 8 | −1110.979 | Variable | | |
| 9* | 23.733 | 0.45 | 1.80610 | 40.88 |
| 10* | 3.999 | 2.45 | | |
| 11 | −7.884 | 0.40 | 1.77250 | 49.60 |
| 12 | −20.492 | 0.20 | | |
| 13 | 18.263 | 1.29 | 1.92286 | 20.88 |
| 14 | −39.100 | Variable | | |
| 15(stop) | ∞ | Variable | | |
| 16* | 6.798 | 2.81 | 1.58313 | 59.38 |
| 17* | −8284.202 | 0.30 | | |
| 18 | 22.145 | 1.37 | 1.50212 | 53.46 |
| 19 | −2002.086 | 0.97 | | |
| 20 | −1699.213 | 0.40 | 1.91082 | 35.25 |
| 21 | 5.264 | 2.49 | 1.49710 | 81.56 |
| 22* | −9.833 | Variable | | |
| 23 | −10.248 | 0.40 | 1.88300 | 40.76 |
| 24 | 57.410 | Variable | | |
| 25* | 30.000 | 2.25 | 1.53071 | 55.69 |
| 26* | −8.954 | 0.60 | | |
| 27 | ∞ | 0.30 | 1.51633 | 64.14 |
| 28 | ∞ | 0.40 | | |
| 29 | ∞ | 0.50 | 1.51633 | 64.14 |
| 30 | ∞ | 0.37 | | |
| Image plane (Light receiving surface) | ∞ | | | |

Aspherical surface data

5th surface k = 0.000
A4 = −6.25108e−05, A6 = −1.72547e−08, A8 = −2.08623e−09

6th surface k = 0.000
A4 = −5.55562e−06, A6 = −8.80122e−08, A8 = −2.30137e−09

9th surface k = 0.000
A4 = −5.72637e−04, A6 = 5.54240e−06, A8 = −1.99201e−07

10th surface k = 0.000
A4 = −1.53138e−03, A6 = −6.16398e−05, A8 = −7.50957e−08,
A10 = −4.57370e−07

16th surface k = 0.000
A4 = −3.90171e−04, A6 = −1.32077e−05, A8 = −7.49447e−07,
A10 = −2.55835e−08

17th surface k = 0.000
A4 = −1.59970e−04, A6 = −1.50117e−05, A8 = −1.89000e−06,
A10 = 3.77025e−08

22nd surface k = 0.000
A4 = 5.09649e−04, A6 = 1.71231e−06, A8 = 3.66261e−06,
A10 = −1.63600e−07

25th surface k = 0.000
A4 = −5.51937e−04, A6 = 7.16367e−07, A8 = 2.56257e−06,
A10 = −1.20484e−07

26th surface k = 0.000
A4 = 6.27287e−04, A6 = −5.56227e−05, A8 = 4.99951e−06,
A10 = −1.54861e−07

Zoom data

| | Wide angle | Intermediate | Telephoto |
|---|---|---|---|
| Focal length | 4.98 | 14.53 | 48.07 |
| Fno. | 3.89 | 5.94 | 6.87 |
| Angle of field 2ω | 80.05 | 29.84 | 9.35 |
| fb (in air) | 1.89 | 1.89 | 1.89 |
| Lens total length(in air) | 67.26 | 67.26 | 67.26 |
| d8 | 0.50 | 6.98 | 13.59 |
| d14 | 13.87 | 7.39 | 0.78 |
| d15 | 5.70 | 1.87 | 0.93 |
| d22 | 8.80 | 10.57 | 3.67 |
| d24 | 1.15 | 3.22 | 11.05 |

Unit focal length f1 = 15.08　f2 = −7.55　f3 = 12.11　f4 = −9.82　f5 = 13.26

Example 7

Unit mm

Surface data

| Surface no. | r | d | nd | vd |
|---|---|---|---|---|
| Object plane | ∞ | ∞ | | |
| 1 | −42.881 | 0.60 | 1.91082 | 35.25 |
| 2 | 24.081 | 1.37 | | |
| 3 | ∞ | 12.50 | 1.90366 | 31.32 |
| 4 | ∞ | 0.20 | | |
| 5* | 34.329 | 2.53 | 1.49710 | 81.56 |
| 6* | −17.897 | 0.20 | | |
| 7 | 13.249 | 2.21 | 1.49700 | 81.61 |
| 8 | −286.719 | Variable | | |
| 9* | 57.052 | 0.45 | 1.80610 | 40.88 |
| 10* | 4.180 | 2.56 | | |
| 11 | −8.766 | 0.40 | 1.77250 | 49.60 |
| 12 | −21.921 | 0.20 | | |
| 13 | 19.245 | 1.29 | 1.92286 | 20.88 |
| 14 | −35.971 | Variable | | |
| 15(stop) | ∞ | Variable | | |
| 16* | 6.830 | 2.05 | 1.58313 | 59.38 |
| 17* | 30.554 | 0.20 | | |
| 18 | 8.801 | 2.48 | 1.51633 | 64.14 |
| 19 | −6.508 | 0.40 | 1.77250 | 49.60 |
| 20 | 41.847 | 0.75 | | |
| 21 | 16.971 | 0.40 | 1.91082 | 35.25 |
| 22 | 5.069 | 2.49 | 1.49710 | 81.56 |
| 23* | −13.422 | Variable | | |
| 24 | −11.405 | 0.40 | 1.88300 | 40.76 |
| 25 | 38.665 | Variable | | |
| 26* | 30.000 | 2.08 | 1.53071 | 55.69 |
| 27* | −10.549 | 0.60 | | |
| 28 | ∞ | 0.30 | 1.51633 | 64.14 |
| 29 | ∞ | 0.40 | | |
| 30 | ∞ | 0.50 | 1.51633 | 64.14 |
| 31 | ∞ | 0.37 | | |
| Image plane (Light receiving surface) | ∞ | | | |

-continued

Unit mm

Aspherical surface data

5th surface k = 0.000
A4 = −5.04310e−05, A6 = −2.44765e−07, A8 = 2.47491e−10
6th surface k = 0.000
A4 = 1.98396e−06, A6 = −2.57276e−07, A8 = −6.27553e−10
9th surface k = 0.000
A4 = −3.72445e−04, A6 = −9.80828e−06, A8 = 5.60749e−07
10th surface k = 0.000
A4 = −1.35287e−03, A6 = −4.86456e−05, A8 = −3.70033e−06
16th surface k = 0.000
A4 = −4.58767e−05, A6 = 1.66566e−06, A8 = −1.18212e−07
17th surface k = 0.000
A4 = −9.44377e−05, A6 = −3.59387e−06, A8 = −4.66235e−07
23rd surface k = 0.000
A4 = 8.21514e−04, A6 = 8.38794e−06, A8 = 2.19610e−06
28th surface k = 0.000
A4 = −8.94023e−04, A6 = 9.64440e−05, A8 = −3.77249e−06
27th surface k = 0.000
A4 = −1.72418e−05, A6 = 7.65004e−05, A8 = −3.48336e−06

Zoom data

|  | Wide angle | Intermediate | Telephoto |
| --- | --- | --- | --- |
| Focal length | 5.00 | 14.49 | 48.10 |
| Fno. | 3.94 | 5.78 | 6.86 |
| Angle of field 2ω | 79.86 | 30.05 | 9.35 |
| fb (in air) | 1.89 | 1.89 | 1.89 |
| Lens total length(in air) | 67.37 | 67.37 | 67.37 |
| d8 | 0.50 | 7.05 | 13.51 |
| d14 | 13.78 | 7.23 | 0.78 |
| d15 | 5.94 | 2.21 | 0.93 |
| d23 | 8.09 | 9.94 | 3.57 |
| d25 | 1.40 | 3.29 | 10.94 |

Unit focal length

| f1 = 15.12 | f2 = −7.48 | f3 = 12.01 | f4 = −9.94 | f5 = 14.97 |

Example 8

Unit mm

Surface data

| Surface no. | r | d | nd | νd |
| --- | --- | --- | --- | --- |
| Object plane | ∞ | ∞ | | |
| 1 | −42.747 | 0.60 | 1.91082 | 35.25 |
| 2 | 23.943 | 1.39 | | |
| 3 | ∞ | 12.50 | 1.90366 | 31.32 |
| 4 | ∞ | 0.20 | | |
| 5* | 33.481 | 2.58 | 1.49710 | 81.56 |

-continued

Unit mm

| Surface no. | r | d | nd | νd |
| --- | --- | --- | --- | --- |
| 6* | −17.368 | 0.20 | | |
| 7 | 12.954 | 2.21 | 1.49700 | 81.61 |
| 8 | −1392.453 | Variable | | |
| 9* | 53.771 | 0.45 | 1.80610 | 40.88 |
| 10* | 4.139 | 2.54 | | |
| 11 | −8.289 | 0.40 | 1.77250 | 49.60 |
| 12 | −21.707 | 0.20 | | |
| 13 | 20.111 | 1.29 | 1.92286 | 20.88 |
| 14 | −30.027 | Variable | | |
| 15(stop) | ∞ | Variable | | |
| 16* | 6.788 | 2.05 | 1.58313 | 59.38 |
| 17* | 28.602 | 0.20 | | |
| 18 | 9.382 | 2.24 | 1.51633 | 64.14 |
| 19 | −8.664 | 0.41 | 1.80400 | 46.57 |
| 20 | 53.177 | 0.91 | | |
| 21 | 16.166 | 0.40 | 1.91082 | 35.25 |
| 22 | 5.106 | 2.49 | 1.49710 | 81.56 |
| 23* | −16.079 | Variable | | |
| 24 | −18.147 | 1.02 | 1.59270 | 35.31 |
| 25 | −7.692 | 0.40 | 1.88300 | 40.80 |
| 26 | 40.447 | Variable | | |
| 27* | 25.990 | 2.08 | 1.53071 | 55.69 |
| 28* | −14.110 | 0.60 | | |
| 29 | ∞ | 0.30 | 1.51633 | 64.14 |
| 30 | ∞ | 0.40 | | |
| 31 | ∞ | 0.50 | 1.51633 | 64.14 |
| 32 | ∞ | 0.37 | | |
| Image plane (Light receiving surface) | ∞ | | | |

Aspherical surface data

5th surface k = 0.000
A4 = −4.85472e−05, A6 = −2.76697e−07, A8 = 1.62474e−09
6th surface k = 0.000
A4 = 5.41766e−06, A6 = −2.92562e−07, A8 = 6.96116e−10
9th surface k = 0.000
A4 = −3.24125e−04, A6 = −1.29326e−05, A8 = 5.07407e−07
10th surface k = 0.000
A4 = −1.31262e−03, A6 = −4.50253e−05, A8 = −5.07424e−06
16th surface k = 0.000
A4 = −3.12822e−07, A6 = −1.44759e−05, A8 = 5.33715e−07
17th surface k = 0.000
A4 = 6.40750e−05, A6 = −2.36056e−05, A8 = 7.58035e−07
23rd surface k = 0.000
A4 = 7.90058e−04, A6 = 2.67963e−05, A8 = 1.04453e−06
27th surface k = 0.000
A4 = −1.15807e−03, A6 = 1.21020e−04, A8 = −4.32818e−06
28th surface k = 0.000
A4 = −7.12582e−04, A6 = 1.27701e−04, A8 = −4.79005e−06

Zoom data

|  | Wide angle | Intermediate | Telephoto |
| --- | --- | --- | --- |
| Focal length | 4.98 | 14.51 | 48.00 |
| Fno. | 3.94 | 5.78 | 6.72 |
| Angle of field 2ω | 80.02 | 30.04 | 9.37 |
| fb (in air) | 1.90 | 1.90 | 1.90 |
| Lens total length(in air) | 67.67 | 67.67 | 67.67 |

-continued

| Unit mm | | | |
|---|---|---|---|
| d8 | 0.50 | 6.96 | 13.36 |
| d14 | 13.63 | 7.17 | 0.78 |
| d15 | 5.96 | 2.21 | 0.93 |
| d23 | 7.54 | 9.28 | 2.55 |
| d26 | 1.40 | 3.40 | 11.42 |

| Unit focal length | | | | |
|---|---|---|---|---|
| f1 = 14.85 | f2 = −7.38 | f3 = 11.95 | f4 = −10.66 | f5 = 17.55 |

Example 9

| Unit mm | | | | |
|---|---|---|---|---|
| Surface data | | | | |
| Surface no. | r | d | nd | vd |
| Object plane | ∞ | ∞ | | |
| 1 | −42.638 | 0.60 | 1.91082 | 35.25 |
| 2 | 23.736 | 1.40 | | |
| 3 | ∞ | 12.50 | 1.90366 | 31.32 |
| 4 | ∞ | 0.20 | | |
| 5* | 38.203 | 2.57 | 1.49710 | 81.56 |
| 6* | −16.866 | 0.20 | | |
| 7 | 12.908 | 2.21 | 1.49700 | 81.61 |
| 8 | −1558.552 | Variable | | |
| 9* | 47.442 | 0.45 | 1.80610 | 40.88 |
| 10* | 4.181 | 2.61 | | |
| 11 | −8.399 | 0.40 | 1.77250 | 49.60 |
| 12 | −21.851 | 0.20 | | |
| 13 | 20.463 | 1.29 | 1.92286 | 20.88 |
| 14 | −30.822 | Variable | | |
| 15(stop) | ∞ | Variable | | |
| 16* | 6.740 | 2.05 | 1.58313 | 59.38 |
| 17* | 30.234 | 0.20 | | |
| 18 | 10.498 | 2.24 | 1.53172 | 48.84 |
| 19 | −7.277 | 0.40 | 1.76200 | 40.10 |
| 20 | 65.229 | 0.91 | | |
| 21 | 19.523 | 0.40 | 1.91082 | 35.25 |
| 22 | 5.069 | 2.49 | 1.49710 | 81.56 |
| 23* | −12.738 | Variable | | |
| 24 | −17.039 | 1.01 | 1.59551 | 39.24 |
| 25 | −8.122 | 0.40 | 1.88300 | 40.76 |
| 26 | 40.520 | Variable | | |
| 27* | 27.007 | 2.08 | 1.53071 | 55.69 |
| 28* | −14.348 | 0.60 | | |
| 29 | ∞ | 0.30 | 1.51633 | 64.14 |
| 30 | ∞ | 0.40 | | |
| 31 | ∞ | 0.50 | 1.51633 | 64.14 |
| 32 | ∞ | 0.37 | | |
| Image plane (Light receiving surface) | ∞ | | | |

Aspherical surface data

5th surface k = 0.000
A4 = −5.10488e−05, A6 = −2.00093e−07, A8 = 1.93559e−09

6th surface k = 0.000
A4 = 1.13214e−06, A6 = −2.28173e−07, A8 = 1.02834e−09

9th surface k = 0.000
A4 = −4.28804e−04, A6 = −9.29076e−06, A8 = 5.13867e−07

10th surface k = 0.000
A4 = −1.38831e−03, A6 = −4.73200e−05, A8 = −4.07096e−06

-continued

| Unit mm |
|---|

16th surface k = 0.000
A4 = −5.66901e−05, A6 = −4.99021e−06, A8 = 2.53365e−07

17th surface k = 0.000
A4 = 9.78066e−07, A6 = −9.59051e−06, A8 = 2.30600e−07

23rd surface k = 0.000
A4 = 6.33623e−04, A6 = 1.47846e−05, A8 = 1.10880e−06

27th surface k = 0.000
A4 = −9.17880e−04, A6 = 9.84765e−05, A8 = −3.80817e−06

28th surface k = 0.000
A4 = −3.73708e−04, A6 = 9.66563e−05, A8 = −4.09629e−06

| Zoom data | | | |
|---|---|---|---|
| | Wide angle | Intermediate | Telephoto |
| Focal length | 5.00 | 14.53 | 48.02 |
| Fno. | 3.98 | 5.82 | 6.81 |
| Angle of field 2ω | 79.84 | 29.9 | 9.37 |
| fb (in air) | 1.90 | 1.90 | 1.90 |
| Lens total length(in air) | 68.28 | 68.28 | 68.28 |
| d8 | 0.50 | 7.11 | 13.62 |
| d14 | 13.89 | 7.28 | 0.78 |
| d15 | 5.98 | 2.21 | 0.93 |
| d23 | 7.79 | 9.48 | 2.94 |
| d26 | 1.41 | 3.48 | 11.31 |

| Unit focal length | | | | |
|---|---|---|---|---|
| f1 = 15.07 | f2 = −7.52 | f3 = 12.11 | f4 = −10.67 | f5 = 17.97 |

Example 10

| Unit mm | | | | |
|---|---|---|---|---|
| Surface data | | | | |
| Surface no. | r | d | nd | vd |
| Object plane | ∞ | ∞ | | |
| 1 | 78.570 | 0.62 | 1.90200 | 25.10 |
| 2* | 12.038 | 2.73 | | |
| 3 | ∞ | 11.97 | 2.00069 | 25.46 |
| 4 | ∞ | 0.20 | | |
| 5* | 21.938 | 3.25 | 1.49700 | 81.54 |
| 6* | −13.773 | 0.20 | | |
| 7 | 29.700 | 2.07 | 1.69575 | 56.39 |
| 8 | −49.852 | Variable | | |
| 9* | −17.356 | 0.40 | 1.76802 | 49.24 |
| 10* | 6.262 | 1.30 | | |
| 11 | −16.296 | 0.50 | 1.88300 | 40.76 |
| 12 | 14.721 | 1.72 | 1.94595 | 17.98 |
| 13 | −30.504 | Variable | | |
| 14(stop) | ∞ | 0.60 | | |
| 15* | 7.086 | 1.45 | 1.58313 | 59.38 |
| 16 | 12.916 | Variable | | |
| 17 | 7.273 | 2.92 | 1.49700 | 81.54 |
| 18 | −34.798 | 0.50 | 1.90366 | 31.32 |
| 19 | 11.203 | 0.20 | | |

-continued

Unit mm

| | | | | |
|---|---|---|---|---|
| 20* | 10.919 | 2.18 | 1.52500 | 55.80 |
| 21* | −9.055 | Variable | | |
| 22 | 14.809 | 1.10 | 1.89991 | 30.66 |
| 23 | 5.293 | Variable | | |
| 24 | 29.036 | 2.60 | 1.52542 | 55.78 |
| 25 | −10.758 | 0.15 | | |
| 26 | ∞ | 0.42 | 1.51633 | 64.14 |
| 27 | ∞ | 0.50 | | |
| 28 | ∞ | 0.50 | 1.51633 | 64.14 |
| 29 | ∞ | 0.37 | | |
| Image plane (Light receiving surface) | ∞ | | | |

Aspherical surface data

2nd surface k = −4.467
A4 = 3.91245e−04, A6 = −2.16192e−06, A8 = 3.03393e−08

5th surface k = −3.000
A4 = −1.84363e−05, A6 = −5.92060e−07, A8 = 4.11059e−09

6th surface k = −0.046
A4 = 3.03309e−05, A6 = −5.52836e−07, A8 = 1.91955e−09

9th surface k = 0.000
A4 = 1.42686e−04

10th surface k = 0.000
A4 = −6.35859e−04, A6 = −6.24495e−06

15th surface k = 0.000
A4 = −3.09946e−04, A6 = −5.03020e−06

20th surface k = 0.000
A4 = −7.60026e−04

21st surface k = 0.000
A4 = 2.41202e−04

Zoom data

| | Wide angle | Intermediate | Telephoto |
|---|---|---|---|
| Focal length | 4.61 | 18.32 | 44.25 |
| Fno. | 3.97 | 5.64 | 7.00 |
| Angle of field 2ω | 81.32 | 23.56 | 10.34 |
| fb (in air) | 1.64 | 1.64 | 1.64 |
| Lens total length(in air) | 67.60 | 67.60 | 67.60 |
| d8 | 0.50 | 7.00 | 10.12 |
| d13 | 10.62 | 4.12 | 1.00 |
| d16 | 9.01 | 4.24 | 1.40 |
| d21 | 7.10 | 6.80 | 1.90 |
| d23 | 2.22 | 7.30 | 15.03 |

Unit focal length f1 = 11.14  f2 = −5.47  f3 = 24.66  f4 = 12.90
f5 = −9.68  f6 = 15.28

Example 11

Unit mm

Surface data

| Surface no. | r | d | nd | νd |
|---|---|---|---|---|
| Object plane | ∞ | ∞ | | |
| 1 | 71.194 | 0.62 | 1.90200 | 25.10 |
| 2* | 11.844 | 2.73 | | |
| 3 | ∞ | 11.97 | 2.00069 | 25.46 |
| 4 | ∞ | 0.20 | | |
| 5* | 21.524 | 3.25 | 1.49700 | 81.54 |
| 6* | −13.870 | 0.20 | | |
| 7 | 35.864 | 2.07 | 1.69680 | 55.53 |
| 8 | −39.094 | Variable | | |
| 9* | −19.044 | 0.40 | 1.76802 | 49.24 |
| 10* | 6.099 | 1.30 | | |
| 11 | −17.782 | 0.50 | 1.88300 | 40.76 |
| 12 | 14.050 | 1.72 | 1.94595 | 17.98 |
| 13 | −35.404 | Variable | | |
| 14(stop) | ∞ | 0.60 | | |
| 15* | 6.857 | 1.45 | 1.58313 | 59.38 |
| 16 | 12.449 | Variable | | |
| 17 | 7.601 | 2.92 | 1.49700 | 81.54 |
| 18 | −28.563 | 0.50 | 1.90366 | 31.32 |
| 19 | 12.457 | 0.20 | | |
| 20* | 10.745 | 2.10 | 1.52542 | 55.78 |
| 21* | −9.320 | Variable | | |
| 22 | 15.297 | 1.10 | 1.90366 | 31.32 |
| 23 | 5.292 | Variable | | |
| 24 | 32.730 | 2.83 | 1.52542 | 55.78 |
| 25 | −10.510 | 0.15 | | |
| 26 | ∞ | 0.42 | 1.51633 | 64.14 |
| 27 | ∞ | 0.50 | | |
| 28 | ∞ | 0.50 | 1.51633 | 64.14 |
| 29 | ∞ | 0.37 | | |
| Image plane (Light receiving surface) | ∞ | | | |

Aspherical surface data

2nd surface k = −4.467
A4 = 4.19128e−04, A6 = −2.47164e−06, A8 = 3.81504e−08

5th surface k = −3.000
A4 = −1.91140e−05, A6 = −7.15817e−07, A8 = 5.76963e−09

6th surface k = −0.080
A4 = 3.31594e−05, A6 = −6.59299e−07, A8 = 2.84116e−09

9th surface k = 0.000
A4 = 1.45475e−04

10th surface k = 0.000
A4 = −6.03068e−04, A6 = −8.00932e−06

15th surface k = 0.000
A4 = −3.28572e−04, A6 = −5.03020e−06

20th surface k = 0.000
A4 = −6.90145e−04

21st surface k = 0.000
A4 = 2.97105e−04

-continued

| Unit mm | | | |
|---|---|---|---|
| Zoom data | | | |
| | Wide angle | Intermediate | Telephoto |
| Focal length | 4.63 | 19.32 | 44.24 |
| Fno. | 3.97 | 5.55 | 7.00 |
| Angle of field 2ω | 81.51 | 22.46 | 10.40 |
| fb (in air) | 1.65 | 1.65 | 1.65 |
| Lens total length(in air) | 67.60 | 67.60 | 67.60 |
| d8 | 0.50 | 7.36 | 10.15 |
| d13 | 10.65 | 3.80 | 1.00 |
| d16 | 9.16 | 4.51 | 1.23 |
| d21 | 6.76 | 6.43 | 1.92 |
| d23 | 2.23 | 7.20 | 15.00 |

| Unit focal length | | | |
|---|---|---|---|
| f1 = 11.17 | f2 = −5.47 | f3 = 23.90 | f4 = 12.70 |
| f5 = −9.45 | f6 = 15.49 | | |

Example 12

| Unit mm | | | | |
|---|---|---|---|---|
| Surface data | | | | |
| Surface no. | r | d | nd | vd |
| Object plane | ∞ | ∞ | | |
| 1 | −98.334 | 0.50 | 1.91082 | 35.25 |
| 2 | 20.480 | 1.95 | | |
| 3 | ∞ | 13.00 | 2.00100 | 29.14 |
| 4 | ∞ | 0.20 | | |
| 5* | 21.440 | 2.66 | 1.49710 | 81.56 |
| 6* | −18.761 | 0.20 | | |
| 7* | 25.828 | 1.41 | 1.55332 | 71.68 |
| 8* | 1323.081 | Variable | | |
| 9* | −65.082 | 0.40 | 1.85135 | 40.10 |
| 10* | 7.926 | 1.65 | | |
| 11 | −9.658 | 0.40 | 1.59282 | 68.63 |
| 12 | 58.866 | 0.20 | | |
| 13 | 24.456 | 1.30 | 1.92286 | 20.88 |
| 14 | −33.938 | Variable | | |
| 15(stop) | ∞ | Variable | | |
| 16* | 6.078 | 3.20 | 1.58313 | 59.38 |
| 17* | −31.937 | 0.20 | | |
| 18 | 9.376 | 2.31 | 1.59551 | 39.24 |
| 19 | −5.557 | 0.40 | 1.91082 | 35.25 |
| 20 | 4.348 | 2.30 | 1.49700 | 81.54 |
| 21 | −13.641 | Variable | | |
| 22 | 17.973 | 1.64 | 1.69895 | 30.13 |
| 23 | −5.616 | 0.40 | 1.88300 | 40.76 |
| 24 | 5.645 | Variable | | |
| 25* | 353.417 | 2.40 | 1.49710 | 81.56 |
| 26* | −6.966 | 2.50 | | |
| 27 | ∞ | 0.50 | 1.51633 | 64.14 |
| 28 | ∞ | 0.50 | | |
| 29 | ∞ | 0.50 | 1.51633 | 64.14 |
| 30 | ∞ | 0.37 | | |
| Image plane (Light receiving surface) | ∞ | | | |

Aspherical surface data

5th surface k = 0.000
A4 = −5.51597e−05, A6 = −5.93424e−07, A8 = −3.06482e−08,
A10 = −2.95236e−10, A12 = 1.55158e−12

6th surface k = 0.000
A4 = −4.67636e−05, A6 = −1.85116e−06, A8 = 4.20573e−08,
A10 = −7.69147e−10, A12 = 3.11932e−12

7th surface k = 0.000
A4 = −4.21268e−05, A6 = −6.90827e−06, A8 = 4.93793e−08,
A10 = 6.78499e−10

8th surface k = 0.000
A4 = −6.67998e−06, A6 = −7.06231e−06, A8 = 3.55063e−08,
A10 = 4.25469e−10

9th surface k = 0.000
A4 = −5.25607e−04, A6 = 3.92657e−05, A8 = −1.66551e−06,
A10 = 2.85514e−08, A12 = 1.64766e−10

10th surface k = 0.000
A4 = −6.21457e−04, A6 = 4.26694e−05, A8 = −1.97602e−06,
A10 = 5.57693e−08

16th surface k = 0.000
A4 = −7.98458e−05, A6 = −6.14730e−07, A8 = 1.15974e−07,
A10 = 6.44765e−09

17th surface k = 0.000
A4 = 1.97018e−04, A6 = −5.03979e−06, A8 = 3.91512e−07,
A10 = −6.94698e−09

25th surface k = 0.000
A4 = 1.58864e−03, A6 = −1.45221e−05, A8 = −4.61592e−07,
A10 = −1.02889e−08

26th surface k = 0.000
A4 = 2.32294e−03, A6 = −5.35811e−05, A8 = 8.70541e−07,
A10 = −3.15216e−08

| Zoom data | | | |
|---|---|---|---|
| | Wide angle | Intermediate | Telephoto |
| Focal length | 5.06 | 14.00 | 48.60 |
| Fno. | 3.88 | 5.22 | 7.11 |
| Angle of field 2ω | 80.71 | 32.05 | 9.43 |
| Image height | 3.70 | 4.10 | 4.10 |
| fb (in air) | 4.04 | 4.04 | 4.04 |
| Lens total length(in air) | 69.87 | 69.87 | 69.87 |
| d8 | 0.40 | 6.31 | 13.34 |
| d14 | 13.44 | 7.53 | 0.50 |
| d15 | 10.73 | 5.32 | 0.50 |
| d21 | 3.11 | 4.90 | 8.75 |
| d24 | 1.44 | 5.05 | 6.02 |
| Zoom ratio | 9.60 | | |

| Unit focal length | | | | |
|---|---|---|---|---|
| f1 = 19.40 | f2 = −8.31 | f3 = 10.65 | f4 = −7.00 | f5 = 13.77 |

Example 13

| | Unit mm | | | |
|---|---|---|---|---|
| | Surface data | | | |
| Surface no. | r | d | nd | vd |
| Object plane | ∞ | ∞ | | |
| 1 | −137.977 | 0.50 | 1.91082 | 35.25 |
| 2 | 18.296 | 1.47 | | |
| 3 | ∞ | 13.00 | 2.00100 | 29.14 |
| 4 | ∞ | 0.20 | | |
| 5* | 27.830 | 2.42 | 1.49710 | 81.56 |
| 6* | −21.781 | 0.20 | | |
| 7* | 17.646 | 1.60 | 1.55332 | 71.68 |
| 8* | 5385.641 | Variable | | |
| 9* | −81.876 | 0.41 | 1.85135 | 40.10 |
| 10* | 8.178 | 1.62 | | |
| 11 | −8.966 | 0.43 | 1.59282 | 68.63 |
| 12 | 60.035 | 0.20 | | |
| 13 | 22.584 | 1.56 | 1.92286 | 20.88 |
| 14 | −38.516 | Variable | | |
| 15 (stop) | ∞ | Variable | | |
| 16* | 6.500 | 2.97 | 1.58313 | 59.38 |
| 17* | −35.016 | 0.20 | | |
| 18 | 9.201 | 2.44 | 1.59551 | 39.24 |
| 19 | −6.978 | 0.40 | 1.91082 | 35.25 |
| 20 | 4.312 | 1.86 | 1.49700 | 81.54 |
| 21 | −14.893 | Variable | | |
| 22 | 21.967 | 1.45 | 1.69895 | 30.13 |
| 23 | −5.828 | 0.43 | 1.88300 | 40.76 |
| 24 | 5.997 | Variable | | |
| 25* | 23.736 | 2.41 | 1.49710 | 81.56 |
| 26* | −9.274 | 2.37 | | |
| 27 | ∞ | 0.50 | 1.51633 | 64.14 |
| 28 | ∞ | 0.50 | | |
| 29 | ∞ | 0.50 | 1.51633 | 64.14 |
| 30 | ∞ | 0.37 | | |
| Image plane (Light receiving surface) | ∞ | | | |

Aspherical surface data

5th surface k = 0.000
A4 = −7.58837e−05, A6 = 5.45123e−07

6th surface k = 0.000
A4 = −1.45073e−04, A6 = 1.10767e−06

7th surface k = 0.000
A4 = 1.06820e−04, A6 = 2.03182e−07

8th surface k = 0.000
A4 = 2.21363e−04, A6 = −1.17891e−06

9th surface k = 0.000
A4 = −2.96088e−07, A6 = −3.87783e−06

10th surface k = 0.000
A4 = 3.13895e−05, A6 = −2.04445e−06

16th surface k = 0.000
A4 = −1.04239e−04, A6 = 1.59840e−09

17th surface k = 0.000
A4 = 1.44491e−04, A6 = −1.39160e−06

25th surface k = 0.000
A4 = 2.62391e−04, A6 = 6.77030e−06

26th surface k = 0.000
A4 = 3.63658e−04, A6 = 6.11788e−06

Zoom data

| | Wide angle | Intermediate | Telephoto |
|---|---|---|---|
| Focal length | 5.05 | 14.00 | 48.53 |
| Fno. | 3.91 | 6.47 | 6.97 |
| Angle of field 2ω | 77.54 | 30.95 | 9.08 |
| Image height | 3.53 | 4.04 | 4.04 |
| fb (in air) | 3.90 | 3.90 | 3.90 |
| Lens total length (in air) | 69.80 | 69.80 | 69.80 |
| d8 | 0.37 | 6.23 | 13.48 |
| d14 | 13.63 | 7.76 | 0.51 |
| d15 | 10.75 | 5.15 | 0.48 |
| d21 | 3.83 | 5.69 | 9.49 |
| d24 | 1.54 | 5.29 | 6.17 |

Zoom ratio 9.60
Unit focal length f1 = 19.46   f2 = −8.37   f3 = 10.77   f4 = −7.04   f5 = 13.75

Example 14

| | Unit mm | | | |
|---|---|---|---|---|
| | Surface data | | | |
| Surface no. | r | d | nd | vd |
| Object plane | ∞ | ∞ | | |
| 1 | −132.623 | 0.50 | 1.91082 | 35.25 |
| 2 | 18.296 | 1.47 | | |
| 3 | ∞ | 13.00 | 2.00100 | 29.14 |
| 4 | ∞ | 0.20 | | |
| 5* | 43.270 | 2.21 | 1.49710 | 81.56 |
| 6* | −22.037 | 0.20 | | |
| 7* | 14.958 | 1.75 | 1.55332 | 71.68 |
| 8* | 7727.761 | Variable | | |
| 9* | −145.984 | 0.41 | 1.85135 | 40.10 |
| 10* | 8.728 | 1.62 | | |
| 11 | −9.318 | 0.39 | 1.59282 | 68.63 |
| 12 | 30.708 | 0.20 | | |
| 13 | 20.760 | 1.56 | 1.92286 | 20.88 |
| 14 | −46.693 | Variable | | |
| 15 (stop) | ∞ | Variable | | |
| 16* | 6.557 | 2.69 | 1.58313 | 59.38 |
| 17* | −26.447 | 0.20 | | |
| 18 | 9.627 | 2.44 | 1.59551 | 39.24 |
| 19 | −8.768 | 0.40 | 1.91082 | 35.25 |
| 20 | 4.168 | 2.13 | 1.49700 | 81.54 |
| 21 | −19.880 | Variable | | |
| 22 | 23.443 | 1.40 | 1.64769 | 33.79 |
| 23 | −6.484 | 0.43 | 1.88300 | 40.76 |
| 24 | 6.015 | Variable | | |
| 25* | 22.243 | 2.43 | 1.53172 | 48.84 |
| 26* | −8.736 | 2.37 | | |
| 27 | ∞ | 0.50 | 1.51633 | 64.14 |
| 28 | ∞ | 0.50 | | |
| 29 | ∞ | 0.50 | 1.51633 | 64.14 |
| 30 | ∞ | 0.37 | | |
| Image plane (Light receiving surface) | ∞ | | | |

-continued

Unit mm

Aspherical surface data

5th surface k = 0.000
A4 = −4.55241e−05, A6 = −2.33780e−08, A8 = 1.48317e−08

6th surface k = 0.000
A4 = −1.68731e−04, A6 = 1.41600e−06, A8 = 6.57008e−10

7th surface k = 0.000
A4 = 2.06812e−05, A6 = 1.79092e−06, A8 = −8.19542e−09

8th surface k = 0.000
A4 = 1.70175e−04, A6 = −2.41460e−08

9th surface k = 0.000
A4 = −5.26699e−05, A6 = −3.68749e−06

10th surface k = 0.000
A4 = 5.82584e−06, A6 = −3.53034e−06

16th surface k = 0.000
A4 = −1.66951e−04, A6 = −1.04540e−06, A8 = −5.80901e−08

17th surface k = 0.000
A4 = 1.60669e−04, A6 = −7.77575e−07, A8 = 1.18726e−08

25th surface k = 0.000
A4 = 3.00054e−04, A6 = 9.96891e−06, A8 = −4.89032e−07

26th surface k = 0.000
A4 = 3.83113e−04, A6 = 1.67824e−05, A8 = −6.61553e−07

Zoom data

|  | Wide angle | Intermediate | Telephoto |
|---|---|---|---|
| Focal length | 5.06 | 14.00 | 48.54 |
| Fno. | 3.98 | 4.49 | 7.20 |
| Angle of field 2ω | 77.84 | 30.98 | 9.10 |
| Image height | 3.53 | 4.04 | 4.04 |
| fb (in air) | 3.91 | 3.91 | 3.91 |
| Lens total length (in air) | 69.77 | 69.77 | 69.77 |
| d8 | 0.37 | 6.58 | 13.49 |
| d14 | 13.62 | 7.42 | 0.51 |
| d15 | 10.93 | 5.59 | 0.48 |
| d21 | 3.73 | 5.66 | 9.86 |
| d24 | 1.55 | 4.96 | 5.85 |

Zoom ratio 9.60
Unit focal length f1 = 19.69  f2 = −8.44  f3 = 10.68  f4 = −6.60  f5 = 12.13

Example 15

Unit mm

Surface data

| Surface no. | r | d | nd | νd |
|---|---|---|---|---|
| Object plane | ∞ | ∞ |  |  |
| 1 | −129.166 | 0.50 | 1.91082 | 35.25 |
| 2 | 18.296 | 1.47 |  |  |
| 3 | ∞ | 13.00 | 2.00100 | 29.14 |
| 4 | ∞ | 0.20 |  |  |
| 5* | 65.650 | 2.11 | 1.49710 | 81.56 |
| 6* | −21.117 | 0.20 |  |  |
| 7* | 13.823 | 1.85 | 1.55332 | 71.68 |
| 8* | 5692.200 | Variable |  |  |
| 9* | −907.669 | 0.40 | 1.85135 | 40.10 |
| 10* | 8.467 | 1.62 |  |  |
| 11 | −9.091 | 0.39 | 1.59282 | 68.63 |
| 12 | 30.439 | 0.20 |  |  |
| 13 | 20.306 | 1.56 | 1.92286 | 20.88 |
| 14 | −48.932 | Variable |  |  |
| 15 (stop) | ∞ | Variable |  |  |
| 16* | 6.534 | 2.69 | 1.58313 | 59.38 |
| 17* | −25.694 | 0.20 |  |  |
| 18 | 9.329 | 2.44 | 1.59551 | 39.24 |
| 19 | −8.081 | 0.40 | 1.91082 | 35.25 |
| 20 | 4.135 | 2.13 | 1.49700 | 81.54 |
| 21 | −21.153 | Variable |  |  |
| 22 | 23.639 | 1.40 | 1.64769 | 33.79 |
| 23 | −7.477 | 0.43 | 1.88300 | 40.76 |
| 24 | 5.877 | Variable |  |  |
| 25* | 18.883 | 2.43 | 1.53172 | 48.84 |
| 26* | −9.202 | 2.37 |  |  |
| 27 | ∞ | 0.50 | 1.51633 | 64.14 |
| 28 | ∞ | 0.50 |  |  |
| 29 | ∞ | 0.50 | 1.51633 | 64.14 |
| 30 | ∞ | 0.37 |  |  |
| Image plane (Light receiving surface) | ∞ |  |  |  |

Aspherical surface data

5th surface k = 0.000
A4 = −1.24832e−05, A6 = 6.31971e−08, A8 = −8.27908e−09

6th surface k = 0.000
A4 = −1.09287e−04, A6 = −2.35334e−08, A8 = −4.30611e−09

7th surface k = 0.000
A4 = 3.46230e−05, A6 = 4.65553e−07, A8 = −1.01576e−10

8th surface k = 0.000
A4 = 1.58583e−04, A6 = 1.64633e−08, A8 = −5.91667e−09

9th surface k = 0.000
A4 = −3.66388e−05, A6 = −5.04628e−07, A8 = −1.15637e−07

10th surface k = 0.000
A4 = 2.95952e−05, A6 = 2.25204e−07, A8 = −7.86366e−09

16th surface k = 0.000
A4 = −1.64568e−04, A6 = −1.05784e−06, A8 = −2.51354e−08

17th surface k = 0.000
A4 = 1.36188e−04, A6 = −5.89279e−07, A8 = 2.03536e−08

-continued

Unit mm

25th surface k = 0.000
A4 = 3.05336e−04, A6 = −1.69536e−06, A8 = 1.36858e−07

26th surface k = 0.000
A4 = 4.24812e−04, A6 = −3.79914e−06, A8 = 2.10868e−07

Zoom data

|  | Wide angle | Intermediate | Telephoto |
|---|---|---|---|
| Focal length | 5.05 | 14.00 | 48.54 |
| Fno. | 3.95 | 4.29 | 7.04 |
| Angle of field 2ω | 77.83 | 31.01 | 9.15 |
| Image height | 3.53 | 4.04 | 4.04 |
| fb (in air) | 3.91 | 3.91 | 3.91 |
| Lens total length (in air) | 69.59 | 69.59 | 69.59 |
| d8 | 0.37 | 6.66 | 13.30 |
| d14 | 13.46 | 7.17 | 0.51 |
| d15 | 11.02 | 5.82 | 0.48 |
| d21 | 3.64 | 5.58 | 9.69 |
| d24 | 1.56 | 4.82 | 6.06 |

Zoom ratio 9.60
Unit focal length

| f1 = 19.43 | f2 = −8.44 | f3 = 10.68 | f4 = −6.66 | f5 = 12.00 |
|---|---|---|---|---|

Example 16

Unit mm

Surface data

| Surface no. | r | d | nd | vd |
|---|---|---|---|---|
| Object plane | ∞ | ∞ | | |
| 1 | −112.366 | 0.50 | 1.91082 | 35.25 |
| 2 | 18.296 | 1.47 | | |
| 3 | ∞ | 13.00 | 2.00100 | 29.14 |
| 4 | ∞ | 0.20 | | |
| 5* | 82.022 | 2.39 | 1.49710 | 81.56 |
| 6* | −16.273 | 0.20 | | |
| 7* | 15.352 | 1.72 | 1.55332 | 71.68 |
| 8* | 1427.365 | Variable | | |
| 9* | −250203.591 | 0.39 | 1.75501 | 51.16 |
| 10* | 8.727 | 1.62 | | |
| 11 | −9.152 | 0.39 | 1.59282 | 68.63 |
| 12 | 26.976 | 0.20 | | |
| 13 | 17.142 | 1.32 | 1.92286 | 20.88 |
| 14 | −973.070 | Variable | | |
| 15 (stop) | ∞ | Variable | | |
| 16* | 6.192 | 2.79 | 1.58313 | 59.38 |
| 17* | −146.606 | 0.20 | | |
| 18 | 5.810 | 2.92 | 1.48749 | 70.23 |
| 19 | −7.862 | 0.40 | 1.88300 | 40.80 |
| 20 | 3.212 | 2.13 | 1.49700 | 81.54 |
| 21 | −16.400 | Variable | | |
| 22 | 15354.346 | 1.41 | 1.76182 | 26.52 |
| 23 | −6.166 | 0.43 | 1.80440 | 39.59 |
| 24 | 5.920 | Variable | | |
| 25* | 24.669 | 2.43 | 1.53172 | 48.84 |
| 26* | −7.051 | 2.37 | | |
| 27 | ∞ | 0.50 | 1.51633 | 64.14 |
| 28 | ∞ | 0.50 | | |
| 29 | ∞ | 0.50 | 1.51633 | 64.14 |
| 30 | ∞ | 0.37 | | |
| Image plane (Light receiving surface) | ∞ | | | |

-continued

Unit mm

Aspherical surface data

5th surface k = 0.000
A4 = −9.72583e−05, A6 = −1.14815e−06

6th surface k = 0.000
A4 = −1.64900e−04, A6 = 5.12672e−10

7th surface k = 0.000
A4 = −1.63782e−05, A6 = −1.43472e−07

8th surface k = 0.000
A4 = 8.04670e−05, A6 = −1.85197e−06

9th surface k = 0.000
A4 = −2.17142e−04, A6 = −9.09137e−08

10th surface k = 0.000
A4 = −1.64195e−04, A6 = 5.14316e−06

16th surface k = 0.000
A4 = 6.59237e−05, A6 = −4.72725e−07

17th surface k = 0.000
A4 = 3.75225e−04, A6 = −7.37063e−06

25th surface k = 0.000
A4 = 3.50837e−04, A6 = −1.51972e−05

26th surface k = 0.000
A4 = 7.20378e−04, A6 = −1.46566e−05

Zoom data

|  | Wide angle | Intermediate | Telephoto |
|---|---|---|---|
| Focal length | 5.04 | 13.97 | 48.48 |
| Fno. | 3.72 | 5.89 | 7.08 |
| Angle of field 2ω | 77.98 | 30.82 | 9.22 |
| Image height | 3.53 | 4.04 | 4.04 |
| fb (in air) | 3.87 | 3.87 | 3.87 |
| Lens total length (in air) | 68.58 | 68.58 | 68.58 |
| d8 | 0.37 | 6.41 | 12.40 |
| d14 | 12.55 | 6.51 | 0.51 |
| d15 | 11.38 | 6.27 | 0.48 |
| d21 | 2.64 | 4.72 | 9.46 |
| d24 | 1.67 | 4.69 | 5.74 |

Zoom ratio 9.62
Unit focal length

| f1 = 18.57 | f2 = −8.36 | f3 = 10.39 | f4 = −7.00 | f5 = 10.60 |
|---|---|---|---|---|

Aberration diagrams at the time of infinite object point focusing of the embodiments from the first embodiment to the sixteenth embodiment are shown in FIG. 17A to FIG. 32L respectively. In the diagrams, 'ω' denotes a half angle of field.

FIG. 17A to FIG. 17L show aberration diagrams at the time of infinite object point focusing of the first embodiment. FIG. 17A, FIG. 17B, FIG. 17C, and FIG. 17D show a spherical aberration (SA), an astigmatism (AS), a distortion (DT), and a chromatic aberration of magnification (CC) respectively, at a wide angle end state. FIG. 17E, FIG. 17F, FIG. 17G, and FIG. 17H show a spherical aberration (SA), an astigmatism (AS), a distortion (DT), and a chromatic aberration of magnification (CC) respectively, at an intermediate focal length state. FIG. 17I, FIG. 17J, FIG. 17K, and FIG. 17L show a spherical aberration (SA), an astigmatism (AS), a distortion (DT), and a chromatic aberration of magnification (CC) respectively, at a telephoto end state.

FIG. 18A to FIG. 18L show aberration diagrams at the time of infinite object point focusing of the second embodiment. FIG. 18A, FIG. 18B, FIG. 18C, and FIG. 18D show a spherical aberration (SA), an astigmatism (AS), a distortion (DT), and a chromatic aberration of magnification (CC) respectively, at a wide angle end state. FIG. 18E, FIG. 18F, FIG. 18G, and FIG. 18H show a spherical aberration (SA), an astigmatism (AS), a distortion (DT), and a chromatic aberration of magnification (CC) respectively, at an intermediate focal length state. FIG. 18I, FIG. 18J, FIG. 18K, and FIG. 18L show a spherical aberration (SA), an astigmatism (AS), a distortion (DT), and a chromatic aberration of magnification (CC) respectively, at a telephoto end state.

FIG. 19A to FIG. 19L show aberration diagrams at the time of infinite object point focusing of the third embodiment. FIG. 19A, FIG. 19B, FIG. 19C, and FIG. 19D show a spherical aberration (SA), an astigmatism (AS), a distortion (DT), and a chromatic aberration of magnification (CC) respectively, at a wide angle end state. FIG. 19E, FIG. 19F, FIG. 19G, and FIG. 19H show a spherical aberration (SA), an astigmatism (AS), a distortion (DT), and a chromatic aberration of magnification (CC) respectively, at an intermediate focal length state. FIG. 19I, FIG. 19J, FIG. 19K, and FIG. 19L show a spherical aberration (SA), an astigmatism (AS), a distortion (DT), and a chromatic aberration of magnification (CC) respectively, at a telephoto end state.

FIG. 20A to FIG. 20L show aberration diagrams at the time of infinite object point focusing of the fourth embodiment. FIG. 20A, FIG. 20B, FIG. 20C, and FIG. 20D show a spherical aberration (SA), an astigmatism (AS), a distortion (DT), and a chromatic aberration of magnification (CC) respectively, at a wide angle end state. FIG. 20E, FIG. 20F, FIG. 20G, and FIG. 20H show a spherical aberration (SA), an astigmatism (AS), a distortion (DT), and a chromatic aberration of magnification (CC) respectively, at an intermediate focal length state. FIG. 20I, FIG. 20J, FIG. 20K, and FIG. 20L show a spherical aberration (SA), an astigmatism (AS), a distortion (DT), and a chromatic aberration of magnification (CC) respectively, at a telephoto end state.

FIG. 21A to FIG. 21L show aberration diagrams at the time of infinite object point focusing of the fifth embodiment. FIG. 21A, FIG. 21B, FIG. 21C, and FIG. 21D show a spherical aberration (SA), an astigmatism (AS), a distortion (DT), and a chromatic aberration of magnification (CC) respectively, at a wide angle end state. FIG. 21E, FIG. 21F, FIG. 21G, and FIG. 21H show a spherical aberration (SA), an astigmatism (AS), a distortion (DT), and a chromatic aberration of magnification (CC) respectively, at an intermediate focal length state. FIG. 21I, FIG. 21J, FIG. 21K, and FIG. 21L show a spherical aberration (SA), an astigmatism (AS), a distortion (DT), and a chromatic aberration of magnification (CC) respectively, at a telephoto end state.

FIG. 22A to FIG. 22L show aberration diagrams at the time of infinite object point focusing of the sixth embodiment. FIG. 22A, FIG. 22B, FIG. 22C, and FIG. 22D show a spherical aberration (SA), an astigmatism (AS), a distortion (DT), and a chromatic aberration of magnification (CC) respectively, at a wide angle end state. FIG. 22E, FIG. 22F, FIG. 22G, and FIG. 22H show a spherical aberration (SA), an astigmatism (AS), a distortion (DT), and a chromatic aberration of magnification (CC) respectively, at an intermediate focal length state. FIG. 22I, FIG. 22J, FIG. 22K, and FIG. 22L show a spherical aberration (SA), an astigmatism (AS), a distortion (DT), and a chromatic aberration of magnification (CC) respectively, at a telephoto end state.

FIG. 23A to FIG. 23L show aberration diagrams at the time of infinite object point focusing of the seventh embodiment. FIG. 23A, FIG. 23B, FIG. 23C, and FIG. 23D show a spherical aberration (SA), an astigmatism (AS), a distortion (DT), and a chromatic aberration of magnification (CC) respectively, at a wide angle end state. FIG. 23E, FIG. 23F, FIG. 23G, and FIG. 23H show a spherical aberration (SA), an astigmatism (AS), a distortion (DT), and a chromatic aberration of magnification (CC) respectively, at an intermediate focal length state. FIG. 23I, FIG. 23J, FIG. 23K, and FIG. 23L show a spherical aberration (SA), an astigmatism (AS), a distortion (DT), and a chromatic aberration of magnification (CC) respectively, at a telephoto end state.

FIG. 24A to FIG. 24L show aberration diagrams at the time of infinite object point focusing of the eighth embodiment. FIG. 24A, FIG. 24B, FIG. 24C, and FIG. 24D show a spherical aberration (SA), an astigmatism (AS), a distortion (DT), and a chromatic aberration of magnification (CC) respectively, at a wide angle end state. FIG. 24E, FIG. 24F, FIG. 24G, and FIG. 24H show a spherical aberration (SA), an astigmatism (AS), a distortion (DT), and a chromatic aberration of magnification (CC) respectively, at an intermediate focal length state. FIG. 24I, FIG. 24J, FIG. 24K, and FIG. 24L show a spherical aberration (SA), an astigmatism (AS), a distortion (DT), and a chromatic aberration of magnification (CC) respectively, at a telephoto end state.

FIG. 25A to FIG. 25L show aberration diagrams at the time of infinite object point focusing of the ninth embodiment. FIG. 25A, FIG. 25B, FIG. 25C, and FIG. 25D show a spherical aberration (SA), an astigmatism (AS), a distortion (DT), and a chromatic aberration of magnification (CC) respectively, at a wide angle end state. FIG. 25E, FIG. 25F, FIG. 25G, and FIG. 25H show a spherical aberration (SA), an astigmatism (AS), a distortion (DT), and a chromatic aberration of magnification (CC) respectively, at an intermediate focal length state. FIG. 25I, FIG. 25J, FIG. 25K, and FIG. 25L show a spherical aberration (SA), an astigmatism (AS), a distortion (DT), and a chromatic aberration of magnification (CC) respectively, at a telephoto end state.

FIG. 26A to FIG. 26L show aberration diagrams at the time of infinite object point focusing of the tenth embodiment. FIG. 26A, FIG. 26B, FIG. 26C, and FIG. 26D show a spherical aberration (SA), an astigmatism (AS), a distortion (DT), and a chromatic aberration of magnification (CC) respectively, at a wide angle end state. FIG. 26E, FIG. 26F, FIG. 26G, and FIG. 26H show a spherical aberration (SA), an astigmatism (AS), a distortion (DT), and a chromatic aberration of magnification (CC) respectively, at an intermediate focal length state. FIG. 26I, FIG. 26J, FIG. 26K, and FIG. 26L show a spherical aberration (SA), an astigmatism (AS), a distortion (DT), and a chromatic aberration of magnification (CC) respectively, at a telephoto end state.

FIG. 27A to FIG. 27L show aberration diagrams at the time of infinite object point focusing of the eleventh embodiment. FIG. 27A, FIG. 27B, FIG. 27C, and FIG. 27D show a spherical aberration (SA), an astigmatism (AS), a distortion (DT), and a chromatic aberration of magnification (CC) respectively, at a wide angle end state. FIG. 27E, FIG. 27F, FIG. 27G, and FIG. 27H show a spherical aberration (SA), an astigmatism (AS), a distortion (DT), and a chromatic aberration of magnification (CC) respectively, at an intermediate focal length state. FIG. 27I, FIG. 27J, FIG. 27K, and FIG. 27L show a spherical aberration (SA), an astigmatism (AS), a distortion (DT), and a chromatic aberration of magnification (CC) respectively, at a telephoto end state.

FIG. 28A to FIG. 28L show aberration diagrams at the time of infinite object point focusing of the twelfth embodiment. FIG. 28A, FIG. 28B, FIG. 28C, and FIG. 28D show a spherical aberration (SA), an astigmatism (AS), a distortion (DT), and a chromatic aberration of magnification (CC) respectively, at a wide angle end state. FIG. 28E, FIG. 28F, FIG. 28G, and FIG. 28H show a spherical aberration (SA), an astigmatism (AS), a distortion (DT), and a chromatic aberration of magnification (CC) respectively, at an intermediate focal length state. FIG. 28I, FIG. 28J, FIG. 28K, and FIG. 28L show a spherical aberration (SA), an astigmatism (AS), a distortion (DT), and a chromatic aberration of magnification (CC) respectively, at a telephoto end state.

FIG. 29A to FIG. 29L show aberration diagrams at the time of infinite object point focusing of the thirteenth embodiment. FIG. 29A, FIG. 29B, FIG. 29C, and FIG. 29D show a spherical aberration (SA), an astigmatism (AS), a distortion (DT), and a chromatic aberration of magnification (CC) respectively, at a wide angle end state. FIG. 29E, FIG. 29F, FIG. 29G, and FIG. 29H show a spherical aberration (SA), an astigmatism (AS), a distortion (DT), and a chromatic aberration of magnification (CC) respectively, at an intermediate focal length state. FIG. 29I, FIG. 29J, FIG. 29K, and FIG. 29L show a spherical aberration (SA), an astigmatism (AS), a distortion (DT), and a chromatic aberration of magnification (CC) respectively, at a telephoto end state.

FIG. 30A to FIG. 30L show aberration diagrams at the time of infinite object point focusing of the fourteenth embodiment. FIG. 30A, FIG. 30B, FIG. 30C, and FIG. 30D show a spherical aberration (SA), an astigmatism (AS), a distortion (DT), and a chromatic aberration of magnification (CC) respectively, at a wide angle end state. FIG. 30E, FIG. 30F, FIG. 30G, and FIG. 30H show a spherical aberration (SA), an astigmatism (AS), a distortion (DT), and a chromatic aberration of magnification (CC) respectively, at an intermediate focal length state. FIG. 30I, FIG. 30J, FIG. 30K, and FIG. 30L show a spherical aberration (SA), an astigmatism (AS), a distortion (DT), and a chromatic aberration of magnification (CC) respectively, at a telephoto end state.

FIG. 31A to FIG. 31L show aberration diagrams at the time of infinite object point focusing of the fifteenth embodiment. FIG. 31A, FIG. 31B, FIG. 31C, and FIG. 31D show a spherical aberration (SA), an astigmatism (AS), a distortion (DT), and a chromatic aberration of magnification (CC) respectively, at a wide angle end state. FIG. 31E, FIG. 31F, FIG. 31G, and FIG. 31H show a spherical aberration (SA), an astigmatism (AS), a distortion (DT), and a chromatic aberration of magnification (CC) respectively, at an intermediate focal length state. FIG. 31I, FIG. 31J, FIG. 31K, and FIG. 31L show a spherical aberration (SA), an astigmatism (AS), a distortion (DT), and a chromatic aberration of magnification (CC) respectively, at a telephoto end state.

FIG. 32A to FIG. 32L show aberration diagrams at the time of infinite object point focusing of the sixteenth embodiment. FIG. 32A, FIG. 32B, FIG. 32C, and FIG. 32D show a spherical aberration (SA), an astigmatism (AS), a distortion (DT), and a chromatic aberration of magnification (CC) respectively, at a wide angle end state. FIG. 32E, FIG. 32F, FIG. 32G, and FIG. 32H show a spherical aberration (SA), an astigmatism (AS), a distortion (DT), and a chromatic aberration of magnification (CC) respectively, at an intermediate focal length state. FIG. 32I, FIG. 32J, FIG. 32K, and FIG. 32L show a spherical aberration (SA), an astigmatism (AS), a distortion (DT), and a chromatic aberration of magnification (CC) respectively, at a telephoto end state.

Next, parameter and values of conditional expressions in each embodiments are described.

|  | Example 1 | Example 2 | Example 3 | Example 4 |
|---|---|---|---|---|
| (1A) (5A) | 0.308 | 0.331 | 0.300 | 0.309 |
| (2A) (6A) | −0.152 | −0.173 | −0.150 | −0.154 |
| (3A) | 7.888 | 8.148 | 11.092 | 10.502 |
| (4A) | 1.224 | 1.187 | 0.867 | 0.917 |
| (7A) | 9.667 | 9.697 | 9.624 | 9.605 |
| (8A) (9A) | 2.528 | 2.582 | 2.495 | 2.503 |
| (10A) | 46.31 | 46.31 | 46.31 | 46.31 |
| (11A) | 46.36 | 36.43 | 46.36 | 46.36 |
| (12A) | 1.400 | 1.526 | 1.532 | 1.406 |
| (13A) | −3.544 | −1.252 | −3.134 | −2.116 |
| (14A) | — | 0.295 | — | — |
| (15A) | 2.189 | 2.515 | 3.200 | 2.989 |
| (16A) | 1.281 | 1.305 | 1.298 | 1.294 |

|  | Example 5 | Example 6 | Example 7 | Example 8 |
|---|---|---|---|---|
| (1A) (5A) | 0.311 | 0.314 | 0.314 | 0.309 |
| (2A) (6A) | −0.156 | −0.157 | −0.156 | −0.154 |
| (3A) | 11.799 | 10.085 | 8.896 | 9.562 |
| (4A) | 0.814 | 0.957 | 1.082 | 1.007 |
| (7A) | 9.553 | 9.666 | 9.634 | 9.662 |
| (8A) (9A) | 2.507 | 2.509 | 2.501 | 2.508 |
| (10A) | 46.31 | 46.31 | 46.31 | 46.31 |
| (11A) | 46.36 | 46.36 | 46.36 | 46.36 |
| (12A) | 1.457 | 1.405 | 1.158 | 1.167 |
| (13A) | −1.256 | −2.251 | −2.333 | −2.236 |
| (14A) | — | — | — | 0.290 |
| (15A) | 3.339 | 2.885 | 2.453 | 2.620 |
| (16A) | 1.291 | 1.291 | 1.295 | 1.291 |

|  | Example 9 | Example 10 | Example 11 |
|---|---|---|---|
| (1A) (5A) | 0.314 | 0.252 | 0.253 |
| (2A) (6A) | −0.157 | −0.124 | −0.124 |
| (3A) | 9.323 | 8.060 | 7.794 |
| (4A) | 1.031 | 1.190 | 1.226 |
| (7A) | 9.616 | 9.611 | 9.568 |
| (8A) (9A) | 2.502 | 2.595 | 2.586 |
| (10A) | 46.31 | 56.44 | 56.44 |
| (11A) | 46.36 | 31.2865 | 30.43 |
| (12A) | 1.193 | 0.470 | 0.515 |
| (13A) | −2.249 | 0.051 | 0.117 |
| (14A) | 0.287 | — | — |
| (15A) | 2.527 | 2.848 | 2.761 |
| (16A) | 1.294 | 1.201 | 1.206 |

Incidentally, in the twelfth embodiment to sixteenth embodiment, as described later, the effective image pickup area is designed to be a barrel shape to correct a distortion of barrel shape occurs near the wide angle end.

Accordingly, in the twelfth embodiment to sixteenth embodiment, the image height IH at the wide angle end is smaller than the image height IH at the intermediate focal length state and the image height IH at the telephoto end.

|  | Example 12 | Example 13 | Example 14 | Example 15 | Example 16 |
|---|---|---|---|---|---|
| (1B) | 9.60 | 9.60 | 9.60 | 9.60 | 9.62 |
| (2B) | −0.33 | −0.28 | −0.33 | −0.35 | −0.31 |

-continued

|      | Example 12 | Example 13 | Example 14 | Example 15 | Example 16 |
|------|-----------|-----------|-----------|-----------|-----------|
| (3B) | 46.29 | 46.29 | 46.29 | 46.29 | 40.74 |
| (4B) | 0.10 | 0.08 | 0.11 | 0.11 | 0.08 |
| (5B) | −0.19 | −0.24 | −0.35 | −0.39 | −0.48 |
| (6B) | −1.52 | −1.53 | −1.62 | −1.60 | −1.48 |
| (7B) | 2.95 | 2.99 | 2.91 | 2.92 | 2.85 |
| (8B) | 2.52 | 2.49 | 2.60 | 2.57 | 2.72 |
| (9B) | 1.29 | 1.28 | 1.26 | 1.28 | 1.24 |
| (10B)| 2.57 | 2.57 | 2.57 | 2.57 | 2.58 |

(Correction of Distortion)

Incidentally, when the zoom lens system of the present invention is used, a digital correction of distortion of an image may be carried out electrically. Therefore, the image height IH near the wide angle end is designed to be small, and the effective image pickup area near the wide angle end is designed to be a barrel shape. A basic concept for the digital correction of the distortion of an image will be described below.

Figure 33:
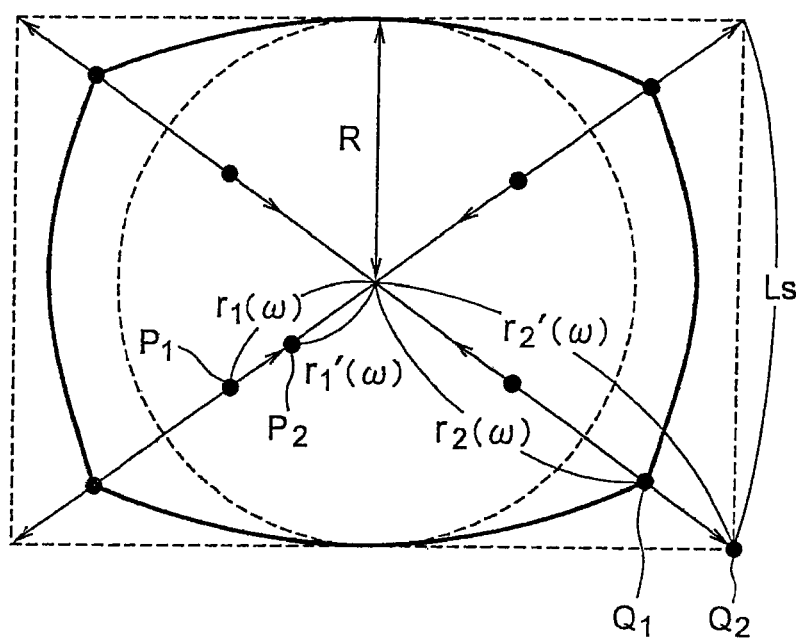
FIG. 33 illustrates correction of distortion.

For example, as shown in FIG. 33, with a point of intersection of an optical axis and an image pickup plane to be a center, a magnification on a circumference (image height) of a circle of radius R making a contact internally with a longer side of an effective image pickup plane is fixed, and this circumference is let to be abase reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 33, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \, (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between r ($\omega$), in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) \alpha \cdot f \cdot \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 34:
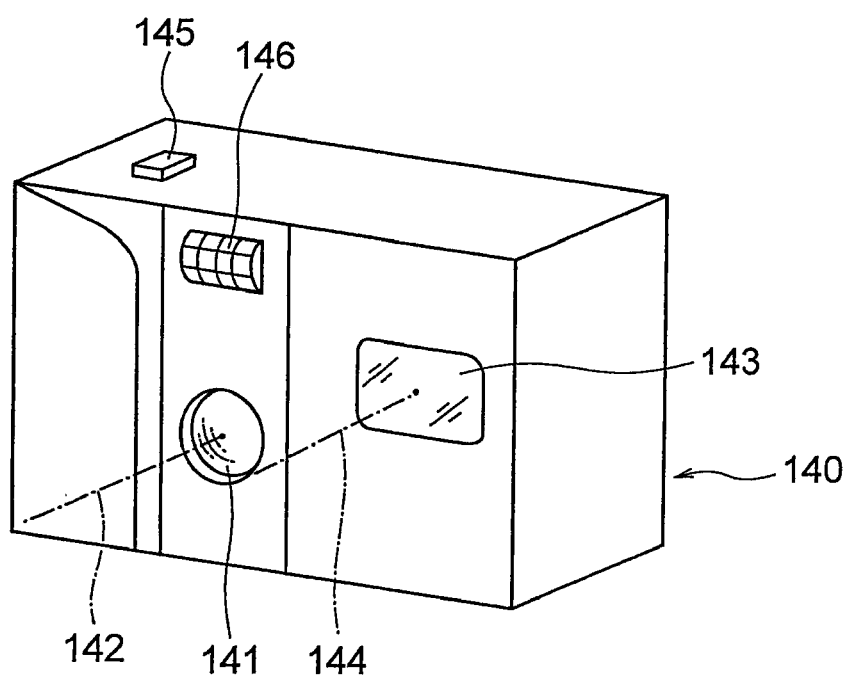
FIG. 34 is a front perspective view showing the outer appearance of a digital camera equipped with a zoom lens having a bent optical path according to the present invention.
Figure 35:
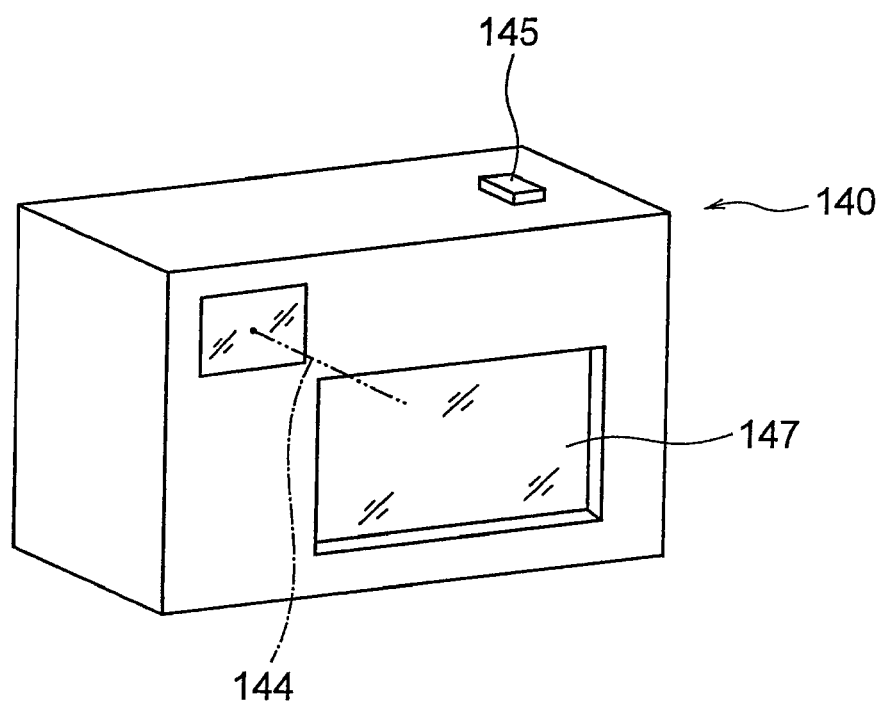
FIG. 35 is a rear perspective view of the digital camera.

FIG. 34 to FIG. 36 are conceptual diagrams of a structure of a digital camera according to the present invention in which a zoom lens system described above is incorporated in a taking optical system 141. FIG. 34 is a front perspective view showing an appearance of a digital camera 140, FIG. 35 is a rear perspective view of the same, and FIG. 36 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since, in the digital camera 140 structured in such manner, the taking optical system 141 has a high zoom ratio of 10 magnifications and the zoom lens has a high optical performance, it is possible to realize the high-performance inexpensive digital camera in which the depth is extremely thin.

Further, the example shown in FIG. 36, a plane parallel plate is disposed as the cover member 150. However, a lens having a power could be used. Furthermore, the cover member 150 could be omitted.

(Internal Circuit Structure)

Figure 37:
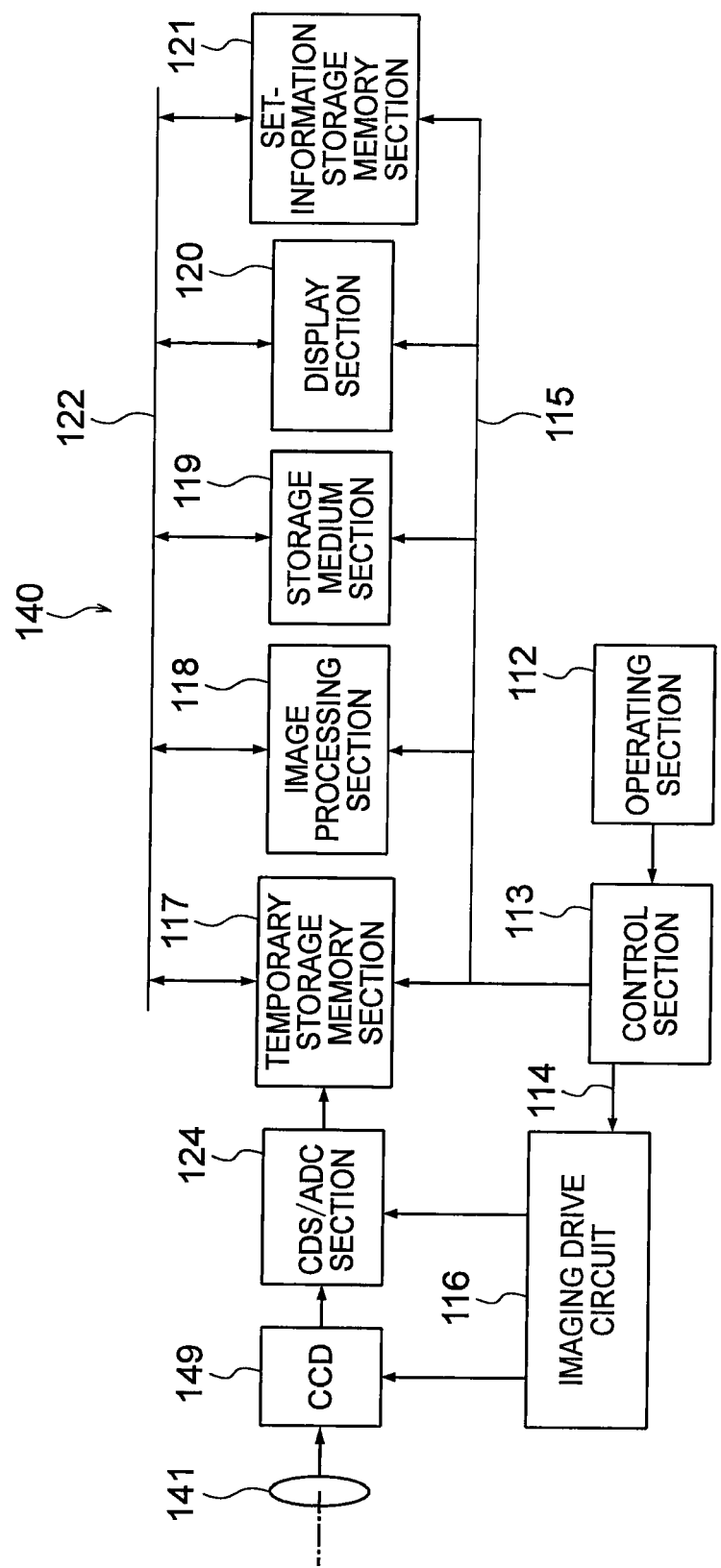
FIG. 37 is a block diagram showing the basic internal circuit configuration of the digital camera.

FIG. 37 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 37, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the zoom lens according to the present invention is advantageous for cost reduction while maintaining high optical performance. The zoom lens according to present invention can particularly suitable for use as an optical system of an image pickup apparatus having an electronic image pickup element such as CDD or CMOS sensor.

The zoom lens with a bent optical path according to the present invention is useful when good optical performance and size reduction are desired while achieving a high zoom ratio.

The present invention can provide a zoom lens having a high zoom ratio and excellent optical performance while being small in size and an image pickup apparatus equipped with such a zoom lens. The present invention can also provide a zoom lens having a high zoom ratio and a wide angle of view at the wide angle end while being small in size and an image pickup apparatus equipped with such a zoom lens.

What is claimed is:

1. A zoom lens with a bent optical path comprising, in order from the object side to the image side,
    a first lens unit having a positive refractive power;
    a second lens unit having a negative refractive power; and
    a rear lens unit group having a positive refractive power as a whole, wherein the first lens unit comprises a reflecting member having a reflecting surface that reflects rays,
    the rear lens unit group comprises, in order from the object side to the image side, a third lens unit having a positive refractive power, a fourth lens unit having a negative refractive power, and a fifth lens unit having a positive refractive power,
    the total number of lens units in the rear lens unit group is three,
    the distances between the lens units change during zooming from the wide angle end to the telephoto end, and
    the following conditional expressions (1A), (2A), (3A), and (4A) are satisfied:

$$0.1 < f_{1G}/f_T < 0.8 \tag{1A},$$

$$-0.5 < f_{2G}/f_T < -0.05 \tag{2A},$$

$$5.5 < \beta_{2T}/\beta_{2W} < 20 \tag{3A, and}$$

$$0.5 < \beta_{RT}/\beta_{RW} < 3 \tag{4A},$$

where $f_{1G}$ is the focal length of the first lens unit, $f_{2G}$ is the focal length of the second lens unit, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RT}$ is the lateral magnification of the rear lens unit group in the state in which the zoom lens is focused at the longest distance at the telephoto end, and $\beta_{RW}$ is the lateral magnification of the rear lens unit group in the state in which the zoom lens is focused at the longest distance at the wide angle end.

2. The zoom lens with a bent optical path according to claim 1, wherein the first lens unit consists of the reflecting member, an object side sub lens unit having a negative refractive power located on the object side of the reflecting member, and an image side sub lens unit having a positive refractive power located on the image side of the reflecting member, the object side sub lens unit consisting of one negative lens having a concave surface facing the image side, and the image side sub lens unit consisting of two positive lenses.

3. The zoom lens with a bent optical path according to claim 1, wherein the following conditional expression (9A) is satisfied:

$$1.2 < P/f_w < 5 \tag{9A}$$

where, $f_W$ is the focal length of the entire zoom lens system at the wide angle end in the state in which the zoom lens is focused at the longest distance, and P is the actual distance along the optical axis from the object side surface to the image side surface of the reflecting member.

4. The zoom lens with a bent optical path according to claim 1, wherein the first lens unit comprises an object side sub lens unit having a negative refractive power located on the object side of the reflecting member and an image side sub lens unit having a positive refractive power located on the image side of the reflecting member, the object side sub lens unit including a negative lens and the image side sub lens unit including two positive lenses, and the zoom lens satisfies the following conditional expressions (10A) and (11A):

$$20 < |v_{d1} - v_{d2}| < 70 \tag{10A, and}$$

$$20 < |v_{d1} - v_{d3}| < 70 \tag{11A}$$

where $\nu_{d1}$ is the Abbe constant with respect to the d-line of the negative lens located closest to the object side in the first lens unit, $\nu_{d2}$ is the Abbe constant with respect to the d-line of the object side positive lens in the image side sub lens unit in the first lens unit, and $\nu_{d3}$ is the Abbe constant with respect to the d-line of the image side positive lens in the image side sub lens unit in the first lens unit.

5. The zoom lens with a bent optical path according to claim 1, wherein the second lens unit comprises, in order from the object side to the image side, a first negative meniscus lens, a second negative meniscus lens, and a positive lens, and the first negative meniscus lens and the second negative meniscus lens satisfy the following conditional expressions (12A) and (13A):

$$1 < SF_{21} \tag{12A, and}$$

$$SF_{22} < -1 \tag{13A},$$

where $SF_{21}$ is a shape factor of the first negative meniscus lens defined by the following equation:

$$SF_{21} = (R_{21} + R_{22})/(R_{2} - R_{22}),$$

where $R_{21}$ is the paraxial radius of curvature of the object side surface of the first negative meniscus lens, $R_{22}$ is the paraxial radius of curvature of the image side surface of the first negative meniscus lens, and $SF_{22}$ is a shape factor of the second meniscus lens defined by the following equation:

$$SF_{22} = (R_{23} + R_{24})/(R_{23} - R_{24}),$$

where $R_{23}$ is the paraxial radius of curvature of the object side surface of the second negative meniscus lens, $R_{24}$ is the paraxial radius of curvature of the image side surface of the second negative meniscus lens.

6. The zoom lens with a bent optical path according to claim 1, wherein the rear lens unit group comprises a lens unit having a negative refractive power comprising a cemented lens made up of a positive lens and a negative lens that are cemented together, and the following conditional expression (14A) is satisfied:

$$0.1 < |n_{d1} - n_{d2}| < 0.5 \tag{14A},$$

where $n_{d1}$ is the refractive index for the d-line of the positive lens in the cemented lens, and $n_{d2}$ is the refractive index for the d-line of the negative lens in the cemented lens.

7. An image pickup apparatus comprising:
a zoom lens with a bent optical path according to claim 1; and
an image pickup element that is disposed on the image side of the zoom lens with a bent optical path and converts an optical image formed by the zoom lens with a bent optical path into an electrical signal.

8. A zoom lens with a bent optical path comprising, in order from the object side to the image side:
a first lens unit having a positive refractive power;
a second lens unit having a negative refractive power;
a rear lens unit group including a plurality of lens units and having a positive refractive power as a whole, wherein
the first lens unit comprises a reflecting member having a reflecting surface that reflects rays,
the reflecting member is a reflecting prism having an internal reflecting surface that constitutes the reflecting surface, an object side surface, which is an object side refracting surface, and an image side surface, which is an image side refracting surface,
the combined refractive power of the portion of the first lens unit that is located on the object side of the reflecting surface is negative,
the combined refractive power of the portion of the first lens unit that is located on the image side of the reflecting surface is positive,
the distances between the lens units change during zooming from the wide angle end to the telephoto end, and
the following conditional expressions (1A), (2A), (3A), and (16A) are satisfied:

$$0.1 < f_{1G}/f_T < 0.8 \tag{1A},$$

$$-0.5 < f_{2G}/f_T < -0.05 \tag{2A},$$

$$5.5 < \beta_{2T}/\beta_{2W} < 20 \tag{3A, and}$$

$$1.0 < f_W/IH_{max} < 1.43 \tag{16A},$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, and $IH_{max}$ is the image height in the zoom lens with a bent optical path or the highest image height in the case where the image height varies.

9. The zoom lens with a bent optical path according to claim 8, wherein the rear lens unit group comprises, in order from the object side to the image side, a positive lens unit group comprising one or two lens units each having a positive refractive power, a negative lens unit having a negative refractive power, and a positive lens unit having a positive refractive power, wherein the distances between the lens units change during zooming from the wide angle end to the telephoto end.

10. The zoom lens with a bent optical path according to claim 9, wherein the following conditional expression (15A) is satisfied:

$$0.25 < (\beta_{RNT}/\beta_{RNW})/(\beta_{RPFT}/\beta_{RPFW}) < 7 \tag{15A},$$

where $\beta_{RNT}$ is the lateral magnification of the negative lens unit in the rear lens unit group in the state in which the zoom lens is focused at the longest distance at the telephoto end, $\beta_{RNW}$ is the lateral magnification of the negative lens unit in the rear lens unit group in the state in which the zoom lens is focused at the longest distance at the wide angle end, $\beta_{RPFT}$ is the lateral magnification of the positive lens unit group in the rear lens unit group in the state in which the zoom lens is focused at the longest distance at the telephoto end, and $\beta_{RPFW}$ is the lateral magnification of the positive lens unit group in the rear lens unit group in the state in which the zoom lens is focused at the longest distance at the wide angle end.

11. The zoom lens with a bent optical path according to claim 9, wherein the negative lens unit in the rear lens unit group consists of one single lens or one cemented lens and moves for focusing, and the positive lens unit on the image side of the negative lens unit in the rear lens unit group is fixed during zooming.

12. A zoom lens with a bent optical path comprising, in order from the object side to the image side:
a first lens unit having a positive refractive power;
a second lens unit having a negative refractive power;

a rear lens unit group including a plurality of lens units and having a positive refractive power as a whole, wherein the first lens unit comprises a reflecting member having a reflecting surface that reflects rays, the reflecting member is a reflecting prism having an internal reflecting surface that constitutes the reflecting surface, an object side surface, which is an object side refracting surface, and an image side surface, which is an image side refracting surface, the combined refractive power of the portion of the first lens unit that is located on the object side of the reflecting surface is negative, the combined refractive power of the portion of the first lens unit that is located on the image side of the reflecting surface is positive, the rear lens unit group comprises, in order from the object side to the image side, an object side sub lens unit group and an image side lens unit in which all the gaps between the lens elements are constant, the distances between the lens units change during zooming from the wide angle end to the telephoto end, and the following conditional expressions (5A), (6A), (7A), and (8A) are satisfied:

$$0.1 < f_{1G}/f_T < 0.38 \tag{5A}$$

$$-0.18 < f_{2G}/f_T < -0.09 \tag{6A}$$

$$7 < (\beta_{2T} \times \beta_{RFT})/(\beta_{2W} \times \beta_{RFW}) < 20 \tag{7A}, \text{ and}$$

$$2.1 < P/f_W < 3.1 \tag{8A},$$

where $f_{1G}$ is the focal length of the first lens unit, $f_{2G}$ is the focal length of the second lens unit, $f_W$ is the focal length of the entire zoom lens system at the wide angle end in the state in which the zoom lens is focused at the longest distance, $f_T$ is the focal length of the entire zoom lens system at the telephoto end in the state in which the zoom lens is focused at the longest distance, $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{RFT}$ is the lateral magnification of the object side sub lens unit group in the state in which the zoom lens is focused at the longest distance at the telephoto end, $\beta_{RFW}$ is the lateral magnification of the object side sub lens unit group in the state in which the zoom lens is focused at the longest distance at the wide angle end, and P is the actual distance along the optical axis from the object side surface to the image side surface of the reflecting member in the first lens unit.

13. The zoom lens with a bent optical path according to claim 12, wherein the object side sub lens unit group comprises a plurality of lens units that move during zooming from the wide angle end to the telephoto end.

14. The zoom lens with a bent optical path according to claim 13, wherein the object side sub lens unit group comprises a positive lens unit and a negative lens unit that move with a varying distance therebetween during zooming from the wide angle end to the telephoto end.

15. A zoom lens with a bent optical path comprising, in order from the object side to the image side:

a first lens unit having a positive refractive power;
a second lens unit having a negative refractive power;
a third lens unit having a positive refractive power;
a fourth lens unit having a negative refractive power; and
a fifth lens unit having a positive refractive power, wherein the total number of lens units in the zoom lens with a bent optical path is five, the first lens unit comprises a reflecting member having a reflecting surface that reflects rays, the distances between the lens units change during zooming from the wide angle end to the telephoto end, the third lens unit comprises one cemented lens component comprising three lenses including a positive lens and a negative lens, the refractive surface closest to the object side and the refractive surface closest to the image side of the cemented lens component are convex surfaces, one negative lens in the cemented lens component is a biconcave lens, which has the smallest Abbe constant among the lenses in the cemented lens component.

16. The zoom lens with a bent optical path according to claim 15, wherein the following conditional expression (1B) is satisfied:

$$7 < (\beta_{2T} \times \beta_{3T} \times \beta_{4T})/\beta_{2W} \times \beta_{3W} \times \beta_{4W}) < 20 \tag{1B},$$

where $\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{3T}$ is the lateral magnification of the third lens unit in the state in which the zoom lens is focused at the longest distance at the telephoto end, $\beta_{3W}$ is the lateral magnification of the third lens unit in the state in which the zoom lens is focused at the longest distance at the wide angle end, $\beta_{4T}$ is the lateral magnification of the fourth lens unit in the state in which the zoom lens is focused at the longest distance at the telephoto end, and $\beta_{4W}$ is the lateral magnification of the fourth lens unit in the state in which the zoom lens is focused at the longest distance at the wide angle end.

17. The zoom lens with a bent optical path according to claim 15, wherein the third lens unit comprises, in order from the object side to the image side, a positive lens component having a positive refractive power and the cemented lens component, and the cemented lens component has a negative refractive power as a whole.

18. The zoom lens with a bent optical path according to claim 17, wherein the following conditional expression (2B) is satisfied:

$$-0.9 < f_{3GF}/f_{3GR} < -0.1 \tag{2B},$$

where $f_{3GF}$ is the focal length of the positive lens component in the third lens unit, and $f_{3GR}$ is the focal length of the cemented lens component in the third lens unit.

19. The zoom lens with a bent optical path according to claim 15, wherein the cemented lens component in the third lens unit satisfies the following conditional expression (3B):

$$15 < \nu_{Pmax} - \nu_{Nmin} < 70 \tag{3B},$$

where $\nu_{Pmax}$ is the largest Abbe constant of the positive lens(es) in the cemented lens component, and $\nu_{Nmin}$ is the smallest Abbe constant of the negative lens(es) in the cemented lens component.

20. The zoom lens with a bent optical path according to claim 15, wherein the cemented lens component consists of three lenses including, in order from the object side to the image side, a first positive lens convex toward the object side, a negative lens, and a second positive lens.

21. The zoom lens with a bent optical path according to claim 20, wherein the cemented lens component satisfies the following conditional expression (4B):

$$0.05 < f_N/f_{CL} < 0.8 \quad (4B),$$

where $f_N$ is the focal length of the negative lens in the cemented lens component itself, and $f_{CL}$ is the focal length of the cemented lens component.

22. The zoom lens with a bent optical path according to claim 15, wherein the cemented lens satisfies the following conditional expression (5B):

$$-0.9 < (R_{OCL} + R_{ICL})/(R_{OCL} - R_{ICL}) < 0.5 \quad (5B),$$

where $R_{OCL}$ is the paraxial radius of curvature of the object side surface of the cemented lens component, $R_{ICL}$ is the paraxial radius of curvature of the image side surface of the cemented lens component.

23. The zoom lens with a bent optical path according to claim 15, wherein the third lens unit and the fourth lens unit satisfy the following conditional expression (6B):

$$-4 < f_{3G}/f_{4G} < -0.1 \quad (6B),$$

where $f_{3G}$ is the focal length of the third lens unit, and $f_{4G}$ is the focal length of the fourth lens unit.

24. The zoom lens with a bent optical path according to claim 15, wherein the following conditional expressions (7B), (8B), and (9B) are satisfied:

$$1.5 < \beta_{2T}/\beta_{2W} < 8 \quad (7B),$$

$$1.5 < \beta_{3T}/\beta_{3W} < 8 \quad (8B), \text{ and}$$

$$1 < \beta_{4T}/\beta_{4W} < 5 \quad (9B),$$

$\beta_{2T}$ is the lateral magnification of the second lens unit in the state in which the zoom lens is focused at the longest distance at the telephoto end, $\beta_{2W}$ is the lateral magnification of the second lens unit in the state in which the zoom lens is focused at the longest distance at the wide angle end, $\beta_{3T}$ is the lateral magnification of the third lens unit in the state in which the zoom lens is focused at the longest distance at the telephoto end, $\beta_{3W}$ is the lateral magnification of the third lens unit in the state in which the zoom lens is focused at the longest distance at the wide angle end, $\beta_{4T}$ is the lateral magnification of the fourth lens unit in the state in which the zoom lens is focused at the longest distance at the telephoto end, and $\beta_{4W}$ is the lateral magnification of the fourth lens unit in the state in which the zoom lens is focused at the longest distance at the wide angle end.

25. The zoom lens with a bent optical path according to claim 15, wherein the reflecting member is a reflecting prism having an internal reflecting surface that constitutes the reflecting surface, an object side surface, which is an object side refracting surface, and an image side surface, which is an image side refracting surface, the combined refractive power of the portion of the first lens unit that is located on the object side of the reflecting surface is negative, the combined refractive power of the portion of the first lens unit that is located on the image side of the reflecting surface is positive, and the zoom lens satisfies the following conditional expression (10B):

$$1.2 P/f_w < 5 \quad (10B),$$

where, $f_W$ is the focal length of the entire zoom lens system at the wide angle end in the state in which the zoom lens is focused at the longest distance, and P is the actual distance along the optical axis from the object side surface to the image side surface of the reflecting member in the first lens unit.

26. An image pickup apparatus comprising:
a zoom lens with a bent optical path according to claim 15; and
an image pickup element disposed on the image side of the zoom lens with a bent optical path and having an image pickup surface that receives an image formed by the zoom lens with a bent optical path.

* * * * *